(12) United States Patent
Yoshino et al.

(10) Patent No.: US 8,032,034 B2
(45) Date of Patent: Oct. 4, 2011

(54) OPTICAL CODE COMMUNICATION SYSTEM

(75) Inventors: Manabu Yoshino, Chiba (JP); Noriki Miki, Chiba (JP); Shin Kaneko, Chiba (JP); Tomohiro Taniguchi, Chiba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 513 days.

(21) Appl. No.: 12/302,245

(22) PCT Filed: Apr. 6, 2007

(86) PCT No.: PCT/JP2007/057754
§ 371 (c)(1),
(2), (4) Date: Nov. 24, 2008

(87) PCT Pub. No.: WO2008/001531
PCT Pub. Date: Jan. 3, 2008

(65) Prior Publication Data
US 2009/0274470 A1 Nov. 5, 2009

(30) Foreign Application Priority Data
Jun. 29, 2006 (JP) ................... 2006-179997

(51) Int. Cl.
*H04B 10/00* (2006.01)
*H04B 10/04* (2006.01)
*H04B 10/12* (2006.01)
(52) U.S. Cl. ......... 398/183; 398/140; 398/158; 398/190
(58) Field of Classification Search ............. 398/23, 398/24, 140, 158, 182, 183, 190, 202
See application file for complete search history.

(56) References Cited

U.S. PATENT DOCUMENTS
2006/0147219 A1 7/2006 Yoshino et al. .............. 398/183

FOREIGN PATENT DOCUMENTS
JP 06-053906 2/1994
JP 10-013306 1/1998
WO WO 2005/008923 1/2005

OTHER PUBLICATIONS
Cedric F. Lam et al., "Experimental Demonstration of Bipolar Optical CDMA System Using a Balanced Transmitter and Complementary Spectral Encoding", IEEE Photon. Technol. Lett. vol. 10, pp. 1504 to 1506 (1998).

*Primary Examiner* — Armando Rodriguez
(74) *Attorney, Agent, or Firm* — DLA Piper LLP (US)

(57) ABSTRACT

An optical code communication system comprises an optical transmitter, an optical receiver, and an optical transmission line. The optical receiver has an optical mixing decoder for mixing a coded light and a local light, dividing the mixed light into an object optical frequency and a non-object optical frequency, and outputting the lights and a detection adder-subtractor filter for detecting the object optical frequency and the non-object optical frequency, filtering the intermediate frequency signals, subtracting one of the intermediate frequency signal from the other, and outputting the resultant intermediate frequency signal. The coded light and the local light are coherent with each other between the optical frequency chips constituting the coded light when detected. The optical mixing decoder or detection adder-subtractor filter regulates the phase of the intermediate frequency signal within the passband when filtered so that the output value or the absolute value of the intermediate frequency signal within the passband when filtered is different when the optical receiver receives a coded light modulated with a different value of the transmission data.

26 Claims, 25 Drawing Sheets

OPTICAL CODE COMMUNICATION SYSTEM

CROSS-REFERENCE TO THE RELATED APPLICATIONS

The present application is a national stage of international application No. PCT/JP2007/057754 filed Apr. 6, 2007, which also claims the benefit of priority under 35 USC 119 to Japanese Patent Application No. 2006-179997 filed Jun. 29, 2006, the entire contents of which are incorporated herein by reference.

TECHNICAL FIELD

The present invention relates to an optical code communication system of OCDM (Optical Code Division Multiplex) method for transmitting and receiving coded signal light.

BACKGROUND ART

An optical code division multiplexing method by which same propagation media and same optical frequency bands can be shared simultaneously by a plurality of signals by identifying by codes has been investigated as optical communication used in the future. In particular, optical code division multiplexing coded by amplitude, phase, and frequency in optical frequency or wavelength region, where blocking of an interference light by improper connection is allowed, is promising.

However, with optical code division multiplexing in the optical frequency region or wavelength region, even with bipolar method or pseudo-bipolar method which enables suppression of multiple access interference, degradation of sensitivity due to beat noise between coded lights of a plurality of codes sharing a medium and optical frequency band and shot noise of coded light of a plurality of codes sharing a medium and frequency band can not be ignored, and there exists a problem that a limitation is imposed to the number of multiplexed codes (see, for example, Non-patent Document 1). The following description explains this problem.

FIG. 1 shows one example of configuration of pseudo-bipolar OCDM-PON which is PON (Passive Optical Network) subjected to optical code division multiplexing (OCDM) by connecting ONUs (Optical Network Units) which are a plurality of user side equipments to an OLT (Optical Line Terminal), that is single station side device, via an optical coupler/splitter 112 and a single optical fiber.

In ONU101-1, modulated light which is of light from a light source 121 and is modulated by a modulator 122 according to user's transmission data is coded by a coder 123 and is output. The coder 123 follows a specific code assigned for every ONU-101-1, 101-2 to 101-n. At OLT 111, coded light being coded by a code different depending on every ONU, from a plurality of ONU-101-1, 101-2 to 101-n is decoded, and is detected by differential detectors 132a, 132b.

Here, as for the code used in coding in the coder 123, a code in which multiple access interference is suppressed by decoding by a receiver side decoder 131 and differential detection by the differential detectors 132a, 132b at receiver state is used. In ON/OFF light intensity modulation, for such code, Hadamard code or cyclic bit-shifted M-sequence code is mentioned.

When such code is used, optical frequency chips that assigned a value of "1" by the code of receiving object is mostly input to one side of the differential detectors 132a, 132b, and is not input to other side. In this case, optical frequency chips that assigned a value of "1" by the code of other than receiving object, is input to both sides of the differential detectors 132a, 132b with nearly uniform intensity. For this reason, the optical frequency chips constituting the code other than the receiving object are balanced but by differential detection, multiple access interference is cancelled ideally.

In the pseudo-bipolar OCDM-PON shown in FIG. 1, coded light $E_i$ of code i, suppression ratio $\alpha_i$ of multiple access interference of code i to the decoder 131 corresponding to code p, and noise variance $\sigma^2$ after detection using the decoder 131 corresponding to the code p are expressed by the following equations, respectively.

$$E_i = \sum_{m}^{M} E_{im} \cos(2\pi f_{im} t + \phi_{im}) \quad \text{Equation (1)}$$

$$\alpha_i = \sum_{m}^{M} (C_{pm} - C'_{pm}) E_{im}^2 \Big/ \sum_{m}^{M} (C_{pm} - C'_{pm}) E_{pm}^2 \quad \text{Equation (2)}$$

$$\sigma^2 = \quad \text{Equation (3)}$$

$$a_1 + a_2 + a_3 + a_4 + a_5 \approx 2eBR \sum_{m}^{M} (C_{pm} + C'_{pm}) D_p(t) E_{pm}^2 +$$

$$eBR \sum_{i; i \neq p}^{K} \sum_{m}^{M} (C_{pm} + C'_{pm}) E_{im}^2 +$$

$$\frac{1}{2} R^2 \sum_{i; i \neq p}^{K} \sum_{m}^{M} (C_{pm}^2 - C'^2_{pm}) D_p(t) E_{pm}^2 E_{im}^2 +$$

$$\frac{1}{4} R^2 \sum_{i; i \neq p}^{K} \sum_{j; j \neq p, i}^{K} \sum_{m}^{M} (C_{pm}^2 - C'^2_{pm}) E_{im}^2 E_{jm}^2 + a_5 \approx$$

$$eB(2D_p(t) + K - 1) i_{data} + \frac{B}{4F} D_p(t)(K - 1) i_{data}^2 +$$

$$\frac{(K-1)(K-2)B}{16F} i_{data}^2 \alpha^2 + a_5$$

where, $a_1 = \overline{i_s^2}$, $a_2 = \overline{i_b^2}$, $a_3 = \overline{i_{s-b}^2}$, $a_4 = \overline{i_{b-b}^2}$, $a_5 = \overline{i_c^2}$ Where, $E_{im}$, $f_{im}$ and $\Phi_{im}$ mean electric field intensity, optical frequency and phase of optical frequency chip m of code i, respectively. i means integer from 1 to K (K is natural number of 2 or more), m means integer from 1 to M (M is natural number of 2 or more), $C_{pm}$ and $C_{pm}'$ are light power transmission function of two outputs of the decoder 131 of the optical frequency chip m for code p, and F means frequency separation between the chips. Further, $a_1$, $a_2$, $a_3$, $a_4$ and $a_5$ mean shot noise of code p that is a selection code being selected as a reception object, shot noise of non-selection codes of codes other than that, beat noise between selection code and non-selection code, beat noise between non-selection code and non-selection code, and receiver noise including dark current, respectively, and are assumed to be approximated as a Gaussian distribution in each variance. Further, e means an elementary electric charge, R means detector responsivity of the differential detectors 132a, 132b, B means bandwidth in the electrical domain of the receiver, and $D_p(t)$ means data value of the code p at time t and its value is 0 or 1. Values corresponding to the code other than code p are shown by values averaged data values of 0 and 1. For simplicity, signal current intensity of all codes is considered to be identical, multiple access interference suppression ratio $\alpha_i$ is considered to be identical value $\alpha$, electric field intensity and polarization state of optical frequency chip constituting coded light of each code are considered identical, polarization state of the coded light with different code is assumed to exhibit uniform distribution, beat between chips with different numbers are assumed to lie outside receiver's bandwidth, and frequency difference between chips with the same number of coded light with different code is assumed to be uniformly distributed over half of the frequency separation F. Therefore, only B/F of beat noises in Equation (3) affects noises variance. In order to reduce influences of beat noise upon the number of multiplexed code in this conventional example for assessment purpose, it is assumed that the beat noise between non-selection code and non-selection code could be suppressed by multiple access interference suppression ratio α. The bit error rate (BER) in this example can be expressed by Equation (4). In Equation (4), erfc means complementary error function and $i_{data}$ means signal current intensity.

$$BER = \frac{1}{4}\text{erfc}\left(\frac{1}{2\sqrt{2}} \frac{i_{data}}{\sqrt{eB(K+1)i_{data} + \left(\frac{(K-1)B}{4F} + \frac{(K-1)}{(K-2)B\alpha^2} + \frac{(K-1)\alpha^2}{2}\right)i_{data}^2 + \overline{i_c^2}}}\right) \quad \text{Equation (4)}$$

FIG. 2 shows a relationship between the number of multiplexed codes and power penalty. In FIG. 2, dotted line shows power penalty as a function of the number of multiplexed codes that follows Equation (4). Multiple acess interference suppression ratio is considered to be 30.7 dB. It is known from FIG. 2 that, as shown by dotted line, the penalty due to shot noise and beat noise from other coded light can not be neglected in the conventional example. In this case, one of methods for improving receiving sensitivity is to perform coherent detection using sufficient strong local light which is in a predetermined frequency relationship with coded light (for example, see Non-patent Document 2). According to the conventional art, as the method for applying coherent detection to OCDM, for example, Patent Document 1 is mentioned.

Patent Document 1: Japanese Patent Application Laid-Open (JP-A) No. 10-013306

Non-patent Document 1: C. F. Lam, et al. "Experimental Demonstration of bipolar optical CDMA System Using a Balanced Transmitter and Complimentary Spectral Encoding", IEEE Photon. Technol. Lett. Vol. 10, No. 10, pp. 1504 to 1506 (1998)

Non-patent Document 2: Coherent Optical Communication Engineering, The Ohmsha, Ltd.

DISCLOSURE OF THE INVENTION

Problems to be Solved by the Invention

However, the Patent Document 1 is for homodyne detection between coded signal light using phase code in the time domain and replica of the signal light and is not an optical code division multiplexing in optical frequency domain or wavelength domain. For this reason, blocking of interference light is not allowed and this art can not be applied without modification. The following description deals with problems when coherent detection is applied to optical code, which is composed of several optical frequency chips in the optical frequency domain.

Here, ONU101-1 transmits coded light being intensity modulated according to transmission data and OLT 111 mixes coded light and local light in the previous stage of the decoder 131. Further, after decoding by the decoder 131, OLT 111 performs both detection of two output lights via respective paths from the decoder 131 by two detectors (not shown), and addition and subtraction of the output of the detector by an adder-subtractor (not shown) in lieu of the differential detectors 132a, 132b, and outputs it towards a filter 133. Modulation method in ONU101-1 is not limited to intensity modulation, and other modulation method may be employed.

In the configuration, local light $E_L$ can be expressed by, for example, Equation (5).

$$E_L = \sum_m^M E_{Lm}\cos(2\pi(f_{im} + f_{IF})t + \phi_{Lm}) \quad \text{Equation (5)}$$

In this case, the intensity of coded lights $i_p$ at the detector for code p can be expressed by Equation (6).

$$i_p = 2R\sum_m^M \sum_n^M \left(\sqrt{C_{pm}C_{pn}} - \sqrt{C'_{pm}C'_{pn}}\right)E_{Lm}E_{Ln}\cos(2\pi[m-n]F(t-\tau_{LmLn}) + \phi_{Lm} - \phi_{Ln}) +$$

$$2R\sum_i^K \sum_k^K \sum_m^M \sum_n^M \left(\sqrt{C_{pm}C_{pn}} - \sqrt{C'_{pm}C'_{pn}}\right)E_{im}E_{kn}\cos(2\pi[m-n]F(t-\tau_{imkn}) + \phi_{im} - \phi_{kn}) +$$

$$2R\sum_m^M (C_{pm} - C'_{pm})E_{pm}E_{Lm}\cos(2\pi f_{IF}(t-\tau_{pmLn}) + \phi_{pm} - \phi_{Lm}) + 2R\sum_{i;i\neq p}^K \sum_m^M (C_{pm} - C'_{pm})E_{im}E_{Lm}\cos(2\pi f_{IF}(t-\tau_{imLm}) + \phi_{im} - \phi_{Lm}) +$$

$$2R\sum_i^K \sum_m^M \sum_{n;n\neq m}^M \left(\sqrt{C_{pm}C_{pn}} - \sqrt{C'_{pm}C'_{pn}}\right)E_{im}E_{Ln}\cos(2\pi(f_{IF} + [m-n]F)(t-\tau_{imLn}) + \phi_{im} - \phi_{Ln}) + n^{(t)}$$

Equation (6)

where, $E_{Lm}$, $f_{im}+f_{IF}$, and $\Phi_{Lm}$ mean in this order electric field intensity, optical frequency, and phase of optical frequency chip m of local light, respectively. m means integer from 1 to M (M is natural number of 2 or more), $f_{IF}$ means intermediate frequency, $C_{pm}$ and $C_{pm}'$ mean power transmission function of two outputs of the decoder 131 of optical frequency chip m for code p, F means frequency separation between the chips, R means detector responsivity of the detector, τ means delay time to which is subjected the intermediate frequency signal from each detector to a place where intermediate frequency signal is added and subtracted, and n (t) means receiver noise including dark current or the like. For simplicity, polarization states of optical frequency chips constituting coded light of each code is assumed to be identical. First term and second term of Equation (6) result from direct detection components of local light and coded lights, third term results from signal current of selection signal, and fourth term and fifth term result from multiple access interference.

When it is considered that intermediate frequency is sufficiently smaller than frequency separation F between optical frequency chips and is sufficiently larger than direct current, the first term, the second term and the fifth term can be removed by the filter 133 in the electric domain, and only signal current component of the third term and multiple access interference component of the fourth term remain. In a case of envelope detection where phase synchronization of coded light and local light is not performed, since phase relationship between optical frequency chips is indefinite, a value corresponding to the phase of the intermediate frequency signals (value of cos portion) of signal current component of the third term, is a random value from −1 to 1. For example, when it is considered that values exhibit a uniform distribution, average of the signal current in the third term is zero and is also zero when the coded light is transmitted and is not transmitted, and data transmission is not possible.

Further, in a case of synchronous detection where phase synchronization of the coded light and the local light is performed, although synchronization is performed so as to minimize the phase of the intermediate frequency signal while phase synchronization residue is left between the coded light and the local light, since there is no coherence between optical frequency chips constituting the coded lights, signals and multiple access interference fluctuate randomly. For this reason, in particular, multiple access interference component can not be cancelled and data transmission becomes difficult.

Further, propagation delay in each route of signals through different routes from different outputs of the decoder 131 to the adder-subtractor applied in lieu of the differential detectors 132a, 132b is adjusted so as to agree with frequencies of data rate at the most. Therefore, in a case of heterodyne, since intermediate frequency is about, as a guideline, five times more than frequency of data rate, there is no assurance that phases of the intermediate frequency signals agree.

Means for Solving the Problems

In order to solve the problems, in the present invention, light maintaining coherences respective between optical frequency chips constituting coded light and light maintaining coherence between optical frequency chips constituting local light are used, and phase of intermediate frequency signals from which coded light and/or local light are detected via respective paths, from reception of coded light from optical transmitter by optical receiver till addition/subtraction by adder-subtractor, are adjusted.

In particular, an optical code communication system relating to the present invention includes an optical transmitter for transmitting coded light, in which a plurality of optical frequency chips, in which a plurality of light with different optical frequencies from a light source is coded by a predetermined code, is modulated by a transmission data; an optical receiver for receiving the coded light from the optical transmitter, processing the received coded light using local light of which intensity is stronger than the intensity of the coded light received, which includes a plurality of lights, in which optical frequency difference with each of a plurality of optical frequency chips with the different optical frequency is set to nearly intermediate frequency, taking out the transmission data in the optical transmitter and outputting it; and an optical transmission line for connecting the optical transmitter and the optical receiver and transmitting the coded light from the optical transmitter towards the optical receiver, wherein the optical receiver includes an optical mixing decoder for mixing the coded light from the optical transmitter and the local light, dividing at least one of the coded light or the local light into object optical frequencies corresponding to the optical frequency chips, in which the values of code of a receiving object of the optical receiver are "1" and a non-object optical frequencies corresponding to the optical frequency chips, in which the values of code of the receiving object are "0", and outputs each of the object optical frequency, in which coded light from the optical transmitter and the local light are mixed, and the non-object optical frequency in which coded light from the optical transmitter and the local light are mixed; and a detection adder-subtractor filter for detecting each of the object optical frequency and the non-object optical frequency from the optical mixing decoder passing of each of intermediate frequency signals of the object optical frequency and the non-object optical frequency, subtracting the other from one of the intermediate frequency signals, and outputs it, wherein the coded light from the optical transmitter has coherence between optical frequency chips constituting the coded light from the optical transmitter, when being detected in the detection adder-subtractor filter, and the local light has coherence between optical frequency chips constituting the local light, when being detected in the detection adder-subtractor filter; and the optical mixing decoder or the detection adder-subtractor filter regulates a phase of the intermediate frequency signal in a passband when the intermediate frequency signal is subtracted so that, output values or absolute values of the intermediate frequency signal in the passband at filtration in the detection adder-subtractor filter, of outputs of the detection adder-subtractor filter, become different between when coded light, which is coded by the code of the receiving object and modulated by one of the values of the transmission data, is received by the optical receiver, and when coded light, which is coded by the code of the receiving object and modulated by other value of the transmission data, is received by the optical receiver. In this way, noises can be suppressed.

In the optical code communication system, the optical frequency chips, in which the value of the code of the coded light of other than receiving object corresponds to "1", is in such a relationship that one half of the intermediate frequency signal in the passband is added and the other half is subtracted thereby cancelling each other; the local light further includes light in which optical frequency difference of the optical frequency chips, in which the values of code with the coded light corresponding to the other code corresponds to "1", is set to nearly intermediate frequency; and the optical mixing decoder or the detection adder-subtractor filter preferably regulates the phase so that the output subtracted the summation of multiplications of the electric current values of intermediate frequency signal of the outputs in the passband of the detection adder-subtractor filter when the optical receiver receives coded lights of the non-receiving object codes by generation probabilities of respective electric current values from the output in the passband of the detection adder-subtractor filter when the optical receiver receives coded light of the receiveing object which is modulated by one of values of the transmission data is greater in value or absolute value thereof than the output added the summation of multiplications of the electric current values of intermediate frequency signal of the outputs in the passband of the detection adder-subtractor filter when the optical receiver receives coded lights of the non-receiving object codes by generation probabilities of respective electric current values to the output in the passband of the detection adder-subtractor filter when the optical receiver receives coded light of the receiving object code which is modulated by other values of the transmission data. In this way, noises can be suppressed by reducing the multiple access interference sufficiently.

Further, in the optical code communication system, the optical mixing decoder includes an optical coupler/splitter for mixing the received coded light and the local light and outputting mixed light, and a decoder for dividing the mixed light from the optical coupler/splitter into the object optical frequency and the non-object optical frequency and outputting them; wherein the detection adder-subtractor filter preferably detects the object optical frequency from the decoder and the non-object optical frequency, and performs filtration and addition/subtraction thereof. In this way, a specific optical receiver can be composed.

In the optical code communication system, the optical mixing decoder includes a decoder for dividing each of the received coded light and the local light into the object optical frequency and the non-object optical frequency and outputting them, and an optical coupler/splitter for mixing respective object optical frequencies and non-object optical frequencies from the decoder and outputting them; wherein the detection adder-subtractor filter preferably detects the object optical frequency and the non-object optical frequency from the optical coupler/splitter, and performs filtration and addition/subtraction thereof.

In this way, the passband corresponding to each of optical frequency chips when coded light is decoded can be improved by as much as modulation broadening in addition to linewidth of coded light, and the passband when local light is decoded can be improved by as much as linewidth of local light.

In the optical code communication system, the optical mixing decoder includes a decoder for dividing the received coded light into the object optical frequency and the non-object optical frequency; an optical splitter for splitting the local light as many as the number of splitting of the decoder and outputting them; an optical coupler/splitter for mixing object optical frequency from the decoder and local light from the optical splitter and outputting them; and an optical coupler/splitter for mixing non-object optical frequency from the decoder and local light from the optical splitter and outputting them; wherein the detection adder-subtractor filter preferably detects the object optical frequency and the non-object optical frequency from the optical coupler/splitter, and performs filtration and addition/subtraction thereof. By this feature, the passband corresponding to each of optical frequency chips when coded lights are decoded can be improved by as much as modulation broadening in addition to linewidth of coded light. Further, whole optical loss of the optical receiver can be reduced.

Further, in the optical code communication system, the optical mixing decoder includes a decoder for dividing the local light into the object optical frequency and the non-object optical frequency and outputting them; an optical splitter for splitting the received coded light as many as the number of splitting of the decoder and outputting them; an optical coupler/splitter for mixing object optical frequency from the decoder and coded light from the optical splitter and outputting them; an optical coupler/splitter for mixing non-object optical frequency from the decoder and coded light from the optical splitter and outputting them; wherein the detection adder-subtractor filter preferably detects the object optical frequency and the non-object optical frequency from the optical coupler/splitter, and performs filtration and addition/subtraction thereof. With this feature, the passband corresponding to each of optical frequency chips when local light is decoded can be improved by as much as linewidth of local light. Further, whole optical loss of the optical receiver can be reduced.

Further, in the optical code communication system, the received coded light and the local light are in a relationship that optical frequencies nearly agree each other; the optical coupler/splitter is an optical hybrid which mixes the received coded light and the local light and at the same time, splits them, and outputs a plurality of mixed lights in which phase differences between the received coded light and the local light are different by predetermined values; the decoder divides each of a plurality of mixed lights from the optical hybrid into the object optical frequency and the non-object optical frequency, and outputs them; the detection adder-subtractor filter, for each of mixed light with different phase difference from the optical mixing decoder, detects the object optical frequency corresponding to each of a plurality of mixed lights from the optical hybrid and the non-object optical frequency corresponding to each of a plurality of mixed lights from the optical hybrid, passes of each of intermediate frequency signals and at the same time, subtracts the other from one of the intermediate frequency signals of object optical frequency and non-object optical frequency with identical phase difference, and outputs them; and the optical receiver preferably includes an adder which adds intermediate frequency signals each being output from the detection adder-subtractor filter and outputs them. With this feature, homodyne detection by means of phase diversity is made possible. In addition, the intermediate frequency can be made small, thereby allowing narrowing of the optical frequency band necessary for the coded light.

Further, in the optical code communication system, the received coded light and the local light are in a relationship that optical frequencies nearly agree each other; the optical coupler/splitter is an optical hybrid which mixes a plurality of input lights being input to the optical coupler/splitter and at the same time, splits them, and outputs a plurality of mixed lights in which phase differences between the received coded light and the local light are different by predetermined values; the detection adder-subtractor filter, for each of mixed light with different phase difference from the optical mixing decoder, detects each of mixed light in which at least one of the received coded light and local light corresponds to object optical frequency from the optical hybrid, and each mixed light in which at least one of the received coded light and local light corresponds to non-object optical frequency from the optical hybrid, passes of each of intermediate frequency signals, subtracts the other from one of the intermediate frequency signals of object optical frequency and non-object optical frequency with identical phase difference, and outputs them, and the optical receiver preferably includes an adder which adds intermediate frequency signals each being output from the detection adder-subtractor filter and outputs them. With this feature, homodyne detection by means of phase diversity is made possible. In addition, the intermediate frequency can be made small, thereby allowing narrowing of the optical frequency band necessary for the coded light.

Further, in the optical code communication system, the optical mixing decoder, when mixing coded light from the optical transmitter and the local light, mixes the coded light and the local light with two polarization relationships relatively different by $\pi/2$ or $3\pi/2$, and outputs mixed lights corresponding to a plurality of object optical frequencies in which polarization relationships between the coded light and the local light are different, and mixed lights corresponding to a plurality of non-object optical frequencies in which polarization relationships between the coded light and the local light are different; the detection adder-subtractor filter, for each of mixed light with different polarization relationship from the optical mixing decoder, detects the object optical frequency and the non-object optical frequency corresponding to each of a plurality of mixed lights from the optical mixing decoder, passes of each of intermediate frequency signals, subtracts the other from one of the intermediate frequency signals of object optical frequency and non-object optical frequency with identical polarization relationship, and outputs each of them; and the optical receiver preferably further includes an adder which adds intermediate frequency signal from the detection adder-subtractor filter and outputs them. With this feature, the optical receiver can be made independent of polarization state.

Further, in the optical code communication system, the optical mixing decoder, when mixing coded light from the optical transmitter and the local light, mixes the coded light and the local light with two polarization relationships relatively different by $\pi/2$ or $3\pi/2$, and outputs mixed lights corresponding to a plurality of object optical frequencies corresponding to combinations of polarization relationships and phase differences between the coded light and the local light, and mixed lights corresponding to a plurality of non-object optical frequencies corresponding to combinations of polarization relationships and phase differences between the coded light and the local light; the detection adder-subtractor filter detects, for each of mixed lights corresponding to combinations of polarization relationships and phase differences from the optical mixing decoder, the object optical frequency and the non-object optical frequency corresponding to each of mixed lights from the optical mixing decoder, passes of each of intermediate frequency signals, subtracts the other from one of the intermediate frequencies of object optical frequency and non-object optical frequency with identical polarization relationship and phase difference, and outputs each of them; and the optical receiver preferably adds each of intermediate frequency signals from the detection adder-subtractor filter by the adder. In this way, the optical receiver can be made independent of polarization state.

Further, in the optical code communication system, only one of the local light or the coded light is preferably composed of optical frequency chips of one of the local light or the coded light, which are composed by two lights with orthogonal polarization state, respectively, within time slot corresponding to a value of one transmission data. In this way, the optical receiver can be made independent of polarization state.

Further, in the optical code communication system, the optical receiver constitutes an optical frequency chip in the optical receiver by a code concatenated two codes used in claims; for each of the received coded light and the local light, optical frequency chips constituting each of codes constituting the concatenated code have identical polarization state; and the optical mixing decoder, when mixing the received coded light and the local light, preferably mixes the received coded light and the local light in two polarization relationships relatively different by $\pi/2$ or $3\pi/2$ for each of codes constituting the concatenated code. In this way, the optical receiver can be made independent of polarization state. In addition, passband for every optical frequency chip can be made narrow.

Further, in the optical code communication system, when the optical mixing decoder performs mixing after at least either of coded light from the optical transmitter and the local light is divided into object optical frequency and non-object optical frequency, the optical coupler/splitter outputs two sets of mixed light phase difference of which is different by nearly $\pi$, the detection adder-subtractor filter performs differential detection for two sets of mixed lights being split and output from the optical coupler/splitter with the phase difference of nearly $\pi$, passes of intermediate frequency signals of the object optical frequency and non-object optical frequency, and preferably subtracts the others from ones of the corresponding object optical frequency and non-object optical frequency of each set and outputs it. With this feature, reduction in direct detection component and common mode noises of the coded light and local light which result in noises for signal components are made possible.

Further, in the optical code communication system, the optical mixing decoder divides, in the decoder, the object optical frequency and the non-object optical frequency for every the plurality of optical frequency chips, outputs as the object optical frequency and the non-object optical frequency for every the plurality of optical frequency chips, and the detection adder-subtractor filter preferably detects for every the plurality of optical frequency chips for each of the object optical frequency and non-object optical frequency from the optical mixing decoder. With this feature, split loss caused when the coded light is split for every code can be reduced.

Further, in the optical code communication system, the optical receiver preferably further includes, when an adder is provided for adding the intermediate frequency signals being output from the detection adder-subtractor filter and outputs it at a stage after detection, filtration, and addition/subtraction in the detection adder-subtractor filter, a demodulator for demodulating the intermediate frequency signal from the detection adder-subtractor filter and outputting at a stage before the adder. With this feature, optical PLL becomes unnecessary.

Further, in the optical code communication system, the optical mixing decoder or the detection adder-subtractor filter preferably includes at least one of a dispersion regulator for regulating transmission delay due to optical frequency after the plurality of optical frequency chips of the different optical frequencies are modulated by the transmission data in the optical transmitter till added/subtracted in the detection adder-subtractor filter of the optical receiver, a phase regulator for regulating propagation time of the coded light before modulation in the optical transmitter so that a phase difference depending on frequency separation between optical frequency chips after a plurality of light of the different optical frequencies are output from the light source till detection is performed in the detection adder-subtractor filter is accommodated in a predetermined range, and a phase regulator for regulating propagation time of the local light at a stage before mixing the coded light and the local light in the optical mixing decoder or at a stage before the optical mixing decoder. With this feature, both reduction in signal intensity and suppression of multiple access interference due to phase fluctuations of the intermediate frequency signals can be attained.

Effect of the Invention

With present invention, sensitivity degradation due to shot noise and beat noise attributable to superimposition of other coded lights in the optical code communication system in which optical frequency domain or wavelength domain are coded can be neglected and high-accuracy optical communication in which limitation for the number of multiplexed codes is reduced is made possible.

BRIEF DESCRIPTION OF THE DRAWINGS

FIG. 6 is a drawing showing light spectra of coded light of a receiving object, coded light of other than receiving object, and local light input to a decoder 54.

FIG. 7 is a drawing showing light spectra of coded light of the receiving object, coded light of other than receiving object, and local light at a differential detector 64a.

FIG. 8 is a drawing showing light spectra of coded light of the receiving object, coded light of other than receiving object, and local light at the diferential detector 64b.

DESCRIPTION OF REFERENCE NUMERALS

Figure 1:
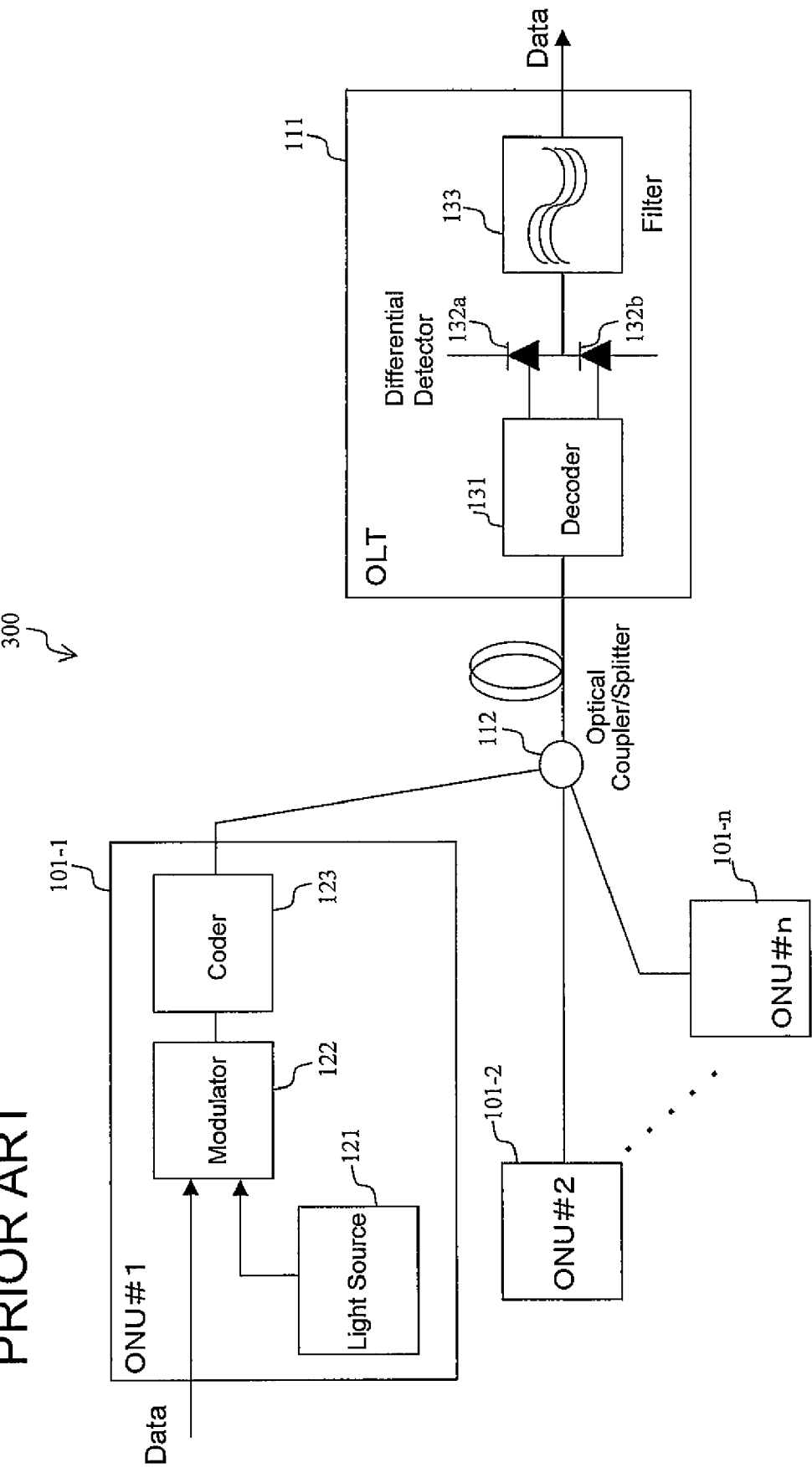
FIG. 1 is an outline configuration diagram showing conventional optical code communication system.

Symbols used in the drawings are as follows:
10: Optical code communication system,
21: Optical transmitter
22: Optical receiver
31: Light source
32: Modulator
33: Coder
41: Local oscillator
42: Optical mixing decoder
43: Detection adder-subtractor filter
44, 44-1, 44-2: Filter
45, 45-1, 45-2: Envelope detector
46: Adder
51, 52: Regulator
53, 59: Optical coupler/splitter
53a, 53b, 53a-1, 53b-1, 53a-2, 53b-2: Optical coupler/splitter
54, 54a, 54b, 54-1, 54-2: Decoder
55: Optical splitter
56, 56-1, 56-2, 56-1a, 56-1b, 56-2a, 56-2b: Optical hybrid
57, 58: Regulator
61a, 61b, 61a-1, 61b-1, 61a-2, 61b-2, 61-1a, 61-1b, 61-2a, 61-2b, 61-1a-1, 61-1a-2, 61-1b-1, 61-1b-2, 61-2a-1, 61-2a-2, 61-2b-1, 61-2b-2: Detector
62a, 62b, 62a-1, 62b-1, 62a-2, 62b-2, 62-1a, 62-1b, 62-2a, 62-2b, 62-1a-1, 62-1a-2, 62-1b-1, 62-1b-2, 62-2a-1, 62-2a-2, 62-2b-1, 62-2b-2: Regulator
63, 63-1, 63-2: Adder-subtractor
64a, 64b, 64a-1, 64b-1, 64a-2, 64b-2: Differential detector
71, 72, 74: Polarization maintaining optical splitter
73: Polarization beam splitter
81: Optical transmission line
82: Polarization maintaining optical fiber
101-1 to 101-n: ONU
111: OLT
112: Optical coupler/splitter
121: Light source
122: Modulator
123: Coder
131: Decoder
132a, 132b: Differential detector
133: Filter
300: Optical code communication system Referring now to the attached drawings, embodiments of the present invention will be explained. The embodiments explained hereafter are examples of the present invention and the present invention is not limited to the embodiments shown herein.

First Embodiment

Figure 3:
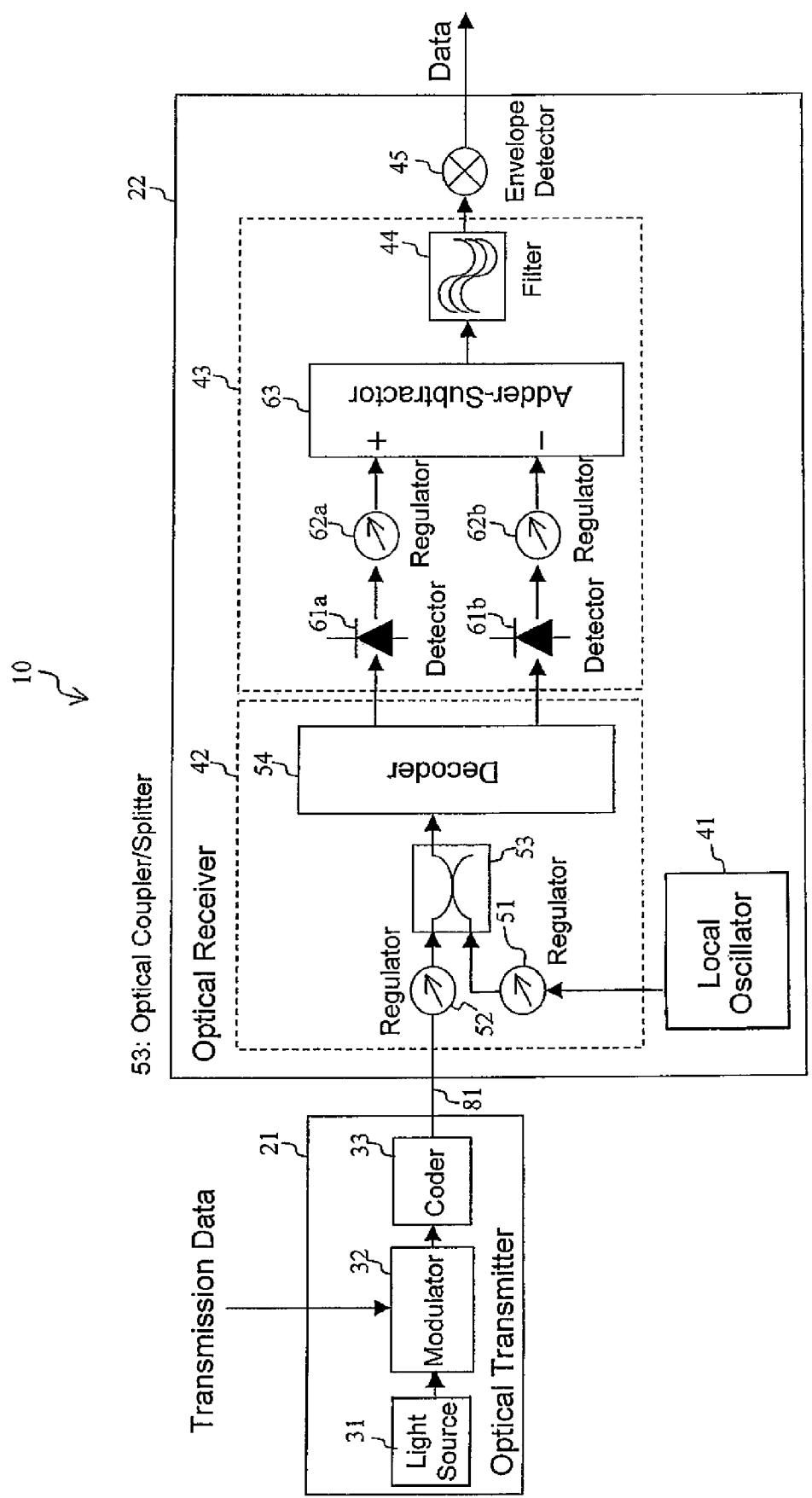
FIG. 3 is an outline configuration diagram showing an optical code communication system relating to one embodiment.
Figure 4:
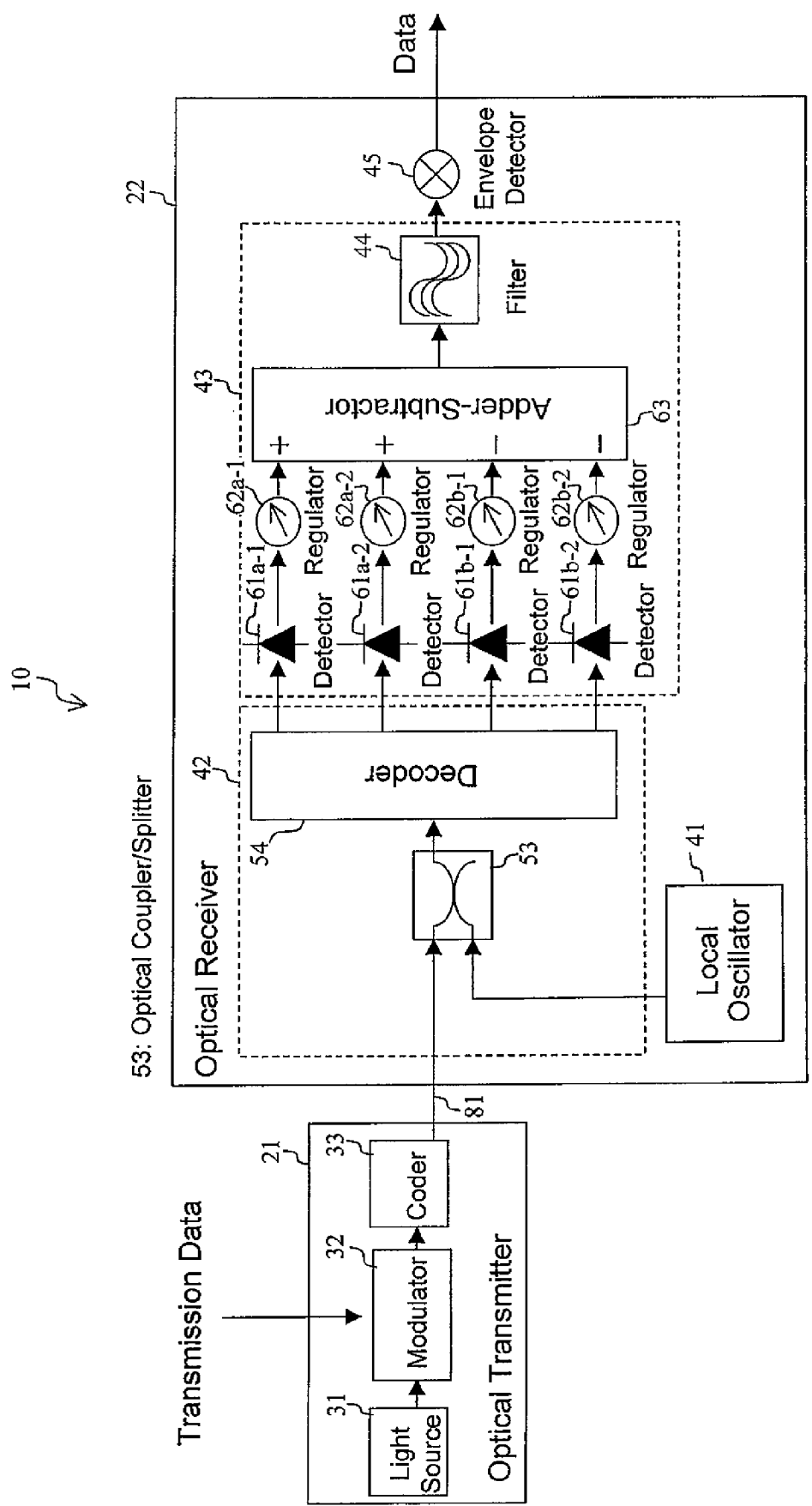
FIG. 4 is an outline configuration diagram showing an optical code communication system relating to one embodiment.
Figure 5:
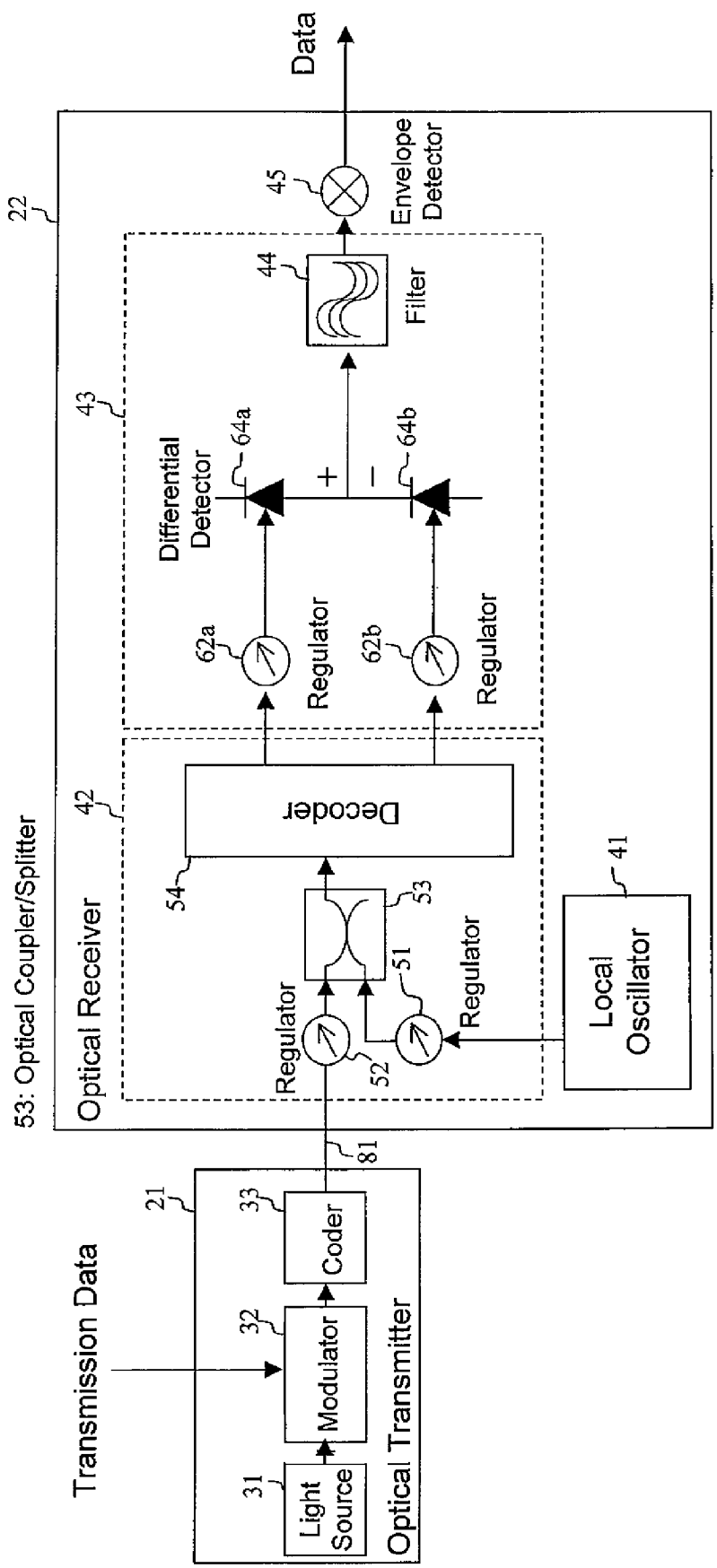
FIG. 5 is an outline configuration diagram showing an optical code communication system relating to one embodiment.

FIG. 3, FIG. 4 and FIG. 5 show outline configuration diagram of an optical communication system relating to the present embodiment.

An optical communication system 10 shown in FIG. 3 through FIG. 5 includes an optical transmitter 21 which transmits coded light after a plurality of optical frequency chips, in which a plurality of light with different optical frequencies are coded by a predetermined code, are modulated by the transmission data, an optical receiver 22 which receives the coded light from the optical transmitter 21, processes the received coed light based on local light, takes out the transmission data in the optical transmitter 21, and outputs it, and an optical transmission line 8S for transmitting the coded light between the optical transmitter 21 and the optical receiver 22.

The optical transmitter 21 includes a light source 31 which outputs optical frequency chip being composed by a plurality of light with different optical frequencies, a modulator 32 which modulates the light from the light source 31 by the transmission data and outputs it, and a coder 33 which selects optical frequency chip depending on the code from the light source 31 and passes thereof.

The optical frequency chip which the light source 31 outputs maintains coherence. As for the light source 31, a pulse light source such as mode locked laser with coherence in which phases of a plurality of different lights are synchronized, and a light source which outputs light to be used as a seed for modulation from seed light source, and light generated by side band of modulation are applicable. Further, a combination of a plurality of light sources may be used when mutual coherence between lights could maintain so that either Equation (11) which will be dealt with later or relational expressions shown in from Equation (22) to Equation (33) after due consideration to coded light to be used as the receiving object are filled.

Although in FIG. 3, the light source 31 and the modulator 32 are shown to have separate configuration, these may be integrated when a plurality of lights are modulated directly in the light source 31. Further, as the configuration of the optical transmitter 21, although the configuration including the light source 31, the modulator 32, and the coder 33 is shown, the order of the modulator 32 and the coder 33 may be exchanged. Further, a coder with delays depending on optical frequency may be used as the coder 33. In this case, it is necessary that propagation delays from the modulator 32 to detectors 61a, 61b which will be dealt with later should be made nearly uniform for every optical frequency chip. In the optical code communication system 10 shown in FIG. 4 which is an example of 4-chips, the same necessity also applies to detectors 61a-1, 61a-2, 61b-1, 61b-2, and in the optical code communication system 10 shown in FIG. 5, the same necessity also applies to differential detectors 64a, 64b. When the light source 31 itself outputs a plurality of lights corresponding to the code or the modulator 32 passes only the light corresponding to the code, the coder 33 may be omitted. Further, in a case where the optical transmitter 21 outputs coded light including different optical frequency chips according to the value of the transmission data, the optical transmitter 21 includes a plurality of coders corresponding to different codes as the coder 33. When the light source 31, the coder 33, and the modulator 32 are arranged in this order, the modulator 32 serves as a switch for selecting either of outputs from a plurality of coders, where each of light from the light source 31 is coded. Meanwhile, when the light source 31, modulator 32, and coder 33 are arranged in this order, the modulator 32 serves as a switch for switching to which coder of a plurality of coders corresponding to different codes the light from the light source 31 should be input. In this case, the optical transmitter 21 includes an optical coupler/splitter (not shown) which is connected to latter stage of the coder 33, couples coded light from a plurality of coders and outputs it, or a modulator (not shown) which is connected to latter stage of the coder 33 and performs switching of outputs from a plurality of coders in synchronization with the modulator 32. The coder 33 outputs coded light via the optical coupler/splitter (not shown) or the modulator.

For the code used for coding in the coder 32, a code with which multiple access interference is suppressed by the decoder 54, detector 61a, 61b, and adder-subtractor 63 at the receiver side is applied. In the optical code communication system 10 shown in FIG. 4 and FIG. 5, the same code also applies to detectors 61a-1, 61a-2, 61b-1, 61b-2 in FIG. 4 and to differential detectors 64a, 64b in FIG. 5. For example, as for orthogonal code in ON/OFF intensity modulation, an optical code for transmitting optical frequency chip corresponding to either of value 1 or value 0 by Hadamard code or cycle bit-shifted M-sequence code is mentioned. In the present embodiment, explanation will be given for pseudo-bipolar receiving case using unipolar code for delivery of optical frequency chip only value of which corresponds to 1 as such a code. With the optical frequency chips constituting the selected code in which optical frequency chip value is "1", the decoder 54 is composed so that they are input to either of the detector 61a at addition side or the detector 61b at subtraction side of the adder-subtractor 63 of the optical receiver 22, which will be dealt with later and are not input to other detector. Due to orthogonality of the code, the optical frequency chips in which the values of the chips constituting the code other than the receiving object are "1", input to both addition side and subtraction side with nearly uniform intensity, cancelled by differential and multiple access interference is eliminated ideally.

The optical receiver 22 further includes a local oscillator 41 for outputting local light including a plurality of lights of which intensities are greater than light intensity of the coded light received, and their optical frequency differences with one of a plurality of lights with different optical frequencies being output from the light source 31 of the optical transmitter 21 are set to nearly intermediate frequency, respectively; an optical mixing decoder 42 which mixes coded light from the optical transmitter 21 and local light from the local oscillator 41, decodes and divides at least either of coded light from the optical transmitter 21 or local light to the object optical frequency according to the optical frequency chip in which the value of the code of receiving object of the optical receiver 22 corresponds to "1", and the non-object optical frequency according to the optical chip in which the value of the code of receiving object of the optical receivers corresponds to "0", and outputs each of object optical frequency in which coded light from the optical transmitter 21 and local light are mixed, and non-object optical frequency in which coded light from optical transmitter 21 and local light are mixed; and a detection adder-subtractor filter 43 which detects each of the object optical frequency and non-object optical frequency from the optical mixing decoder 42 passes of intermediate frequency signal of each of the object optical frequency and non-object optical frequency, subtracts the other from one of the intermediate frequency signals and outputs it. Further, the optical receiver 22 includes a demodulator (the present embodiment includes an envelope detector 45 including a rectifier or mixer and a low-pass filter which removes intermediate frequency components). Further, for two-dimensional code of optical frequency region—time region, the optical receiver 22 may include an integrator (not shown) for time integrating corresponding to 1-bit time of the transmission data.

In the present embodiment, the optical mixing decoder 42 includes a regulator 51 for regulating delays or phases of local light from the local oscillator 41, a regulator 52 for regulating delays or phases of coded light from the optical transmitter 21, an optical coupler/splitter 53 for mixing coded light from the optical transmitter 21 via the regulator 52 and local light from the local oscillator 41 via the regulator 51 and outputting them, the decoder 54 for decoding mixed light from the optical coupler/splitter 53 and outputting it, and the detection adder-subtractor filter 43 includes, in FIG. 3, the detector 61a for detecting object optical frequency from the decoder 54 and outputting it, 61b for detecting non-object optical frequency from the decoder 54 and outputting it, regulators 62a, 62b for regulating delays or phases of intermediate frequency signal from detectors 61a, 61b, respectively, the adder-subtractor 63 for subtracting the other from one of intermediate frequency signals from detectors 61a via regulator 62a, and detector 61b via regulator 62b and outputting it, and a filter 44 for passing of intermediate frequency signal to which modulation signal is multiplied.

The local oscillator 41 outputs, for example, coherent local light with intensity sufficiently greater than total of light intensity of all coded light which the optical receiver 22 receives (e.g., 20 dB). The local light includes a plurality of optical frequencies necessary for decoding for codes to be selected and necessary for cancelling codes not selected. For example, in a case where the code selected is "11110000", and signals of optical frequencies from f1 to f4 are output, and the code not selected is "10101010", and signals of optical frequencies bearing odd number are output, local light comprising of the lights of optical frequencies of f1, f2, f3, f4, f5, f7 is output. When the intensity of local light sufficiently greater than total of light intensity of all coded light is used, influences of shot noise resulting from other coded light and beat noise between coded light and coded light on the optical receiver can be neglected, as will be discussed later. In the present embodiment, although local light is designed to be output from the local oscillator 41 inside the optical receiver 22, local light supplied from the outside may be used as long as either Equation (11) which will be dealt with later or relational expressions shown in Equation (22) through Equation (33) in consideration of coded light not considered to be receiving object are satisfied.

The decoder 54 acquires coded light received by the optical receiver 22 and local light from the local oscillator 41 and divides them into light corresponding to optical frequency chip in which a value constituting the code is "1" and light corresponding to optical frequency chip in which a value constituting the code is "0", and outputs them. Of light being divided, the light corresponding to the optical frequency chip in which code of receiving object is "1" is input to the detector 61a and the light corresponding to the optical frequency chip in which code of receiving object is "0" is input to the detector 61b, respectively The detector 61a detects light corresponding to optical frequency chip in which the value of the code is "1", outputs it, and inputs it to addition side of the adder-subtractor 63 via the regulator 62a, and the detector 61b detects light corresponding to optical frequency chip in which the value of the code is "0", outputs it, and inputs it to subtraction side of the adder-subtractor 63 via the regulator 62b. Although in FIG. 3, divided in two—detectors 61a, 61b and regulators 62a, 62b, as shown in FIG. 4, signals from the detector may be divided into detectors 61a-1, 61a-2, 61b-1, 61b-2 as long as input to addition side and to subtraction side of the adder-subtractor 63 are met. In this case, regulators 62a-1, 62a-2, 62b-1, 62b-2 are connected to detectors 61a-1, 61a-2, 61b-1, 61b-2, respectively.

The adder-subtractor 63 in FIG. 3 adds and subtracts the outputs from detectors 61a, 61b and outputs it. The filter 44 passes of intermediate frequency signal from the adder-subtractor 63 and outputs it. The envelope detector 45 performs square-law detection of the intermediate frequency signal from the filter 44, takes out the transmission data in the optical transmitter 21 and outputs it. When the optical receiver 22 receives coded light being coded by other code excluding codes of the receiving object (hereinafter, "coded light being coded by other code excluding codes of the receiving object" is referred to as "coded light of other than receiving object"), for the optical frequency chip of coded light of other than receiving object in which value is "1", half of the intermediate frequency signal in the passband of the filter 44 is added in the adder-subtractor 63 and the other half is subtracted in the adder-subtractor 63, and are in cancellation relationship each other, it is cancelled by the adder-subtractor 63. In this way, optical frequency chip of code of other than receiving object with value "1" is input to the adder-subtractor 63 at both addition side and subtraction side due to orthogonality of the code with nearly uniform intensity, and cancelled by differential in the adder-subtractor 63, and ideally multiple access interference is eliminated. Meanwhile, optical frequency chips of code of receiving object with value "1", are input to either the detector 61a connected to addition side of the adder-subtractor 63 or the detector 61b connected to subtraction side of the adder-subtractor 63, and is not input to other detector. When intermediate frequency signals corresponding to the light of each frequency are nonuniform due to light intensity of a plurality of optical frequency chips constituting the signal light or polarization state, in order that codes not selected may be cancelled, intensity ratio between lights of a plurality of optical frequencies constituting the signal light or intensity ratio between lights of a plurality of optical frequencies constituting the local light is regulated to cause cancellation. The output of the adder-subtractor 63 goes through the filter 44 which passes of the modulated center frequency signal and is output as the transmission data signal from the optical transmitter 21 after subjected to square-law detection of intermediate frequency signal by the envelope detector 45. In the meantime, the envelope detector 45 applied as the demodulator takes out the transmission data by detection of intensity difference by mark value and space value of the modulated signal, and therefore, square-law detection is not specified, and when the intermediate frequency signal is directly analogue/digital converted for detection of the intensity difference, it can be replaced by digital signal processing. When digital signal processing is used, the adder-subtractor, filter, regulator can be subjected to digital signal processing after analog/digital conversion.

When output of the decoder 54 and detectors 61a, 61b are divided for every optical frequency chip as shown in FIG. 4, the output of every optical frequency chip is divided and subjected to addition/subtraction in the adder-subtractor 63 according to the code, those before the detector can be at least shared by the adder-subtractor 63 according to each code, and therefore, split loss due to split of the light for every code can be reduced. Further, in the filter 44, absolute value of a predetermined frequency difference becomes intermediate frequency, and it is a band-pass filter having passband more than nearly data rate including the intermediate frequency. The order of the adder-subtractor 63 and the filter 44 may be exchanged. In this case, filters as many as the number of inputs to the adder-subtractor 63 are connected to the previous stage of the adder-subtractor 63. When dividing by the decoder 54 results in two outputs as shown in FIG. 5, differential detectors 64a, 64b may be used in lieu of the combination of the detectors 61a, 61b and the adder-subtractor 63 shown in FIG. 3. Further, addition side and subtraction side of the adder-subtractor 63 in FIG. 3 may be exchanged. This is because signal from the detectors 61a, 61b is simply reversed by the output of the adder-subtractor 63.

When the optical receiver 22 receives only coded light being coded by the code of receiving object (hereafter "coded light being coded by the code of receiving object" is referred to as "coded light of receiving object"), for example, the transmission data is of binary of mark and space, the regulators 51, 52, 62a, 62b regulates the phases of intermediate frequency signals so that absolute value of the intermediate frequency signal in the passband of the filter 44 when the transmission data is mark and that when the transmission data is space may be different. For example, regulation is made so that transmission data of mark case is greater than space case. The same also applies to a case where the transmission data is of multiple values. In the meantime, when coded light of other than the receiving object is received, phases of the intermediate frequency signals are regulated so that absolute value of a value when output of the adder-subtractor 63 is processed under a predetermined condition, for the transmission data corresponding to the value when the output is specified to be greater by the transmission data of receiving object code may become greater than the value when output of the adder-subtractor 63 is processed under a predetermined condition, for the transmission data corresponding to absolute value of a value when output is specified to be smaller by the transmission data of receiving object code. In this case, "processed under a predetermined condition" means that to electric current value of the intermediate frequency signal in the passband of the filter 44, of signals being output from the adder-subtractor 63 when the optical receiver 22 receives coded light of other than receiving object, generation probability of each electric current value is multiplied, and summation of them is subtracted from the output of the adder-subtractor 63 for the transmission data corresponding to the value when the output of the code of receiving object is specified to be greater, and is added to the output of the adder-subtractor 63 for the transmission data corresponding to the value when the output is specified to be smaller.

The regulators 62a, 62b in FIG. 3 perform regulation in the electric stage, while the regulators 62a, 62b in FIG. 5 perform regulation in the optical stage. It may be replaced by optical stage in FIG. 3 with a similar manner as FIG. 5. Further, in FIG. 3 and FIG. 5, the regulators 62a, 62b are disposed to each of coded light and local light of previous stage of mixing in the optical coupler/splitter 53, and to either of fore and aft of the detectors 61a, 61b, and in FIG. 4, although the regulators 62a-1, 62a-2, 62b-1, 62b-2 are disposed to latter stage of the detectors 61a-1, 61a-2, 61b-1, 61b-2 of each optical frequency chip, regulators 62a, 62b, 62a-1, 62a-2, 62b-1, 62b-2 may be added or deleted as long as phases of the intermediate frequency signals can be adjusted to allow discrimination of each data. Regulators 51, 52, 62a, 62b, 62a-1, 62a-2, 62b-1, 62b-2 are preferably at least one of a dispersion regulator for regulating transmission delay due to optical frequency from that optical frequency chip is modulated in the optical transmitter 21 till the adder-subtractor 63 of the optical receiver 22, and a phase regulator for regulating propagation time of the coded light before modulation to limit the phase difference in a predetermined range corresponding to the frequency separation between optical frequency chips from the light source 31 to the detectors 61a, 61b, 61a-1, 61a-2, 61b-1, 61b-2 (FIG. 3 or FIG. 4) or to the differential detectors 64a, 64b (FIG. 5). Further, the regulator 51 is preferably a phase regulator for regulating propagation time of the local light before mixing of the coded light in the optical coupler/splitter 53 and the local light. Further, the regulator is preferably a regulator of a combination of the both. With this feature, specific phase regulation of the intermediate frequency signal is made possible.

The following description explains regulation of phase in the regulators 62a-1, 62a-2, 62b-1, 62b-2 in FIG. 4. On example where code of receiving object is "1100" and code of other than receiving object is "1010" is used. For simplicity, binary transmission of mark and space is used, and optical frequency chip with "1" value is transmitted and optical frequency chip with "0" value is not transmitted. Further, output of the decoder is considered to be independent for every optical frequency chip as shown in the decoder 54 in FIG. 4, the detector is connected independently to every output of the decoder 54 as shown in the detectors 61a-1, 61a-2, 61b-1, 61b-2 in FIG. 4, and the regulator is connected to every detectors 61a-1, 61a-2, 61b-1, 61b-2 as shown in the regulators 62a-1, 62a-2, 62b-1, 62b-2 in FIG. 4. Further, chip i of the coded light and local light in the optical coupler/splitter 53 is expressed by the following Equation (7). Each of chip numbers 1 to 4 corresponds to the optical frequency chip being detected by the detectors 61a-1, 61a-2, 61b-1, 61b-2 in this order.

$$\text{Coded light: } E_s \cos [2\pi f_i(t-\tau_{fi})+\phi_s]$$

$$\text{Local light: } E_L \cos [2\pi (f_i+f_{IF})t+\phi_L] \quad \text{Equation (7)}$$

where, i means chip number from 1 to 4, $E_S$, $E_L$ mean electric field intensity of each optical frequency chip of coded light and local light, respectively, $\phi_S$, $\phi_L$ mean initial phase of coded light and local light, respectively, $f_i$ means frequency of chip of coded light, F means frequency separation between adjoining optical frequency chips of coded light and local light, respectively, $f_{IF}$ means intermediate frequency, R means responsivities of detectors 61a-1, 61a-2, 61b-1, 61b-2. $\tau_{fi}$, $\tau_d$, $\tau_e$ and $\tau_{ci}$ mean delay of optical transmission line 81 from optical transmitter 21 to optical coupler/splitter 53, delay from optical coupler/splitter 53 to detectors 61a-i, 61a-2, 61b-1, 61b-2, delay from detectors 61a-1, 61a-2, 61b-1, 61b-2 to adder-subtractor 63, delay of regulators 62a-1, 62a-2, 62b-1, 62b-2, respectively and those other than $\tau_{ci}$ assumes the same value regardless of the optical frequency chip.

Four optical frequency chips are divided by the decoder 54 and input to the detectors 61a-1, 61a-2, 61b-1, 61b-2, respectively, detected and output. In the adder-subtractor 63, signals corresponding to optical frequency chips 1, 2 are added, and signals corresponding to optical frequency chips 3, 4 are subtracted. Addition and subtraction in the adder-subtractor 63 of each optical frequency chip and intermediate frequency signal after filtration in the filter 44 can be expressed by the following Equation (8).

$$RE_sE_L \cos [2\pi f_{IF}(t-\tau_d \tau_e-\tau_{ci})+\phi_L-\phi_s+2\pi f_i-\tau_f] \quad \text{Equation (8)}$$

When coded light of the receiving object is of mark, signals of the optical frequency chip 1 and the optical frequency chip 2 are added in the adder-subtractor 63, and a value of addition of the both can be expressed by the following Equation (9). Meanwhile, when coded light of other than the receiving object is of mark, the optical frequency chip 1 is added and signal of the optical frequency chip 3 is subtracted, a value of interference component which is subtracted between them can be expressed by the following Equation (10). Regulators 62a-1, 62a-2, 62b-1, 62b-2 are set so as to minimize interference component and to maximize signal component each expressed by Equation (10), to meet with previously mentioned relationship between the coded light of receiving object and the coded light of other than receiving object.

$$RE_sE_L \cos[2\pi f_{IF}(t-\tau_d-\tau_e-0.5\tau_{c1}-0.5\tau_{c2})+\phi_L-\phi_s+2\pi(f_1+F/2)\tau_j]\cos[\pi(F\tau_j-f_{IF}(\tau_{c1}+\tau_{c2}))] \quad \text{Equation (9)}$$

$$RE_sE_L \sin[2\pi f_{IF}(t-\tau_d-\tau_e-0.5\tau_{c1}-0.5\tau_{c3})+\phi_L-\phi_s+2\pi(f_1+F)\tau_j]\sin[\pi(F\tau_j-f_{IF}(\tau_{c1}+\tau_{c3}))] \quad \text{Equation (10)}$$

Although the present embodiment is not depending on modulation method, as a typical example, bit error rate for a case the coded light is transmitted by ASK binary transmission for mark only is shown. Coded light $E_i$ of code i (i is from 1 to K, K is natural number of 2 or more) and local light $E_L$ can be expressed by, for example, the following Equation (11).

$$E_i = \sum_{m}^{M} E_{im}\cos(2\pi f_{im}t+\phi_i), \quad \text{Equation (11)}$$

$$E_L = \sum_{m}^{M} E_{Lm}\cos(2\pi(f_{im}+f_{IF})t+\phi_L)$$

In Equation (11), $E_{im}$, $E_{Lm}$ mean electric field intensity of optical frequency chip m (m is from 1 to M, M is natural number of 2 or more) of the coded light and local light, respectively, $\phi_i$, $\phi_L$ be mean initial phase of optical frequency chip of the coded light and local light of code i, respectively. $f_{im}$, $f_{IF}$ mean frequency of chip m and intermediate frequency, respectively.

Output current of the coded light of code p after the adder-subtractor can be expressed by the following Equation (12).

$$i_p = 2R\sum_{m}^{M}\sum_{n}^{M}(\sqrt{C_{pm}C_{pn}} - \sqrt{C'_{pm}C'_{pn}})E_{Lm}E_{Ln}\cos(2\pi[m-n]Ft) + \quad \text{Equation (12)}$$

$$2R\sum_{i}^{K}\sum_{k}^{K}\sum_{m}^{M}\sum_{n}^{M}(\sqrt{C_{pm}C_{pn}} - \sqrt{C'_{pm}C'_{pn}})E_{im}E_{kn}\cos(2\pi[m-n]Ft+\phi_i-\phi_k) + 2R\sum_{m}^{M}(C_{pm}-C'_{pm})E_{pm}E_{Lm}\cos(2\pi f_{IF}t+\phi_p-\phi_L) + 2R\sum_{i;i\neq p}^{K}\sum_{m}^{M}(C_{pm}-C'_{pm})E_{im}E_{Lm}\cos(2\pi f_{IF}t+\phi_i-\phi_L) + 2R\sum_{i}^{K}\sum_{m}^{M}\sum_{n;n\neq m}^{M}(\sqrt{C_{pm}C_{pn}} - \sqrt{C'_{pm}C'_{pn}})E_{im}E_{Ln}\cos(2\pi(f_{IF}+[m-n]F)t+\phi_i-\phi_L) + n^{(t)}$$

Where, R means detector responsivity, $C_{pm}$, $C'_{pm}$ mean power transmission function of optical frequency chip m of the decoder 54 of receiving object of code p, n(t) means noise of the optical receiver 22. The first term and the second term are direct detection components of local light and coded light in the output current equation, the third term is signal component of receiving object, the fourth term and the fifth term are multiple access interference component (MAI). The first term, second term and fifth term are removed by the filter 44 which passes of the intermediate frequency. The fourth term is ideally suppressed by orthogonality of the code. In this discussion, multiple access interference suppression ratio $\alpha_i$ of residual component of MAI current of the fourth term with respect to current component $i_{data}$ of the receiving object signal can be expressed by the following Equation (13).

$$\alpha_i = \sum_{m}^{M}(C_{pm}-C'_{pm})E_{im}E_{Lm} \Big/ \sum_{m}^{M}(C_{pm}-C'_{pm})E_{pm}E_{Lm} \quad \text{Equation (13)}$$

If, for simplicity, MAI current and multiple access interference suppression ratio are considered to be identical, the output current can be expressed by the following Equation (14).

$$i_p = 2R\sum_{m}^{M}(C_{pm}-C'_{pm})E_{pm}E_{Lm}\cos(2\pi f_{IF}t+\phi_p-\phi_L) + \quad \text{Equation (14)}$$

$$2R\sum_{i;i\neq p}^{K}\sum_{m}^{M}(C_{pm}-C'_{pm})E_{im}E_{Lm}\cos(2\pi f_{IF}t+\phi_i-\phi_L) + N(t)$$

$$= A\sqrt{\left(D_p(t)+\sum_{i;i\neq p}^{k}D_i(t)\alpha\cos\phi'_i\right)^2 + \left(\sum_{i;i\neq p}^{k}D_i(t)\alpha\sin\phi'_i\right)^2}$$

$$\cos(2\pi f_{IF}t+\phi_p-\phi_L)+x\cos(2\pi f_{IF}t+\phi_p-\phi_L)-y\sin(2\pi f_{IF}t+\phi_p-\phi_L)$$

$$= r\cos(2\pi f_{IF}t+\varphi+\phi_p-\phi_L),$$

$$r^2 = \left(\sqrt{\left(D_p(t)+\sum_{i;i\neq p}^{k}D_i(t)\alpha\cos\phi'_i\right)^2 + \left(\sum_{i;i\neq p}^{k}D_i(t)\alpha\sin\phi'_i\right)^2}+x\right)^2 + y^2$$

$$= (A'+x)^2+y^2$$

$$= x'^2+y^2,$$

$$\phi'_i = \phi_i - \phi_p$$

$$\varphi = \tan^{-1}\left(\frac{y}{x'}\right), \quad D_i(t) = \begin{cases} 1 & (;\text{mark}) \\ 0 & (;\text{space}) \end{cases}$$

In Equation (14), $r^2$ means envelope, $\phi_i'$ means phase difference, A means signal intensity, N(t) means noise passed through the filter 44, $\alpha$ means multiple access interference suppression ratio, $D_i(t)$ means data value which assumes a value of 0 or 1 of code i at time t, and x and y mean noise of in-phase component and quadrature component. When phase difference is $\pi$ and 0 as conditions for in-phase MAI component becomes maximum, A' can be rewritten using MAI current intensity z as Equation (15).

$$A' = \sqrt{\left(D_p(t)+\sum_{i;i\neq p}^{k}D_i(t)\alpha\cos\phi'_i\right)^2 + \left(\sum_{i;i\neq p}^{k}D_i(t)\alpha\sin\phi'_i\right)^2} \quad \text{Equation (15)}$$

$$\approx \sqrt{(AD_p(t)+z)^2}z =$$

$$\sum_{i;i\neq p}^{k}AD_i(t)\alpha\theta_i, \quad \theta_i = \begin{cases} 1, & \phi'_i=0 \\ -1, & \phi'_i=\pi \end{cases}$$

Further, probability density of z can be expressed by the following Equation (16).

$$p(z) = \sum_{u=0}^{k-1} \sum_{s=0}^{u} \frac{k-1C_u}{2^{k-1}} \frac{uC_s}{2^u} \delta(z-(2s-u)\alpha A) \quad \text{Equation (16)}$$

In Equation (16), u and s mean a number of coded light other than receiving object when data value is of mark and phase is 0, respectively. If it is supposed that x' and y are Gaussian distribution uncorrelated each other, variance $\sigma^2$ of the noise can be expressed by the following Equation (17).

$$\sigma^2 = \overline{i_s^2} + \overline{i_b^2} + \overline{i_L^2} + \overline{i_d^2} + \overline{i_{s-b}^2} + \overline{i_{b-b}^2} + \overline{i_c^2} \approx \quad \text{Equation (17)}$$

$$\overline{i_L^2} + \overline{i_c^2} \approx 2eBR \sum_m^M (C_{pm} + C'_{pm})E_{Lm}^2 + \overline{i_c^2}$$

In Equation (17), each means, from the first term, variance of shot noise of coded light of receiving object, shot noise of coded lights of other than receiving object, shot noise of local light, shot noise of dark current, beat noise between coded light of receiving object and of coded light of other than receiving object, beat noise between coded lights other than receiving object, and variance of each of other noises of receiver. Further, e means an elementary electric charge, and B means electric bandwidth of the receiver. Conditional probability density when z is given can be expressed by the following Equation (18).

$$p_z(x', y)dx'dy = \frac{e^{-\frac{(x'-A')^2+y^2}{2\sigma^2}}}{2\pi\sigma^2} \quad \text{Equation (18)}$$

$$= p_z(r, \varphi)rdrd\varphi$$

$$= \frac{re^{-\frac{(r^2+A'^2-2rA'\cos\varphi)}{2\sigma^2}}}{2\pi\sigma^2}$$

Therefore, joint probability density when z is given is expressed by the following Equation (19).

$$p_z(r) = \int_0^{2\pi} \frac{re^{-\frac{r^2+A'^2-2rA'\cos\varphi}{2\sigma^2}}}{2\pi\sigma^2} d\varphi \quad \text{Equation (19)}$$

$$= \frac{r}{\sigma^2} I_0\left(\frac{rA'}{\sigma^2}\right) e^{-\frac{r^2+A'^2}{2\sigma^2}},$$

$$I_0(v) = \frac{1}{2\pi} \int_0^{2\pi} e^{v\cos\varphi} d\varphi$$

In Equation (19), $I_0$ (v) is modified Bessel function of first kind and Zeroth order. In this case, bit error rate can be expressed by the following Equation (20)

$$BER = \frac{1}{2}\left[\int_0^T \int_{-\infty}^{\infty} p(z)p_z(r)dzdr + \int_T^{\infty}\int_{-\infty}^{\infty} p(z)p_z(r)dzdr\right] \quad \text{Equation (20)}$$

$$= \frac{1}{2}\sum_{u=0}^{k-1}\sum_{s=0}^{u}\frac{k-1C_{uu}C_s}{2^{k-1+u}}$$

$$\left[\int_0^T \frac{r}{\sigma^2} I_0\left(\frac{r(A+(2s-u)\alpha A)}{\sigma^2}\right) e^{-\frac{r^2+(A+(2s-u)\alpha A)^2}{2\sigma^2}}dr + \int_T^{\infty}\frac{r}{\sigma^2} I_0\left(\frac{r|(2s-u)|\alpha A}{\sigma^2}\right) e^{-\frac{r^2+((2s-u)\alpha A)^2}{2\sigma^2}}dr\right]$$

$$= \sum_{u=0}^{k-1}\sum_{s=0}^{u}\frac{k-1C_{uu}C_s}{2^{k-1+u}}\left[1-Q\left(\frac{A+(2s-u)\alpha A}{\sigma}, \frac{T}{\sigma}\right) + Q\left(\frac{|(2s-u)\alpha A|}{\sigma}, \frac{T}{\sigma}\right)\right]$$

$$Q(a, b) = \int_{-\infty}^{\infty} tI_0(at)e^{-\frac{t^2+a^2}{2}}dt$$

$$T = A/2$$

In Equation (20), Q (a,b) is Marcum's Q-function and T is threshold level of mark and space. When the number of codes is sufficient for binominal distribution approximation by Gaussian distribution, it can be further approximated by the following Equation (21).

$$BER \approx \frac{1}{2}\exp\left(-\frac{1}{8}\frac{i_{data}^2}{\sigma^2+i_{MAI}^2}\right) \approx \quad \text{Equation (21)}$$

$$\frac{1}{2}\exp\left(-\frac{1}{8}\frac{i_{data}^2}{2eBR\sum_m^M(C_{pm}+C'_{pm})E_{Lm}^2+\overline{i_c^2}+MAI}\right)$$

where, $$MAI = \overline{i_{MAI}^2}$$

In Equation (21), MAI is variance of MAI electric current value and its value is $(K-1) (i_{data})^2 \alpha^2/2$. Results of measurement obtained in the present embodiment with "2-optical transmitters/1-optival receiver" composition will be explained referring to FIG. 5.

As the prior condition, the light source 31 at the optical transmitter 21 side and the local oscillator 41 are constituted by laser diode (LD) (not shown) for outputting a seed light, synthesizer (not shown), and intensity modulator (not shown). The intensity modulator is driven by sinusoidal wave of 12.5 GHz from the synthesizer, and seed light itself from the LD and frequency separation F of double side band constitute 3-optical frequency chip of 12.5 GHz. Phase of the coded light and local light is adjusted by electric delay line from the synthesizer till the intensity modulator for side band generation or optical delay line of intensity modulator latter stage for side band generation. These delay lines constitute apart of the regulator of this composition. Optical frequency of the coded light and optical frequency of local light are separated by intermediate frequency of 2.5 GHz. Mach-Zehnder interferometer with FSR of 40 GHz and 20 GHz is used for the coder 33. The optical transmitter 21 constitutes in these coders 33 a coded light with code "0011" of receiving object and code "0101" of other than receiving object. The coded light is modulated by the intensity modulator (modulator 32 in FIG. 5) for data modulation with pseudo random pattern of $2^7-1$ of 1 G bit/s. In the optical receiver 22, 2ch optical filter with 25 GHz separation is used as the decoder 54. An optical delay line (not shown) and an optical attenuator (not shown) are inserted between the decoder 54 and the differential detector for compensation of phase difference and intensity difference of both routes. Regulators 51, 52, 62a, 62b are composed by the optical delay line and previously mentioned electric or optical delay line.

Figure 6A:
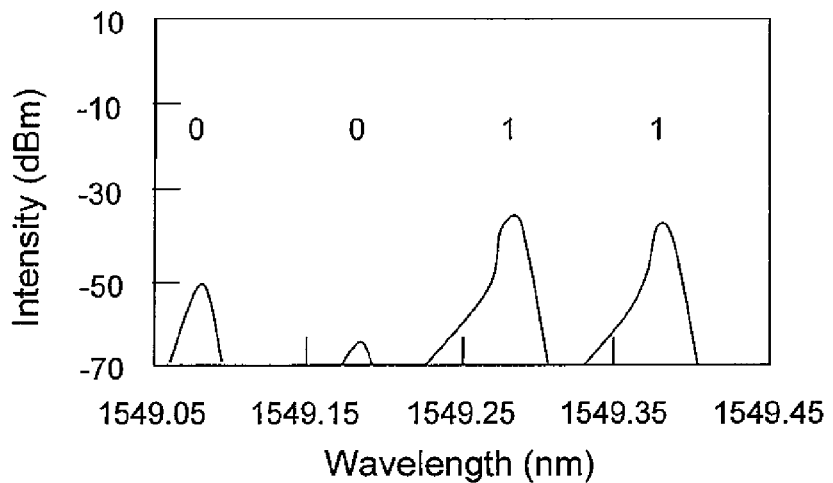
FIG. 6(a) shows light spectra of coded light of receiving object.
Figure 6B:
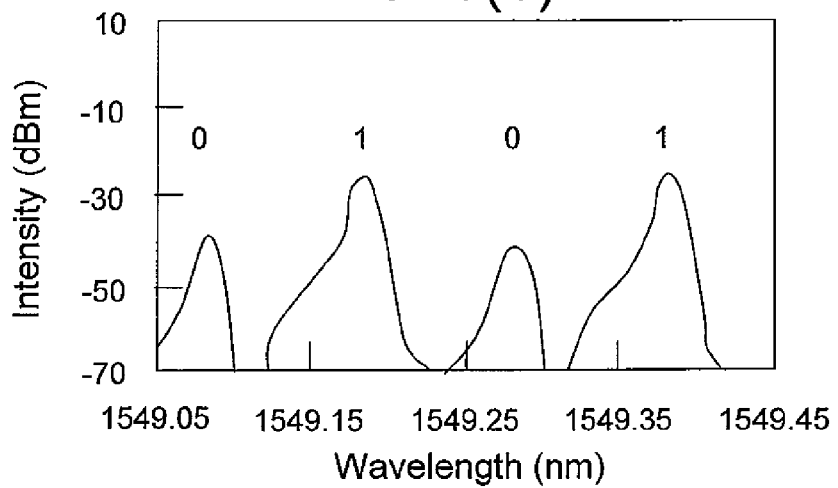
FIG. 6(b) shows light spectra of coded light of other than receiving object.
Figure 6C:
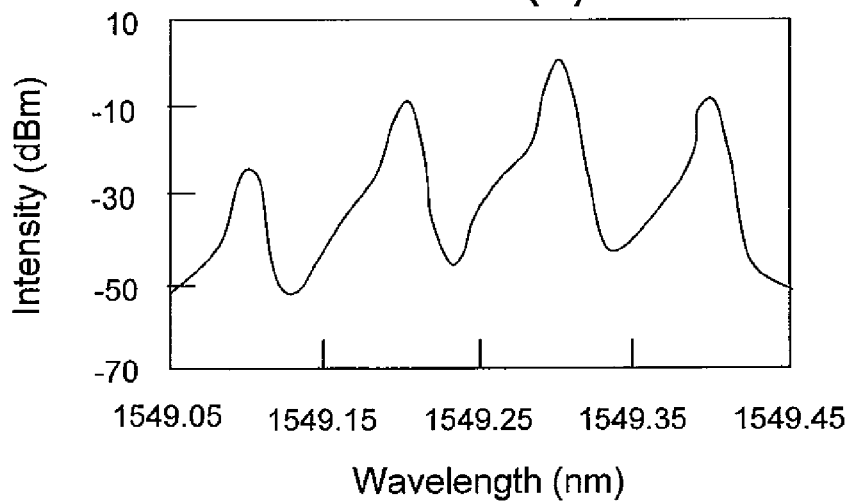
FIG. 6(c) shows light spectra of the local light.
Figure 7A:
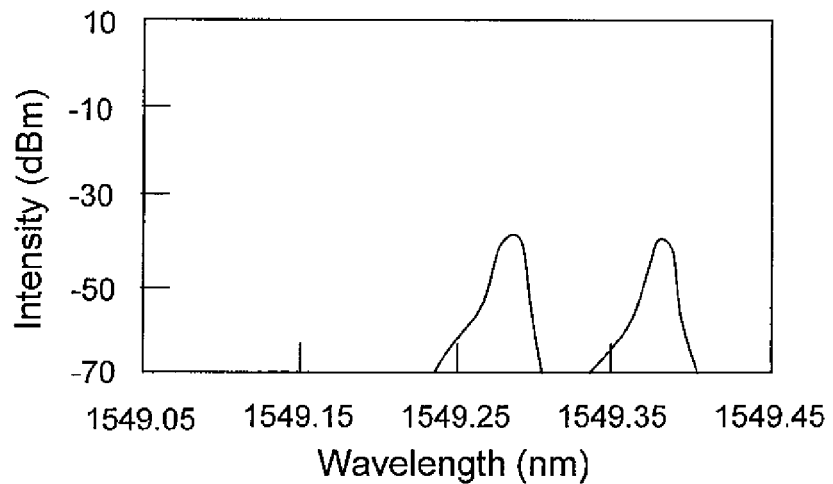
FIG. 7(a) shows light spectra of coded light of receiving object.
Figure 7B:
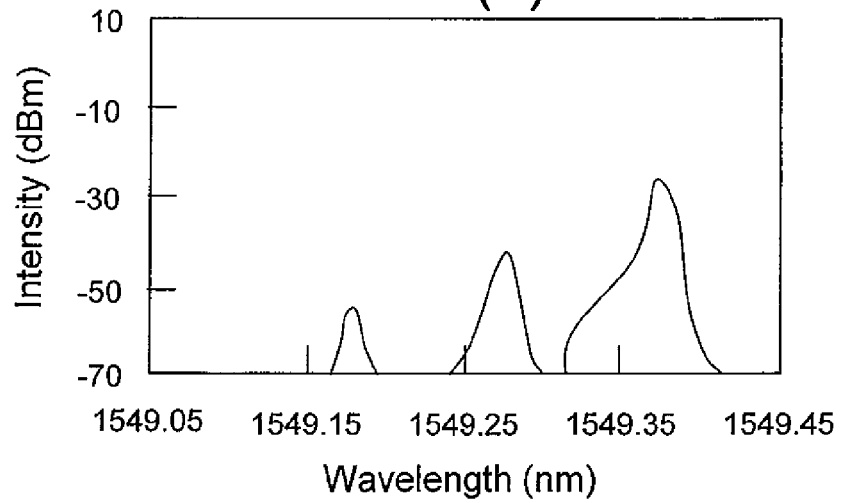
FIG. 7(b) shows light spectra of coded light of other than receiving object.
Figure 7C:
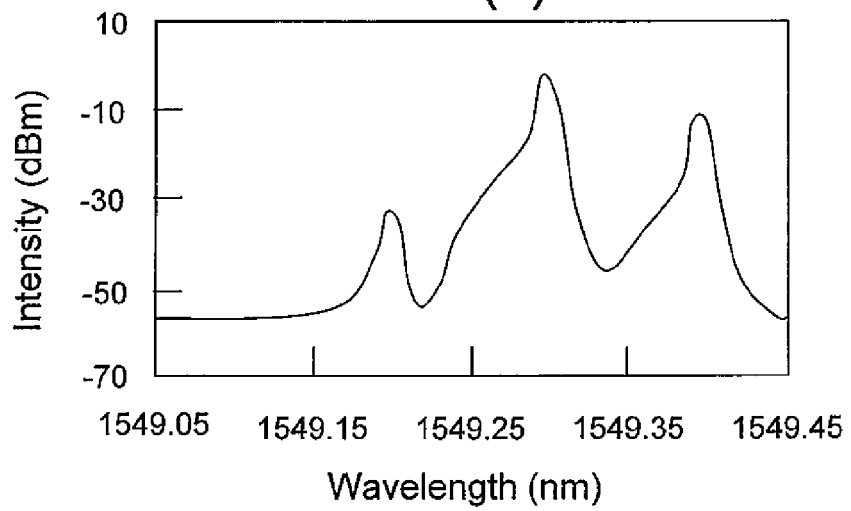
FIG. 7(c) shows light spectra of the local light.
Figure 8A:
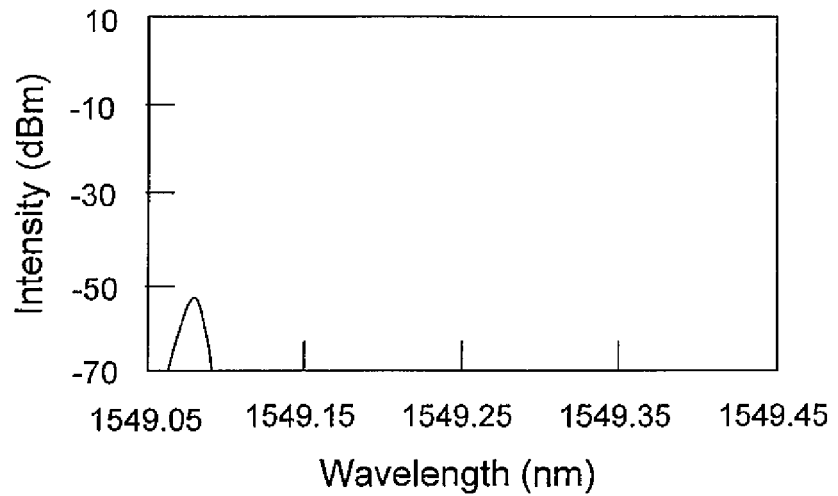
FIG. 8(a) shows light spectra of coded light of receiving object.
Figure 8B:
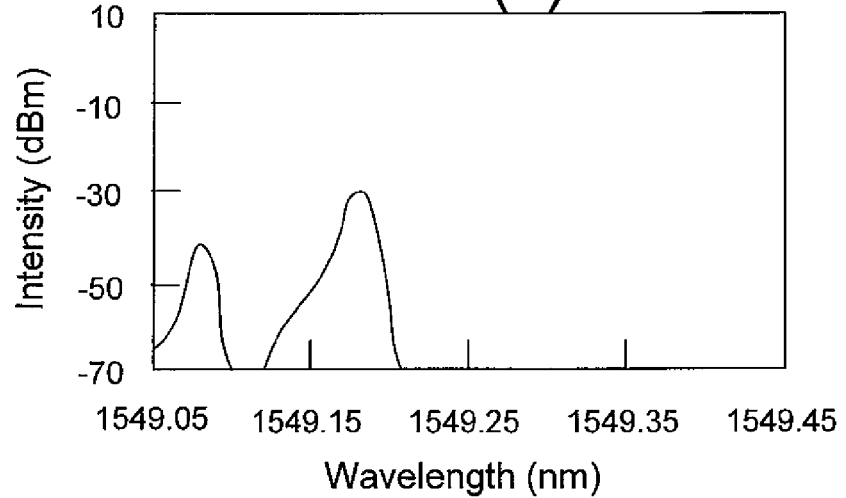
FIG. 8(b) shows light spectra of coded light of other than receiving object.
Figure 8C:
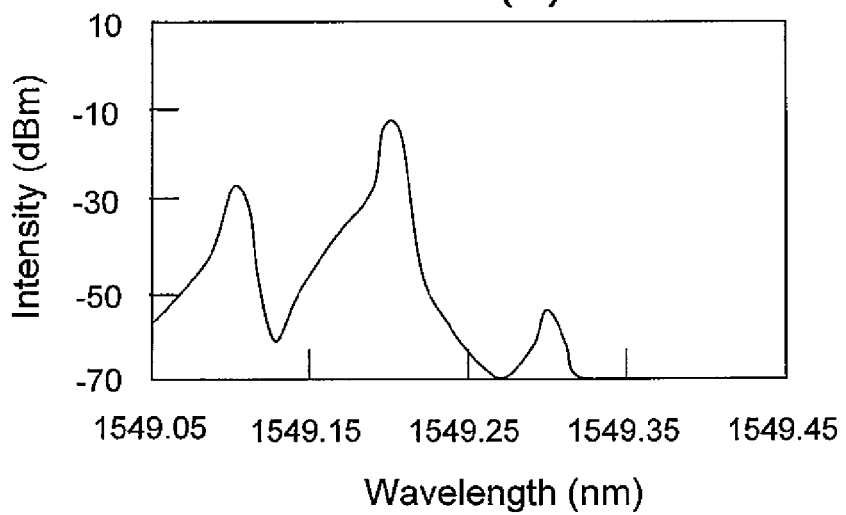
FIG. 8(c) shows light spectra of the local light.

Light spectra of coded light of receiving object, coded light of other than receiving object and local light being input to the decoder 54 are shown in FIG. 6(a), FIG. 6(b), and FIG. 6(c). Light spectra of coded light of receiving object, coded light of other than receiving object and local light being input to the detector 64a are shown in FIG. 7(a), FIG. 7(b), and FIG. 7(c). Light spectra of coded light of receiving object, coded light of other than receiving object and local light being input to the detector 64b are shown in FIG. 8(a), FIG. 8(b), and FIG. 8(c). In particular, FIG. 6(a), FIG. 7(a), and FIG. 8(a) show light spectra of coded light of receiving object, FIG. 6(b), FIG. 7(b), and FIG. 8(b) show light spectra of coded light of other than receiving object, FIG. 6(c), FIG. 7(c), and FIG. 8(c) show light spectra of the local light.

The output of the differential detectors 64a, 64b is, after being amplified by the intermediate frequency amplifier, filtered by the filter 44 which passes from 1.25 GHz to 3.75 GHz, and is decoded by the envelope detector 45 comprising diodes and low-pass filter. Multiple access interference suppression ratio α in which nonuniformity of intensities of the optical frequency chips is taken into account is 30.7 dB.

Figure 9:
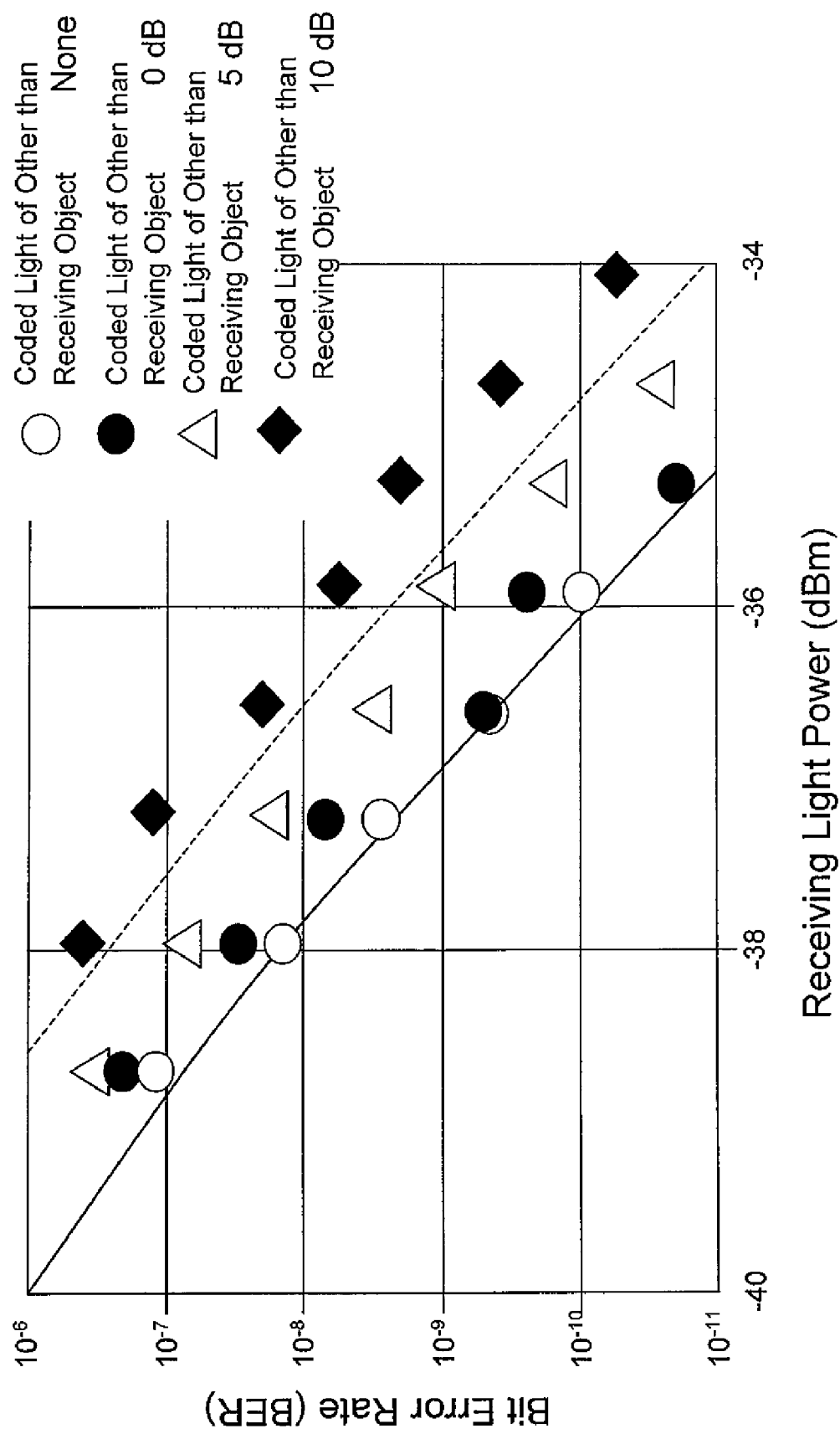
FIG. 9 is a drawing showing a relationship between receiving light power and bit error rate of coded light of the receiving object.

FIG. 9 shows bit error rate of the coded light of receiving object for cases where there is coded light of other than receiving object and there is no coded light of other than receiving object. Unfilled circle means a case where there is no coded light of other than receiving object, and filled circle, unfilled triangle, filled diamond show bit error rate when there is coded light of other than receiving object with intensity greater than the intensity of the coded light which results in bit error rate of $10^{-9}$ when there is no coded light of other than receiving object by 0, 5, and 10 dB, respectively, thereby simulating cases where the number of coded light is large. Solid line and dotted line mean calculated value based on Equation (20) when intensity of the coded light of other than receiving object using measured parameters is 0 dB and 10 dB, respectively.

Figure 2:
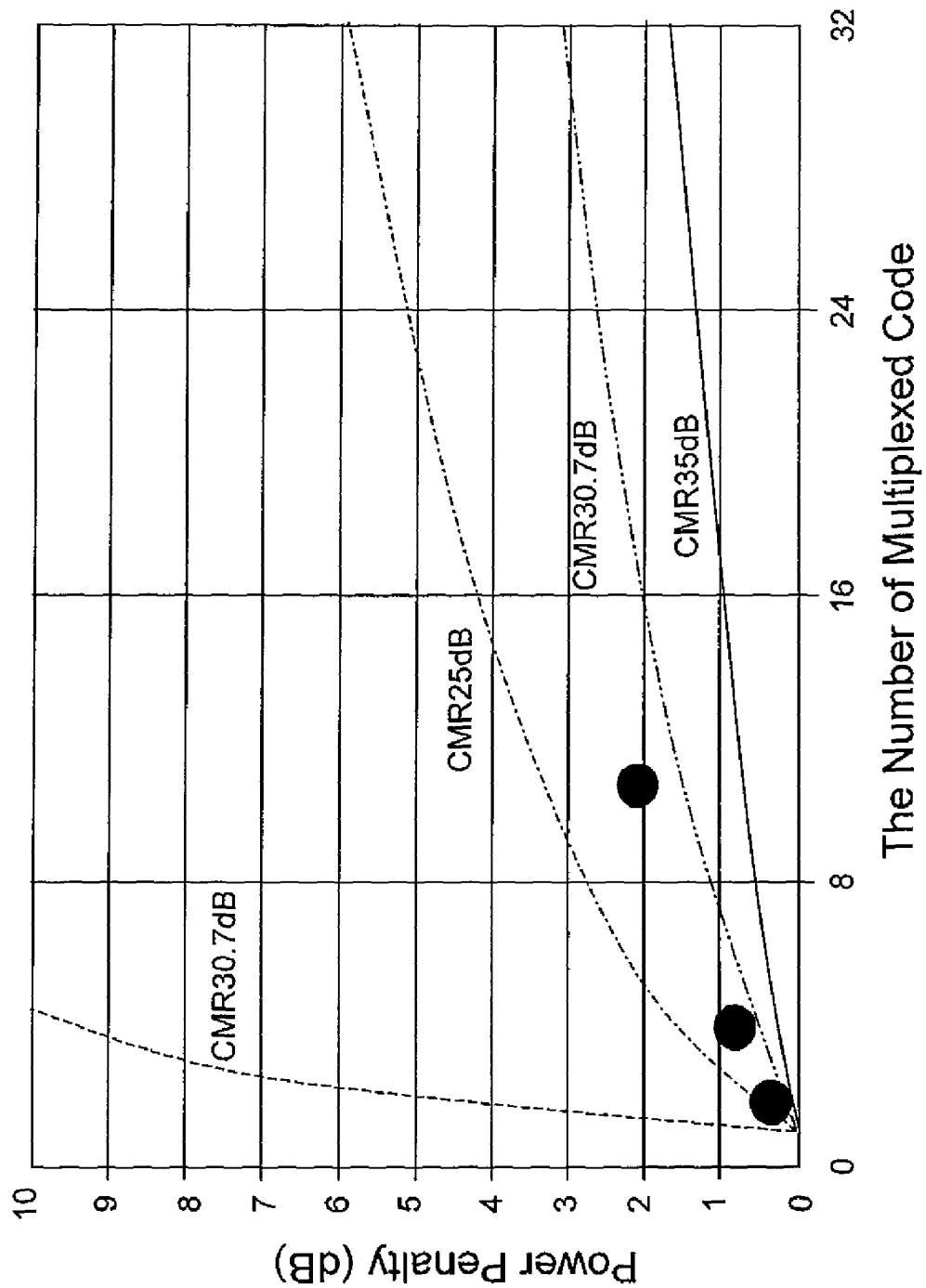
FIG. 2 is a drawing showing a relationship between the number of multiplexed codes and power penalty of ASK heterodyne envelope detection according to the conventional example and the present invention.

FIG. 2 shows power penalty at bit error rate $10^{-9}$ which follows Equation (20) where horizontal axis represents the number of multiplexed codes. Dashed-dotted line, dashed-two dotted line and solid line show cases where multiple access interference suppression ratio α is 25, 30.7, and 35 dB, respectively. Improvement effects are apparent as compared to the calculated values of conventional example shown by dotted lines. Filled circle shows actual measurements for coded light intensity of other than receiving object of 0, 5, and 10 dB, and measurements nearly agree with the calculated values. Although calculated values based on Equation (20) are shown here, nearly same agreement is obtainable with calculated values based on Equation (21).

Using general equations, the present embodiment is expressed as follows: For simplicity, although values of the transmission data are shown by binary transmission of mark and space and in a state where there is no coded light of other than receiving object, the same expressions may be used even with multiple values or there is coded light of other than receiving object. When i-th light constituting local light reaching the detector 61a is expressed by $eA_{L1\_i}$, j-th light constituting coded light when the value of the transmission data is mark is expressed by $eA_{m1\_j}$, j-th light constituting coded light when the value of the transmission data is space is expressed by $eA_{s1\_j}$, i-th light constituting local light reaching the detector 61b is expressed by $eB_{L1\_i}$, j-th light constituting coded light when the value of the transmission data is mark is expressed by $eB_{m1\_j}$, j-th light constituting coded light when the value of the transmission data is space is expressed by $eB_{s1\_j}$, passband of the filter 44 is expressed by ΣΣ, and summation relating to i and j is expressed by SE, square of beat current summation of mark which is summation relating to i and j of beat current in the passband Be of the filter 44, of beat current between local light and the coded light when the value of the transmission data is mark, is greater than square of beat current summation of space which is summation relating to i and j of beat current in the passband Be of the filter 44, of beat current between local light and the coded light when the value of the transmission data are space, and can be expressed by Equation (24). Here, summation relating to i and j of beat current between the coded light of mark and local light can be expressed by Equation (22), and summation relating to i and j of beat current between the coded light of space and local light can be expressed by Equation (23).

$$\Sigma\Sigma\{eA_{L1\_i} \cdot eA_{m1\_j}Be - eB_{L1\_i} \cdot eB_{m1\_j}Be\} \quad \text{Equation (22)}$$

$$\Sigma\Sigma\{eA_{L1\_i} \cdot eA_{s1\_j}Be - eB_{L1\_i} \cdot eB_{s1\_j}Be\} \quad \text{Equation (23)}$$

$$(\Sigma\Sigma\{eA_{L1\_i} \cdot eA_{m1\_j}Be - eB_{L1\_i} \cdot B_{m1\_j}Be\})^2 < (\Sigma\Sigma\{eA_{L1\_i} \cdot eA_{s1\_j}Be - eB_{L1\_i} \cdot B_{s1\_j}Be\})^2 \quad \text{(Equation 24)}$$

In the present embodiment, data transmission by a plurality of lights with different optical frequencies can be detected by means of coherent detection using relational expressions shown in Equation (24). Explanation will be made hereafter based on the modulation method.

a) ASK Case

When electric field intensity of i-th light $eA_{L1\_i}$ constituting local light reaching the detector 61a is expressed by $E_{L1\_i}$, its frequency is expressed by $f_{L1\_i}$, its initial phase is expressed by $\Phi A_{L1\_i}$, electric field intensity of j-th light $eA_{m1\_j}$ constituting coded light when the value of the transmission data are mark is expressed by $DAm_{s1\_j}EA_{s1\_j}$, its frequency is expressed by $f_{s1\_j}$, its phase is expressed by $\Phi A_{s1\_j}$, its cosine of angular difference of polarization state relative to light constituting corresponding local light is expressed by $PA_{s1\_j}$, electric field intensity of j-th light $eA_{s1\_j}$ constituting coded light when the value of the transmission data are space is expressed by $DAs_{s1\_j}EA_{s1\_j}$, its frequency is expressed by $f_{s1\_j}$, its phase is expressed by $\Phi A_{s1\_j}$, its cosine of angular difference of polarization state relative to light constituting corresponding local light is expressed by $PA_{s1\_j}$, electric field intensity of i-th light $eB_{L1\_i}$ constituting local light reaching the detector 61b is expressed by $EB_{L1\_i}$, its frequency is expressed by $f_{L1\_i}$, its initial phase is expressed by $\Phi B_{L1\_i}$, electric field intensity of j-th light $eB_{m1\_j}$ constituting coded light when the value of the transmission data are mark is expressed by $DBm_{s1\_j}EB_{s1\_j}$, its frequency is expressed by $f_{s1\_j}$, its phase is expressed by $\Phi B_{s1\_j}$, its cosine of angular difference of polarization state relative to light constituting corresponding local light is expressed by $PB_{s1\_j}$, electric field intensity of j-th light $eB_{s1\_j}$ constituting coded light when the value of the transmission data are space is expressed by $DBs_{s1\_j}EB_{s1\_j}$, its frequency is expressed by $f_{s1\_j}$, its phase is expressed by $\Phi B_{s1\_j}$, and its cosine of angular difference of polarization state relative to light constituting corresponding local light is expressed by $PB_{s1\_j}$, square of beat summation of mark which is summation relating to i and j of beat current in the passband Be of the filter 44, of beat current between local light and the coded light when the value of the transmission data are mark is greater than square of beat summation of space which is summation relating to i and j of beat current in the passband Be of the filter 44 of beat current between local light and the coded light when the value of the transmission data are space, and Equation (27) should be true. Here, summation relating to i and j of beat current between coded light of mark and local light can be expressed by Equation (25), and summation relating to i and j of beat current with coded light of space and local light can be expressed by Equation (26).

$$\Sigma\Sigma\{PA_{s1\_j}EA_{L1\_j}DAm_{s1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}DBm_{s1\_j}EB_{s1\_j}\cos[2\pi(f_{s1\_j}-f_{L1\_i})+\Phi B_{s1\_j}-\Phi B_{L1\_i}]Be\}$$ Equation (25)

$$\Sigma\Sigma\{PA_{s1\_j}EA_{L1\_j}DAm_{s1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}DBs_{s1\_j}EB_{s1\_j}\cos[2\pi(f_{s1\_j}-f_{L1\_i})+\Phi B_{s1\_j}-\Phi B_{L1\_i}]Be\}$$ Equation (26)

$$(\Sigma\Sigma\{PA_{s1\_j}EA_{L1\_j}DAm_{s1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}DBm_{s1\_j}EB_{s1\_j}\cos[2\pi(f_{s1\_j}-f_{L1\_i})+\Phi B_{s1\_j}-\Phi B_{L1\_i}]Be\})^2<(\Sigma\Sigma\{PA_{s1\_j}EA_{L1\_j}DAs_{s1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}DBs_{s1\_j}EB_{s1\_j}\cos[2\pi(f_{s1\_j}-f_{L1\_i})+\Phi B_{s1\_j}-\Phi B_{L1\_i}]Be\})^2$$ Equation (27)

B) FSK (No. 1) case

First, an example where the same local light is used in mark case and space case will be shown. When electric field intensity of i-th light $eA_{L1\_i}$ constituting local light reaching the detector 61a is expressed by $EA_{L1\_i}$, its frequency is expressed by $f_{L1\_i}$, its phase is expressed by $\Phi A_{L1\_i}$, electric field intensity of j-th light $eA_{m1\_j}$ constituting coded light when the value of the transmission data are mark is expressed by $EA_{s1\_j}$, its frequency is expressed by $fm_{s1\_j}$, its phase is expressed by $\Phi A_{s1\_j}$, its cosine of angular difference of polarization state relative to light constituting corresponding local light is expressed by $PA_{s1\_j}$, electric field intensity of j-th light $eA_{s1\_j}$ constituting coded light when the value of the transmission data are space is expressed by $EA_{s1\_j}$, its frequency is expressed by $fs_{s1\_j}$, its phase is expressed by $\Phi A_{s1\_j}$, its cosine of angular difference of polarization state relative to light constituting corresponding local light is expressed by $PA_{s1\_j}$, electric field intensity of i-th light $eB_{L1\_i}$ constituting local light reaching the detector 61b is expressed by $EB_{L1\_i}$, its frequency is expressed by $f_{L1\_i}$, its phase is expressed by $\Phi B_{L1\_i}$, electric field intensity of j-th light $eB_{m1\_j}$ constituting coded light when the value of the transmission data are mark is expressed by $EB_{s1\_j}$, its frequency is expressed by $fm_{s1\_j}$, its phase is expressed by $\Phi B_{s1\_j}$, its cosine of angular difference of polarization state relative to light constituting corresponding local light is expressed by $PB_{s1\_j}$, electric field intensity of j-th light $eB_{s1\_j}$ constituting coded light when the value of the transmission data are space is expressed by $EB_{s1\_j}$, its frequency is expressed by $fs_{s1\_j}$, its phase is expressed by $\Phi B_{s1\_j}$, its cosine of angular difference of polarization state relative to light constituting corresponding local light is expressed by $PB_{s1\_j}$, square of beat summation of mark which is summation relating to i and j of beat current in the pass band Be of the filter 44 of beat current between local light and the coded light when the value of the transmission data are mark is greater than square of beat summation of space which is summation relating to i and j of beat current in the passband Be of the filter 44 of beat current between local light and the coded light when the value of the transmission data are space, and Equation (30) should be true. Here, summation relating to i and j of beat current between coded light of mark and local light can be expressed by Equation (28), and summation relating to i and j of beat current between coded light of space and local light can be expressed by Equation (29).

$$\Sigma\Sigma\{PA_{s1\_j}EA_{L1\_j}EA_{s1\_j}\cos[2\pi(fm_{s1\_j}-f_{L1\_i})+\Phi A_{s1\_j}-\Phi A_{L1\_i}]Be-PB_{s1\_j}EB_{L1\_i}EB_{s1\_j}\cos[2\pi(fm_{s1\_j}-f_{L1\_i})+\Phi B_{s1\_j}-\Phi B_{L1\_i}]Be\}$$ Equation (29)

$$\Sigma\Sigma\{PA_{s1\_j}EA_{L1\_j}EA_{s1\_j}\cos[2\pi(fs_{s1\_j}-f_{L1\_i})+\Phi A_{s1\_j}-\Phi A_{L1\_i}]Be-PB_{s1\_j}EB_{L1\_i}EB_{s1\_j}\cos[2\pi(fs_{s1\_j}-f_{L1\_i})+\Phi B_{s1\_j}-\Phi B_{L1\_i}]Be\}$$ Equation (28)

$$(\Sigma\Sigma\{PA_{s1\_j}EA_{L1\_j}EA_{s1\_j}\cos[2\pi(fm_{s1\_j}-f_{L1\_i})+\Phi A_{s1\_j}-\Phi A_{L1\_i}]Be-PB_{s1\_j}EB_{L1\_i}EB_{s1\_j}\cos[2\pi(fm_{s1\_j}-f_{L1\_i})+\Phi B_{s1\_j}-\Phi B_{L1\_i}]Be\})^2<(\Sigma\Sigma\{PA_{s1\_j}EA_{L1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}EB_{s1\_j}\cos[2\pi(f_{s1\_j}-f_{L1\_i})+\Phi B_{s1\_j}-\Phi B_{L1\_i}]Be\})^2$$ Equation (30)

C) FSK (No. 2) case

An example where shift of frequency is large, and different local light is used in mark case and space case will be explained hereafter. When electric field intensity corresponding to coded light when the value of the transmission data are mark, of i-th light $eA_{L1\_i}$ constituting local light reaching the detector 61a, is expressed by $EAm_{L1\_i}$, its frequency is expressed by $fm_{L1\_i}$, its phase is expressed by $\Phi Am_{L1\_i}$, electric field intensity corresponding to coded light when the value of the transmission data are space is expressed by $EAs_{L1\_i}$, its frequency is expressed by $fs_{L1\_i}$, its phase is expressed by $\Phi As_{L1\_i}$, electric field intensity of j-th light $eA_{m1\_j}$ constituting coded light when the value of the transmission data is mark is expressed by $EAm_{s1\_j}$, its frequency is expressed by $fm_{s1\_j}$, its phase is expressed by $\Phi Am_{s1\_j}$, its cosine of angular difference of polarization state relative to light constituting corresponding local light is expressed by $PAm_{s1\_j}$, electric field intensity of j-th light $eA_{s1\_j}$ constituting coded light when the value of the transmission data are space is expressed by $EAs_{s1\_j}$, its frequency is expressed by $fs_{s1\_j}$, its phase is expressed by $\Phi As_{s1\_j}$, its cosine of angular difference of polarization state relative to light constituting corresponding local light is expressed by $PAs_{s1\_j}$, electric field intensity of i-th light $eB_{L1\_i}$ constituting local light reaching the detector 61b corresponding to coded light when the value of the transmission data are mark, is expressed by $EBm_{L1\_i}$, its frequency is expressed by $fm_{L1\_i}$, its phase is expressed by $\Phi DBm_{L1\_i}$, electric field intensity of i-th light constituting local light reaching the detector 61b corresponding to coded light when the value of the transmission data are space is expressed by $EBs_{L1\_i}$, its frequency is expressed by $fs_{L1\_i}$, its phase is expressed by $\Phi Bs_{L1\_i}$, electric field intensity of j-th light $eB_{m1\_j}$ constituting coded light when the value of the transmission data are mark is expressed by $EBm_{s1\_j}$, its frequency is expressed by $fm_{s1\_j}$, its phase is expressed by $\Phi B_{s1\_j}$, its cosine of angular difference of polarization state relative to light constituting corresponding local light is expressed by $PBm_{s1\_j}$, electric field intensity of j-th light $eB_{s1\_j}$ constituting coded light when the value of the transmission data is space is expressed by $EBs_{s1\_j}$, its frequency is expressed by $fs_{s1\_j}$, its phase is expressed by $\Phi Bs_{s1\_j}$, and its cosine of angular difference of polarization state relative to light constituting corresponding local light is expressed by $PBs_{s1\_j}$, square of beat summation of mark which is summation relating to i and j of beat current in the passband Be of the filter 44 of beat current between local light and the coded light when the value of the transmission data are mark is greater than square of beat summation of space which is summation relating to i and j of beat current in the passband Be of the filter 44 of beat current between local light and the coded light when the value of the transmission data are space, and Equation (33) should be true. Here, summation relating to i and j of beat current with coded light of mark and local light can be expressed by Equation (31), and summation relating to i and j of beat current with coded light of space and local light can be expressed by Equation (32).

$$\Sigma\Sigma\{PAm_{s1\_j}EAm_{L1\_i}EAm_{s1\_j}\cos$$
$$[2\pi(fm_{s1\_j}-fm_{L1\_i})t+\Phi Am_{s1\_j}-$$
$$\Phi Am_{L1\_i}]Be-PBm_{s1\_j}EB_{L1\_i}EBm_{s1\_j}\cos$$
$$[2\pi(fm_{s1\_j}-fm_{L1\_i})t+\Phi Bm_{s1\_j}-\Phi Bm_{L1\_i}]Be\} \quad \text{Equation (31)}$$

$$\Sigma\Sigma\{PAs_{s1\_j}EAs_{L1\_i}EAs_{s1\_j}\cos[2\pi(fs_{s1\_j}-$$
$$fs_{L1\_i})t+\Phi As_{s1\_j}-\Phi As_{L1\_i}]Be-PBs_{s1\_j}$$
$$EB_{sL1\_i}EB_{s1\_j}\cos[2\pi(fs_{s1\_j}-fs_{L1\_i})t+$$
$$\Phi B_{s1\_j}-\Phi B_{L1\_i}]Be\} \quad \text{Equation (32)}$$

$$(\Sigma\Sigma\{PAm_{s1\_j}EAm_{L1\_i}EAm_{s1\_j}\cos[2\pi(fm_{s1\_j}-$$
$$fm_{L1\_i})t+\Phi Am_{s1\_j}-\Phi Am_{L1\_i}]Be-PBm_{s1\_j}$$
$$EBm_{L1\_i}EBm_{s1\_j}\cos[2\pi(fm_{s1\_j}-$$
$$fm_{L1\_i})t+\Phi Bm_{s1\_j}-\Phi Bm_{L1\_i}]Be\})^2 <$$
$$(\Sigma\Sigma\{PAs_{s1\_j}EAs_{L1\_i}EAs_{s1\_j}\cos$$
$$[2\pi(fs_{s1\_j}-fs_{L1\_i})t+\Phi As_{s1\_j}-\Phi As_{L1\_i}]Be-$$
$$PBs_{s1\_j}EBs_{L1\_i}EBs_{s1\_j}\cos[2\pi(fs_{s1\_j}-$$
$$fs_{L1\_i})t+\Phi Bs_{s1\_j}-\Phi Bs_{L1\_i}]Be\})^2 \quad \text{Equation (33)}$$

Second Embodiment

Figure 10:
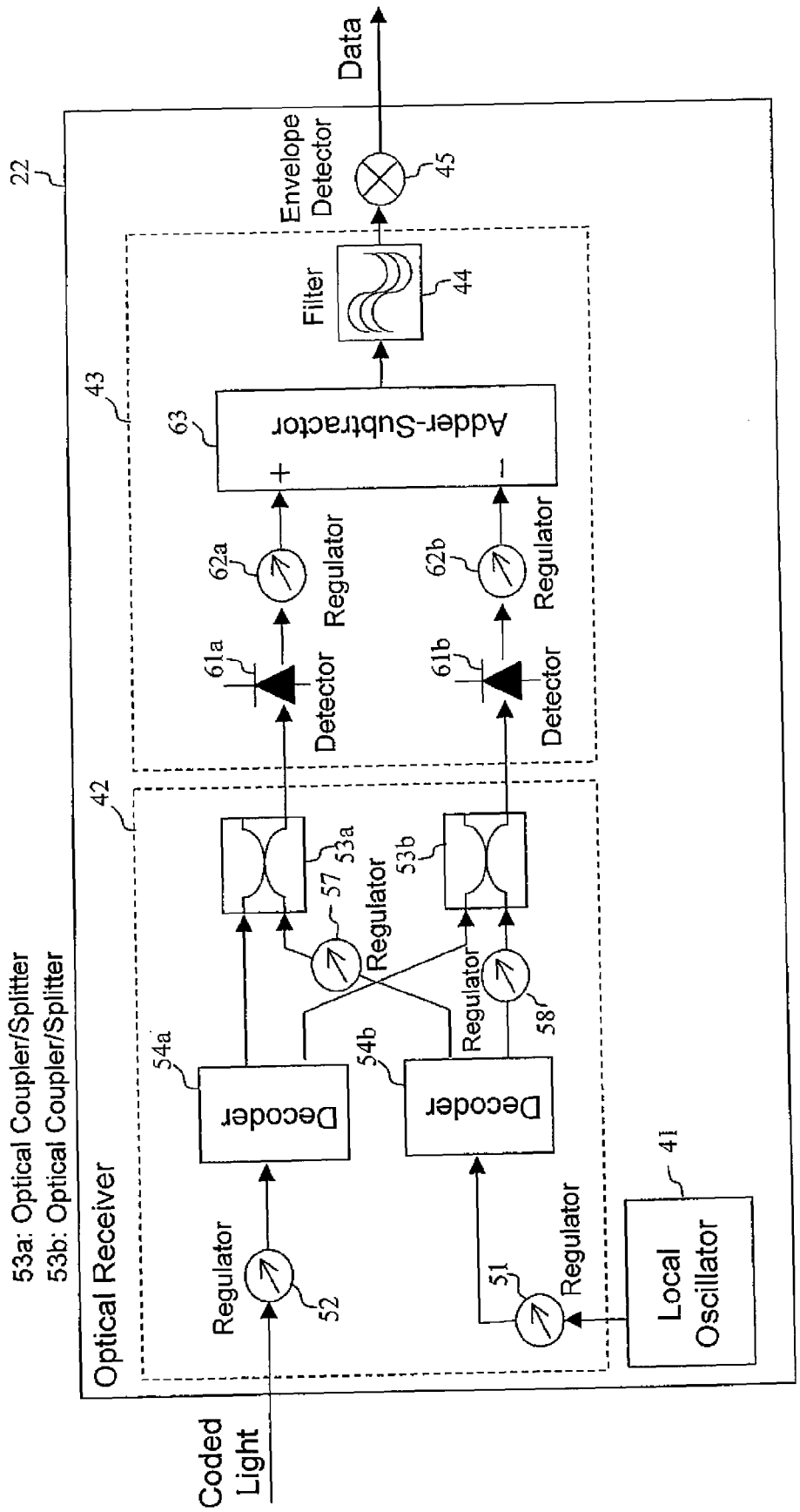
FIG. 10 is an outline configuration diagram showing an optical receiver explained in one embodiment.
Figure 11:
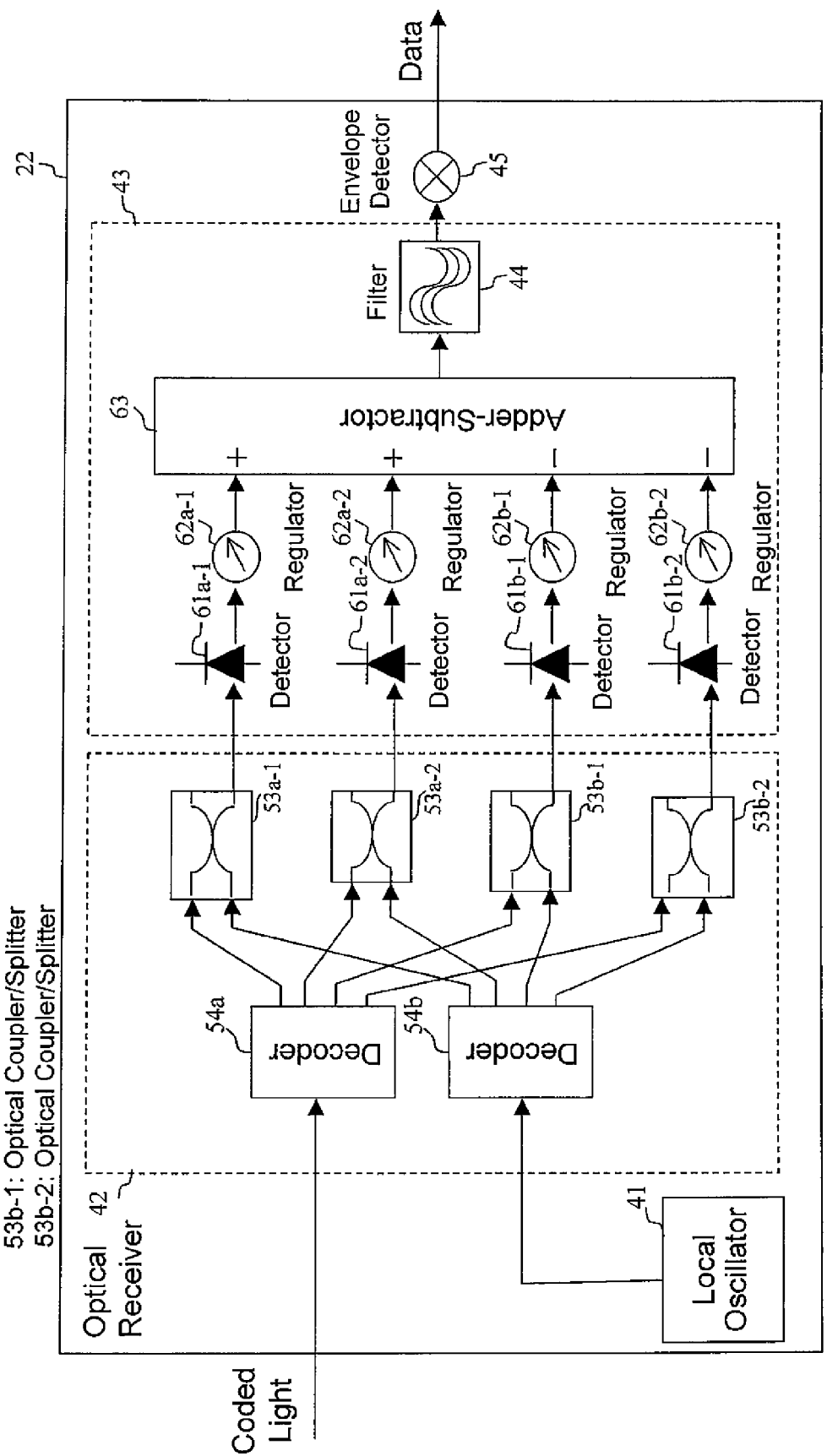
FIG. 11 is an outline configuration diagram showing the optical receiver explained in one embodiment.

FIG. 10 and FIG. 11 show outline configuration diagram of an optical receiver relating to the present embodiment. This is corresponding to the optical receiver 22 in FIG. 3 and FIG. 4 explained in the first embodiment. The optical receiver 22 shown in FIG. 10 and FIG. 11 is different from the optical receiver 22 shown in FIG. 3 and FIG. 4 in that the local light and the coded light are mixed by optical coupler/splitters 53a, 53b after being divided according to code of receiving object by decoder 54a, 54b, respectively. In FIG. 11, output from the decoders 54a, 54b is output being divided for every optical frequency chip, and the optical coupler/splitters 53a-1, 53a-2, 53b-1, 53b-2 mix the light for every frequency chip and output them. Components shown in FIG. 10 and FIG. 11 bearing the same symbol as used in FIG. 3 and FIG. 4 show the same components and explanation thereof will be omitted.

Although with the optical receiver 22 shown in FIG. 3 and FIG. 4, as the passband corresponding to each of optical frequency chips, passband upto the local light apart by as much as the intermediate frequency is necessary in addition to modulation broadening of the coded light, with the optical receiver 22 shown in FIG. 10 and FIG. 11, since local light and coded light are passed through the decoders 54a, 54b separately, for the decoder 54a used for the coded light, passband may remain about modulation broadening in addition to linewidth of the coded light, and for the decoder 54b used the local light, passband may remain about linewidth of the local light, and these are advantageous. However, with the optical receiver 22 shown in FIG. 10 and FIG. 11, the local light and coded light are mixed by the optical coupler/splitters 53a, 53b after being divided to the decoders 54a, 54b, and therefore, phase difference between the local light and coded light is different depending on path length from dividing point till mixing point. For this reason, adjustments are necessary so that phase difference may be equal in light wavelength order. For this adjustment, regulators 57, 58 are provided between decoder and optical coupler/splitter at local light side. This may be at coded light side instead of local light side or both sides. Although shown in FIG. 10 only, the same also applies to the embodiment in FIG. 11 and onward, FIG. 12 to FIG. 15, FIG. 19 to FIG. 24.

Third Embodiment

Figure 12:
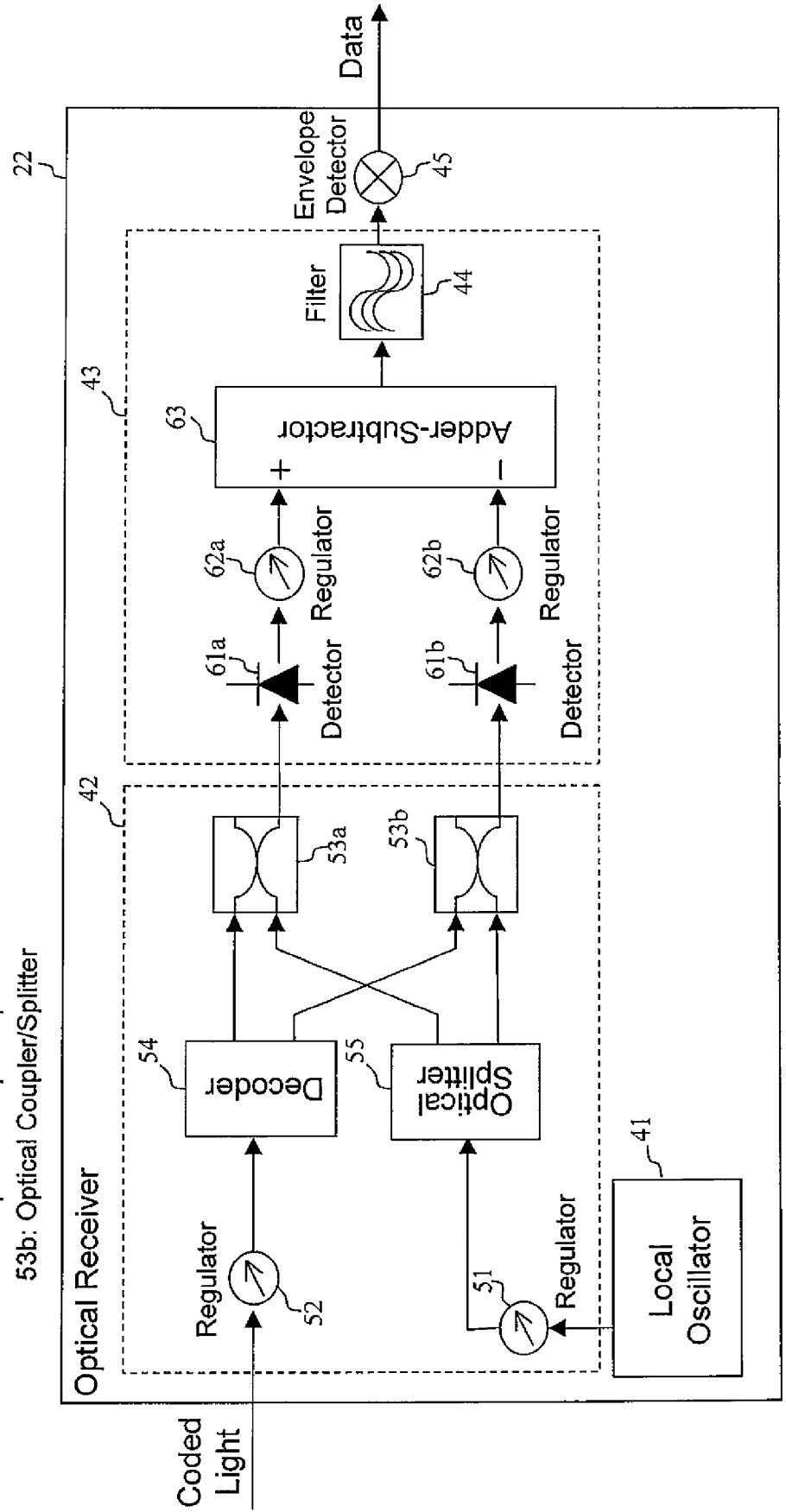
FIG. 12 is an outline configuration diagram showing the optical receiver explained in one embodiment.
Figure 13:
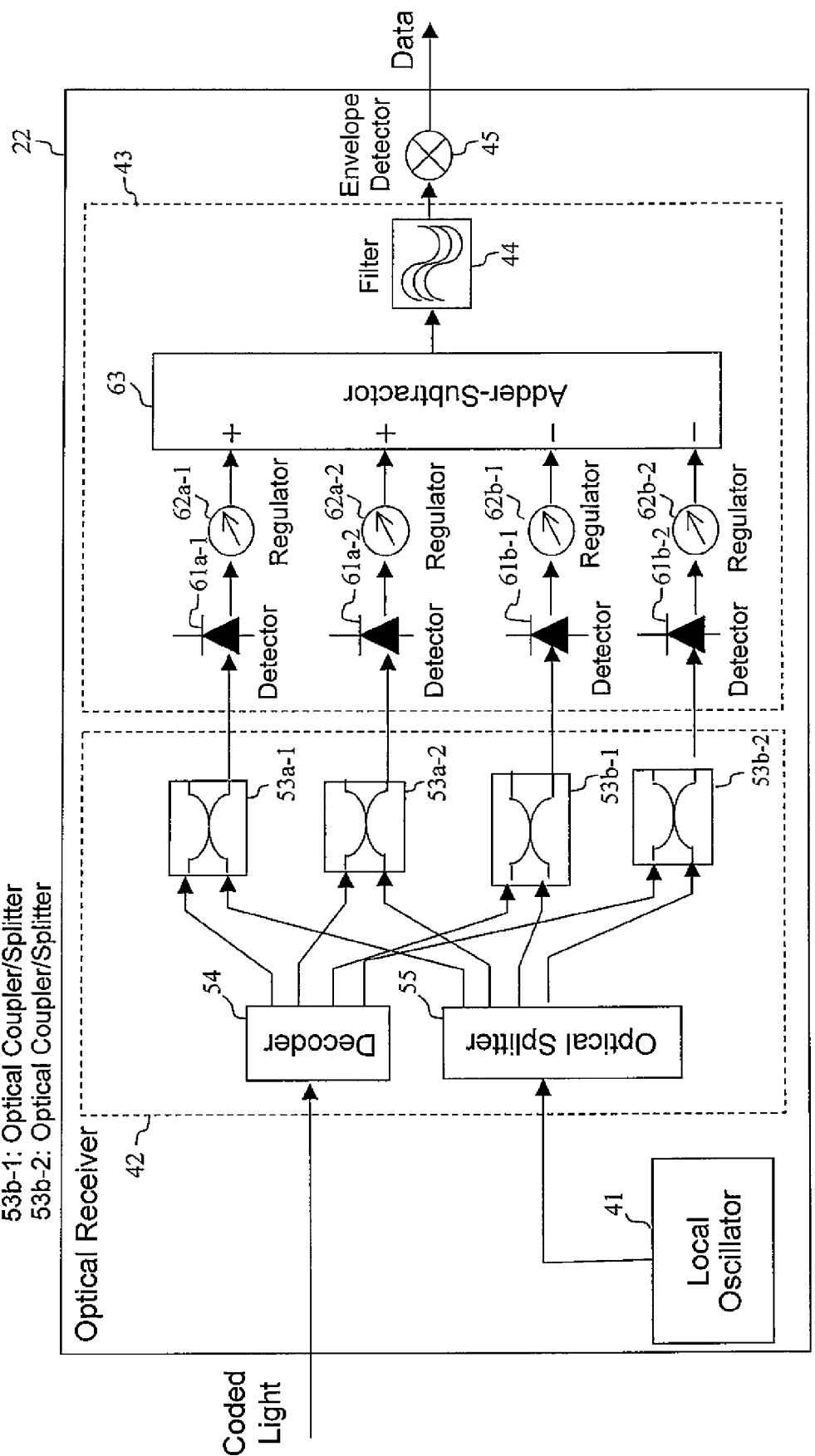
FIG. 13 is an outline configuration diagram showing the optical receiver explained in one embodiment.

Outline configuration diagram of an optical receiver relating to the present embodiment is shown in FIG. 12 and FIG. 13. This corresponds to the optical receiver 22 shown in FIG. 3 and FIG. 4 explained in the first embodiment. With the optical receiver shown in FIG. 12 and FIG. 13, the decoder 54a at coded light side in the optical receiver 22 in FIG. 10 and FIG. 11 is replaced by the decoder 54, and the decoder 54b at local light side in the optical receiver 22 is replaced by an optical splitter 55. Components shown in FIG. 12 and FIG. 13 bearing the same symbol as used in FIG. 10 and FIG. 11 show the same components and explanation thereof will be omitted.

With the optical receiver 22 shown in FIG. 12 and FIG. 13, when optical loss of the decoder 54b at local light side in the optical receiver 22 in FIG. 10 and FIG. 11 is greater than optical loss of the optical splitter 55 for splitting the local light, optical loss can be reduced as compared with the optical receiver 22 in FIG. 10 and FIG. 11. Other effects are similar to those obtained by the optical receiver 22 in FIG. 10 and FIG. 11, and requirement of the passband of the decoder 54 can be reduced as compared with the optical receiver 22 in FIG. 3 and FIG. 4.

Fourth Embodiment

Figure 14:
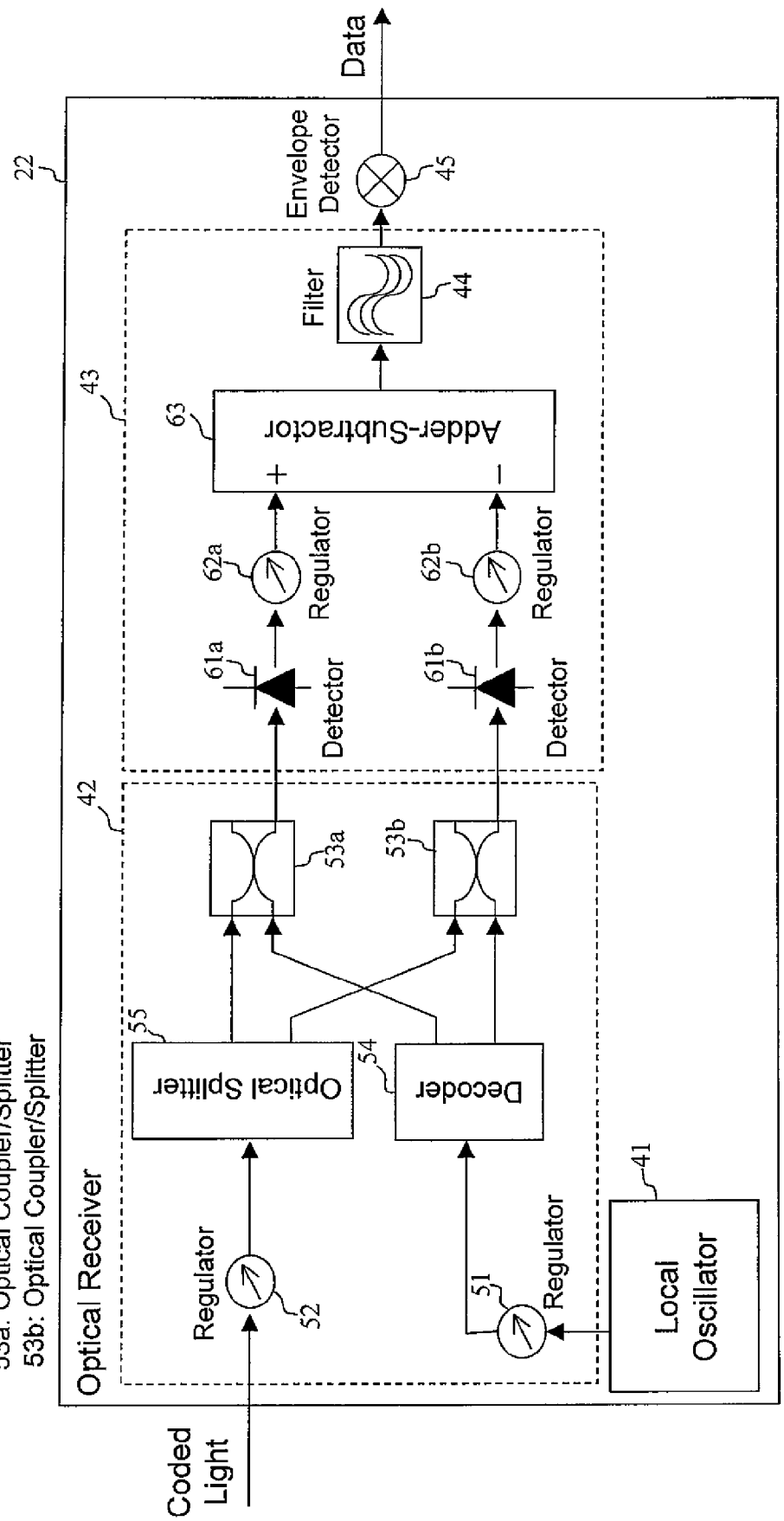
FIG. 14 is an outline configuration diagram showing the optical receiver explained in one embodiment.
Figure 15:
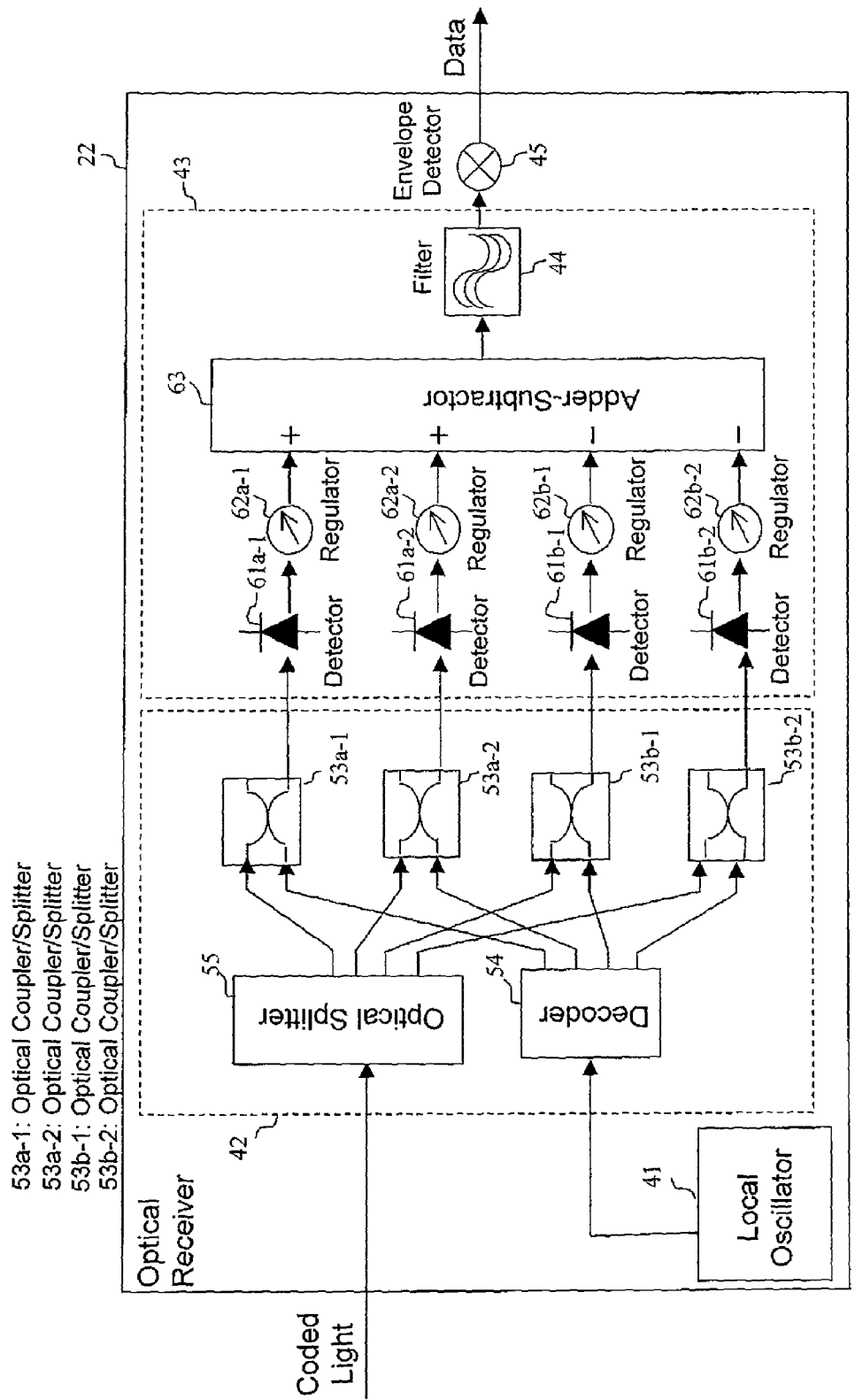
FIG. 15 is an outline configuration diagram showing the optical receiver explained in one embodiment.

FIG. 14 and FIG. 15 show outline configuration diagram of an optical receiver relating to the present embodiment. This is corresponding to the optical receiver in FIG. 3 and FIG. 4 explained in the first embodiment. The optical receiver 22 in FIG. 14 and FIG. 15 has such a configuration that the decoder 54a at coded light side in the optical receiver 22 in FIG. 10 and FIG. 11 is replaced by the optical splitter 55, and the decoder 54b at coded light side in the optical receiver 22 is replaced by the decoder 54. Components shown in FIG. 14 and FIG. 15 bearing the same symbol as used in FIG. 10 and FIG. 11 show the same components and explanation thereof will be omitted.

With the optical receiver 22 shown in FIG. 14 and FIG. 15, when optical loss of the decoder 54b at local light side in the optical receiver 22 in FIG. 10 and FIG. 11 is greater than optical loss of the optical splitter 55 for splitting the local light, optical loss can be reduced as compared with the optical receiver 22 in FIG. 10 and FIG. 11. Further, the requirement of the passband of the decoder 54 can be reduced as compared with the optical receiver 22 in FIG. 12 and FIG. 13. Other effects are similar to those obtained by the optical receiver 22 in FIG. 10 and FIG. 11, and requirement of the passband of the decoder 54 can be reduced as compared with the optical receiver 22 in FIG. 3 and FIG. 4.

Fifth Embodiment

Figure 16:
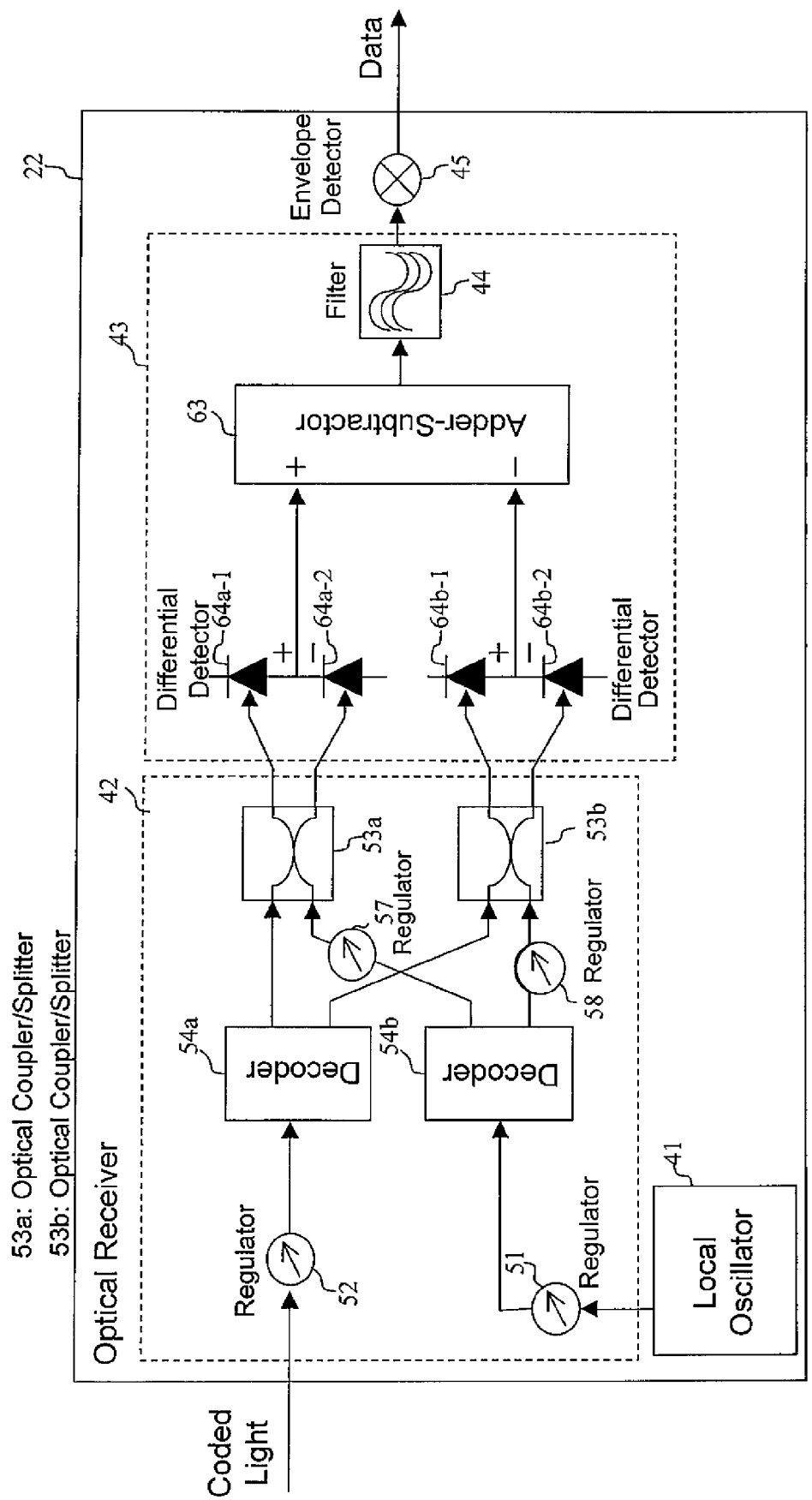
FIG. 16 is an outline configuration diagram showing the optical receiver explained in one embodiment.

FIG. 16 shows outline configuration diagram of an optical receiver relating to the present embodiment. Composition of the optical coupler/splitter for mixing the local light and coded light and the detector of the optical receiver 22 in FIG. 16 is different from that of FIG. 10. That is, the optical coupler/splitter in FIG. 16 is optical coupler/splitters 53a, 53b each outputting two outputs, and the detector is differential detectors 64a-1, 64a-2, 64b-1, 64b-2 receiving two outputs of the optical coupler/splitters 53a, 53b. Further, the optical receiver 22 in FIG. 16 includes regulators 57, 58 corresponding to the regulators 62a, 62b in FIG. 10. Components shown in FIG. 16 bearing the same symbol as used in FIG. 10 and FIG. 11 show the same components and explanation thereof will be omitted.

For example, when an ideal 2×2 optical coupler/splitter, which outputs two inputs of coded light and local light with phase difference of n as different two outputs, is used, and when the optical coupler/splitters 53a, 53b input mixed light to the differential detectors 64a-1, 64a-2, 64b-1, 64b-2 with nearly same path length and perform differential detection, reduction in direct detection components of the coded light and local light which result in noises relative to signal components, and common mode noises such as beat components between coded lights is made possible.

Similar configuration is applicable to a configuration of each optical receiver 22, in which coded light and local light are mixed by the optical coupler/splitters 53a, 53b, 53a-1, 53a-2, 53b-1, 53b-2 at latter stage than the decoders 54, 54a, 54b in FIG. 11, FIG. 12, FIG. 13, FIG. 14 and FIG. 15. In other words, such a configuration is used that optical coupler/splitters 53a, 53b, 53a-1, 53a-2, 53b-1, 53b-2 each outputs two outputs, the two outputs of each optical coupler/splitter are detected by the differential detectors 64a-1, 64a-2, 64b-1, 64b-2 in FIG. 16.

Sixth Embodiment

In the present embodiment, detection method of the optical receiver is different from the detection method in the optical receiver 22 explained in FIG. 3 to FIG. 5, and FIG. 10 to FIG. 15. With the optical receiver 22 in FIG. 3 to FIG. 5, and FIG. 10 to FIG. 15, square-law detection by means of the envelope detector 45 is applied, while in the present embodiment, synchronous detection is performed in lieu of the envelope detection. First, homodyne at optical stage, where optical frequency and phase of each of optical frequency chips constituting the coded light and each of optical frequency chips constituting the local light are synchronized, will be explained. In this case, a phase regulating circuit (not shown) for regulating phase of the local oscillator 41 for optical phase synchronization is provided in lieu of the envelope detector 45 of the optical receiver 22 in FIG. 3 to FIG. 5 and FIG. 10 to FIG. 15. Although the phase regulating circuit preferably performs phase synchronization for output signal of the adder-subtractor 63, with such a configuration that optical detection is performed for every optical frequency chip as shown in FIG. 4, FIG. 11, FIG. 13, and FIG. 15, phase may be regulated by adding the phase from the detectors 61a-1, 61a-2, 61b-1, 61b-2 to the adder-subtractor 63 to each of the output signal.

Further, with the optical receiver 22 in FIG. 3 to FIG. 5 and FIG. 10 to FIG. 15, although it is necessary that difference of absolute values of the output of the adder-subtractor 63 is different for the value of the transmission data, in the present embodiment, envelope detection is not performed and negative values are conceivable, and therefore, the requirement is that output value are different. For this reason, the regulators 62a, 62b, 62a-1, 62a-2, 62b-1, 62b-2 in FIG. 3 to FIG. 5 and FIG. 10 to FIG. 15 are regulated so that output values, not absolute values, may become different according to values of the transmission data. When optical frequency chip to be transmitted is replaced in mark case and in space case, there is such an advantage that signal intensity is eventually doubled as compared with a case where values of one case are transmitted.

The present embodiment is expressed as follows using general equations with a similar manner as the first embodiment. For simplicity, although values of the transmission data are shown by binary transmission of mark and space and in a state where there is no coded light of other than receiving object, the same expressions may be used even with multiple values or there is coded light of other than receiving object. When i-th light constituting local light reaching the detectors 61a, 61a-1, 61a-2 is expressed by $eA_{L1\_i}$, j-th light constituting coded light when the value of the transmission data is mark is expressed by $eA_{m1\_j}$, j-th light constituting coded light when the value of the transmission data is space is expressed by $eA_{s1\_j}$, i-th light constituting local light reaching the detectors 61b, 61b-1, 61b-2 is expressed by $eB_{L1\_i}$, j-th light constituting coded light when the value of the transmission data is mark is expressed by $eB_{m1\_j}$, j-th light constituting coded light when the value of the transmission data is space is expressed by $eB_{s1\_j}$, passband of the filter 44 is expressed by Be, and summation relating to and j is expressed by $\Sigma\Sigma$, beat current summation of mark which is summation relating to i and j of beat current in the passband Be of the filter 44, of beat current between local light and the coded light when the value of the transmission data is mark is greater than beat current summation of space which is summation relating to i and j of beat current in the passband Be of the filter 44, of beat current between local light and the coded light when the value of the transmission data are space, and can be expressed by Equation (36). Here, summation relating to i and j of beat current between the coded light of mark and local light can be expressed by Equation (34), and summation relating to i and j of beat current between the coded light of space and local light can be expressed by Equation (35).

$$\Sigma\Sigma\{eA_{L1\_j} \cdot eA_{m1\_j} Be - eB_{L1\_i} \cdot eB_{m1\_j} Be\} \quad \text{Equation (34)}$$

$$\Sigma\Sigma\{eA_{L1\_j} \cdot eA_{s1\_j} Be - eB_{L1\_i} \cdot eB_{s1\_j} Be\} \quad \text{Equation (35)}$$

$$\Sigma\Sigma\{eA_{L1\_j} \cdot eA_{m1\_j} Be - eB_{L1\_i} \cdot eB_{m1\_j} Be\} < \Sigma\Sigma \{eA_{L1\_j} \cdot eA_{s1\_j} Be - eB_{L1\_i} \cdot eB_{s1\_j} Be\} \quad \text{Equation (36)}$$

In the present embodiment, detection of data transmission by a plurality of lights with different optical frequencies can be made by coherent detection using relational expressions shown in Equation (36). Explanation will be made hereafter based on the modulation method.

a) ASK Case

When electric field intensity of i-th light $eA_{L1\_i}$ constituting local light reaching the detectors 61a, 61a-1, 61a-2 is expressed by $EA_{L1\_j}$, its frequency is expressed by $f_{L1\_i}$, its phase is expressed by $\Phi A_{L1\_i}$, electric field intensity of j-th light $eA_{m1\_j}$ constituting coded light when the value of the transmission data are mark is expressed by $DAm_{s1\_j}EA_{s1\_j}$, its frequency is expressed by $f_{s1\_i}$, its phase is expressed by $\Phi A_{s1\_i}$, its cosine of angular difference of polarization state relative to light constituting corresponding local light is expressed by $PA_{s1\_j}$, electric field intensity of j-th light $eA_{s1\_j}$ constituting coded light when the value of the transmission data are space is expressed by $DA_{s\_j}EA_{s1\_j}$, its frequency is expressed by $f_{s1\_j}$, its phase is expressed by $\Phi A_{s1\_j}$, its cosine of angular difference of polarization state relative to light constituting corresponding local light is expressed by $PA_{s1\_j}$, electric field intensity of i-th light $eB_{L1\_i}$ constituting local light reaching the detectors 61b, 61b-1, 61b-2 is expressed by $EB_{L1\_i}$, its frequency is expressed by $f_{L1\_i}$, its initial phase is expressed by $\Phi B_{L1\_i}$, electric field intensity of j-th light $eB_{m1\_j}$ constituting coded light when the value of the transmission data are mark is expressed by $DBm_{s1\_j}EB_{s1\_i}$, its frequency is expressed by $f_{s1\_j}$, its phase is expressed by $\Phi B_{s1\_j}$, its cosine of angular difference of polarization state relative to light constituting corresponding local light is expressed by PBS, j, electric field intensity of j-th light $eB_{s1\_j}$ constituting coded light when the value of the transmission data are space is expressed by $DBs_{s1\_j}EB_{s1\_j}$, its frequency is expressed by $f_{s1\_j}$, its phase is expressed by $\Phi B_{s1\_j}$, and its cosine of angular difference of polarization state relative to light constituting corresponding local light is expressed by $PB_{s1\_j}$, beat summation of mark which is summation relating to i and j of beat current with coded light in the passband Be of the filter 44 of beat current between local light and the coded light when the value of the transmission data are mark is greater than the beat summation of space which is summation relating to i and j of beat current with coded light in the passband Be of the filter 44 of beat current between local light and the coded light when the value of the transmission data are space, and Equation (39) should be true. Here, summation relating to i and j of beat current between coded light of mark and local light can be expressed by Equation (37), and summation relating to i and j of beat current between coded light of space and local light can be expressed by Equation (38).

$$\Sigma\Sigma\{PA_{s1\_j}EA_{L1\_i}DAm_{s1\_j}EA_{s1\_j}\cos$$
$$[2\pi(f_{s1\_j}-f_{L1\_i})+\Phi A_{s1\_j}-\Phi A_{L1\_i}]Be-PB_{s1\_j}$$
$$EB_{L1\_i}DBm_{s1\_j}EB_{s1\_j}\cos[2\pi(f_{s1\_j}-f_{L1\_i})+\Phi B_{s1\_j}-\Phi B_{L1\_i}]Be\} \qquad \text{Equation (37)}$$

$$\Sigma\Sigma\{PA_{s1\_j}EA_{L1\_i}DAs_{s1\_j}EA_{s1\_j}\cos[2\pi(f_{s1\_j}-f_{L1\_i})+\Phi A_{s1\_j}-\Phi A_{L1\_i}]Be-PB_{s1\_j}EB_{L1\_i}$$
$$DBs_{s1\_j}EB_{s1\_j}\cos[2\pi(f_{s1\_j}-f_{L1\_i})+\Phi B_{s1\_j}-\Phi B_{L1\_i}]Be\} \qquad \text{Equation (38)}$$

$$\Sigma\Sigma\{PA_{s1\_j}EA_{L1\_i}DAm_{s1\_j}EA_{s1\_j}\cos$$
$$[2\pi(f_{s1\_j}-f_{L1\_i})+\Phi A_{s1\_j}-\Phi A_{L1\_i}]Be-$$
$$PB_{s1\_j}EB_{L1\_i}DBm_{s1\_j}EB_{s1\_j}\cos$$
$$[2\pi(f_{s1\_j}-f_{L1\_i})+\Phi B_{s1\_j}-\Phi B_{L1\_i}]Be\})$$
$$<\Sigma\Sigma\{PA_{s1\_j}EA_{L1\_i}DAs_{s1\_j}EA_{s1\_j}\cos$$
$$[2\pi(f_{s1\_j}-f_{L1\_i})+\Phi A_{s1\_j}-\Phi A_{L1\_i}]Be-PB_{s1\_j}$$
$$EB_{L1\_i}DBs_{s1\_j}EB_{s1\_j}\cos[2\pi(f_{s1\_j}-f_{L1\_i})+\Phi B_{s1\_j}-\Phi B_{L1\_i}]Be\} \qquad \text{Equation (39)}$$

B) PSK case

When electric field intensity of i-th light $eA_{L1\_i}$ constituting local light reaching the detectors 61a, 61a-1, 61a-2 is expressed by $EA_{L1\_i}$, its frequency is expressed by $f_{L1\_i}$, its phase is expressed by $\Phi A_{L1\_i}$, electric field intensity of j-th light $eA_{m1\_j}$ constituting coded light when the value of the transmission data are mark is expressed by $EA_{s1\_j}$, its frequency is expressed by $f_{s1\_j}$, its phase is expressed by $\Phi Am_{s1\_j}$, its cosine of angular difference of polarization state relative to light constituting corresponding local light is expressed by $PA_{s1\_j}$, electric field intensity of j-th light $eA_{s1\_j}$ constituting coded light when the value of the transmission data are space is expressed by $EA_{s1\_j}$, its frequency is expressed by $f_{s1\_j}$, its phase is expressed by $\Phi_{s1\_j}$, its cosine of angular difference of polarization state relative to light constituting corresponding local light is expressed by $PA_{s1\_j}$, electric field intensity of i-th light $eB_{L1\_i}$ constituting local light reaching the detectors 61b, 61b-1, 61b-2 is expressed by $EB_{L1\_i}$, its frequency is expressed by $f_{L1\_i}$, its phase is expressed by $\Phi B_{L1\_j}$, electric field intensity of j-th light $eB_{m1\_j}$ constituting coded light when the value of the transmission data are mark is expressed by $EB_{s1\_j}$, its frequency is expressed by $f_{s1\_j}$, its phase is expressed by $\Phi Bm_{s1\_j}$, its cosine of angular difference of polarization state relative to light constituting corresponding local light is expressed by $PB_{s1\_j}$, electric field intensity of j-th light $eB_{s1\_j}$ constituting coded light when the value of the transmission data are space is expressed by $EB_{s1\_j}$, its frequency is expressed by $f_{s1\_j}$, its phase is expressed by $\Phi B_{s1\_j}$, and its cosine of angular difference of polarization state relative to light constituting corresponding local light is expressed by $PB_{s1\_j}$, beat summation of mark which is summation relating to i and j of beat current in the passband Be of the filter 44, of beat current between local light and the coded light when the value of the transmission data are mark is greater than beat summation of space which is summation relating to i and j of beat current in the passband Be of the filter 44, of beat current between local light and the coded light when the value of the transmission data are space, and Equation (42) should be true. Here, summation relating to i and j of beat current between coded light of mark and local light can be expressed by Equation (40), and summation relating to i and j of beat current between coded light of space and local light can be expressed by Equation (41).

$$\Sigma\Sigma\{PA_{s1\_j}EA_{L1\_i}EA_{s1\_j}\cos[2\pi(f_{s1\_j}-f_{L1\_i})+\Phi Am_{s1\_j}-\Phi A_{L1\_i}]Be-PB_{s1\_j}EB_{L1\_i}$$
$$EB_{s1\_j}\cos[2\pi(f_{s1\_j}-f_{L1\_i})+\Phi B_{s1\_j}-\Phi B_{L1\_i}]Be\} \qquad \text{Equation (40)}$$

$$\Sigma\Sigma\{PA_{s1\_j}EA_{L1\_i}EA_{s1\_j}\cos[2\pi(f_{s1\_j}-f_{L1\_i})+\Phi As_{s1\_j}-\Phi A_{L1\_i}]Be-PB_{s1\_j}$$
$$EB_{L1\_i}EB_{s1\_j}\cos[2\pi(f_{s1\_j}-f_{L1\_i})+\Phi B_{s1\_j}-\Phi B_{L1\_i}]Be\} \qquad \text{Equation (41)}$$

$$\Sigma\Sigma\{PA_{s1\_j}EA_{L1\_i}EA_{s1\_j}\cos[2\pi(fm_{s1\_j}-f_{L1\_i})+\Phi Am_{s1\_j}-\Phi A_{L1\_i}]Be-PB_{s1\_j}EB_{L1\_i}$$
$$EB_{s1\_j}\cos[2\pi(f_{s1\_j}-f_{L1\_i})+\Phi Bm_{s1\_j}-\Phi B_{L1\_i}]Be\}<\Sigma\Sigma\{PA_{s1\_j}EA_{L1\_i}EA_{s1\_j}\cos$$
$$[2\pi(f_{s1\_j}-f_{L1\_i})+\Phi As_{s1\_j}-\Phi A_{L1\_i}]Be-$$
$$PB_{s1\_j}EB_{L1\_i}EB_{s1\_j}\cos[2\pi(f_{s1\_j}-f_{L1\_i})+\Phi Bs_{s1\_j}-\Phi B_{L1\_i}]Be\} \qquad \text{Equation (42)}$$

C) FSK (No. 1) case

First, an example where the same local light is used in mark case and space case will be shown. When electric field intensity of i-th light $eA_{L1\_i}$ constituting local light reaching the detectors 61a, 61a-1, 61a-2 is expressed by $EA_{L1\_i}$, its frequency is expressed by $f_{L1\_i}$, its phase is expressed by $\Phi A_{L1\_i}$, electric field intensity of j-th light $eA_{m1\_j}$ constituting coded light when the value of the transmission data are mark is expressed by $EA_{s1\_j}$, its frequency is expressed by $fm_{s1\_j}$, its phase is expressed by $\Phi A_{s1\_j}$, its cosine of angular difference of polarization state relative to light constituting corresponding local light is expressed by $PA_{s1\_j}$, electric field intensity of j-th light $eA_{s1\_j}$ constituting coded light when the value of the transmission data are space is expressed by $EA_{s1\_j}$, its frequency is expressed by $fs_{s1\_j}$, its phase is expressed by $\Phi A_{s1\_j}$, its cosine of angular difference of polarization state relative to light constituting corresponding local light is expressed by $PA_{s1\_j}$, electric field intensity of i-light $eB_{L1\_i}$ constituting local light reaching the detectors 61b, 61b-1, 61b-2 is expressed by $EB_{L1\_i}$, its frequency is expressed by $f_{L1\_i}$, its phase is expressed by $\Phi B_{L1\_i}$, electric field intensity of j-th light $eB_{m1\_j}$ constituting coded light when the value of the transmission data are mark is expressed by $EB_{s1\_j}$, its frequency is expressed by $fm_{s1\_j}$, its phase is expressed by $\Phi B_{s1\_j}$, its cosine of angular difference of polarization state relative to light constituting corresponding local light is expressed by $PB_{s1\_j}$, electric field intensity of j-th light $eB_{s1\_j}$ constituting coded light when the value of the transmission data are space is expressed by $EB_{s1\_j}$, its frequency is expressed by $fs_{s1\_j}$, its phase is expressed by $\Phi B_{s1\_j}$, its cosine of angular difference of polarization state relative to light constituting corresponding local light is expressed by $PB_{s1\_j}$, beat summation of mark which is summation relating to i and j of beat current in the passband Be of the filter 44, of beat current between local light and the coded light when the value of the transmission data are mark is greater than beat summation of space which is summation relating to i and j of beat current with coded light in the passband Be of the filter 44, of beat current between local light and the coded light when the value of the transmission data are space, and Equation (45) should be true. Here, summation relating to i and j of beat current between coded light of mark and local light can be expressed by Equation (42), and summation relating to and j of beat current between coded light of space and local light can be expressed by Equation (43).

$$\Sigma\Sigma\{PA_{s1\_j}EA_{L1\_i}EA_{s1\_j}\cos[2\pi[fm_{s1\_j}-f_{L1\_i}]+\Phi A_{s1\_j}-\Phi A_{L1\_i}]Be - PB_{s1\_j}EB_{L1\_i}$$
$$EB_{s1\_j}\cos[2\pi[fm_{s1\_j}-f_{L1\_i}]+\Phi B_{s1\_j}-\Phi B_{L1\_i}]Be\} \quad \text{Equation (43)}$$

$$\Sigma\Sigma\{PA_{s1\_j}EA_{L1\_i}EA_{s1\_j}\cos[2\pi[fs_{s1\_j}-f_{L1\_i}]+\Phi A_{s1\_j}-\Phi A_{L1\_i}]Be - PB_{s1\_j}EB_{L1\_i}$$
$$EB_{s1\_j}\cos[2\pi[fs_{s1\_j}-f_{L1\_i}]+\Phi B_{s1\_j}-\Phi B_{L1\_i}]Be\} \quad \text{Equation (44)}$$

$$\Sigma\Sigma\{PA_{s1\_j}EA_{L1\_i}EA_{s1\_j}\cos[2\pi[fm_{s1\_j}-f_{L1\_i}]+\Phi A_{s1\_j}-\Phi A_{L1\_i}]Be - PB_{s1\_j}EB_{L1\_i}$$
$$EB_{s1\_j}\cos[2\pi[fm_{s1\_j}-f_{L1\_i}]+\Phi B_{s1\_j}-\Phi B_{L1\_i}]Be\} < \Sigma\Sigma\{PA_{s1\_j}EA_{L1\_i}EA_{s1\_j}\cos$$
$$[2\pi[f_{s1\_j}-f_{L1\_i}]+\Phi A_{s1\_j}-\Phi A_{L1\_i}]Be - PB_{s1\_j}$$
$$EB_{L1\_i}EB_{s1\_j}\cos[2\pi[f_{s1\_j}-f_{L1\_i}]+\Phi B_{s1\_j}-\Phi B_{L1\_i}]Be\} \quad \text{Equation (45)}$$

D) FSK (No. 2) case

An example where shift of frequency is large, and different local light is used in mark case and space case will be explained hereafter. When electric field intensity corresponding to coded light when the value of the transmission data are mark, of i-th light $eA_{L1\_i}$ constituting local light reaching the detectors 61a, 61a-1, 61a-2 is expressed by $EAm_{L1\_i}$, its frequency is expressed by $fm_{L1\_i}$, its phase is expressed by $\Phi Am_{L1\_i}$, electric field intensity corresponding to coded light when the value of the transmission data are space is expressed by $EAs_{L1\_i}$, its frequency is expressed by $fs_{L1\_i}$, its phase is expressed by $\Phi As_{L1\_i}$, electric field intensity of j-th light $eA_{m1\_j}$ constituting coded light when the value of the transmission data are mark is expressed by $EAm_{s1\_j}$, its frequency is expressed by $fs_{m1\_j}$, its phase is expressed by $\Phi Am_{s1\_j}$, its cosine of angular difference of polarization state relative to light constituting corresponding local light is expressed by $PAm_{s1\_j}$, electric field intensity of j-th light $eA_{s1\_j}$ constituting coded light when the value of the transmission data are space is expressed by $EAs_{s1\_j}$, its frequency is expressed by $fs_{s1\_j}$, its phase is expressed by $\Phi A_{s1\_j}$, its cosine of angular difference of polarization state relative to light constituting corresponding local light is expressed by $PA_{s1\_j}$, electric field intensity corresponding to coded light, of i-th light $eB_{L1\_i}$ constituting local light reaching the detectors 61b, 61b-1, 61b-2, when the value of the transmission data are mark, is expressed by $EBm_{L1\_i}$, its frequency is expressed by $fm_{L1\_i}$, its phase is expressed by $\Phi Bm_{L1\_i}$, electric field intensity corresponding to coded light when the value of the transmission data are space is expressed by $EBs_{L1\_i}$, its frequency is expressed by $fs_{L1\_i}$, its phase is expressed by $\Phi Bs_{L1\_i}$, electric field intensity of j-th light $eB_{m1\_j}$ constituting coded light when the value of the transmission data are mark is expressed by $EBm_{s1\_j}$, its frequency is expressed by $fm_{s1\_j}$, its phase is expressed by $\Phi Bm_{s1\_j}$, its cosine of angular difference of polarization state relative to light constituting corresponding local light is expressed by $PBm_{s1\_j}$, electric field intensity of j-th light $eB_{s1\_j}$ constituting coded light when the value of the transmission data are space is expressed by $EBs_{s1\_j}$, its frequency is expressed by $fs_{s1\_j}$, its phase is expressed by $\Phi Bs_{s1\_j}$, and its cosine of angular difference of polarization state relative to light constituting corresponding local light is expressed by $PBs_{s1\_j}$, beat summation of mark which is summation relating to i and j of beat current in the passband Be of the filter 44, of beat current between local light and the coded light when the value of the transmission data are mark are greater than beat summation of space which is summation relating to i and j of beat current in the passband Be of the filter 44, of beat current between local light and the coded light when the value of the transmission data are space, and Equation (48) should be true. Here, summation relating to i and j of beat current between coded light of mark and local light can be expressed by Equation (46), and summation relating to i and j of beat current between coded light of space and local light can be expressed by Equation (47).

$$\Sigma\Sigma\{PAm_{s1\_j}EAm_{L1\_i}EAm_{s1\_j}\cos$$
$$[2\pi[fm_{s1\_j}-fm_{L1\_i}]+\Phi Am_{s1\_j}-\Phi Am_{L1\_i}]Be - PBm_{s1\_j}EBm_{L1\_i}EBm_{s1\_j}\cos[2\pi$$
$$[fm_{s1\_j}-fm_{L1\_i}]+\Phi Bm_{s1\_j}-\Phi Bm_{L1\_i}]Be\} \quad \text{Equation (46)}$$

$$\Sigma\Sigma\{PA_{s1\_j}EAs_{L1\_i}EAs_{s1\_j}\cos$$
$$[2\pi[fs_{s1\_j}-f_{L1\_i}]+\Phi As_{s1\_j}-\Phi As_{L1\_i}]Be - PBs_{s1\_j}EB s_{L1\_i}EBs_{s1\_j}\cos[2\pi[fs_{s1\_j}-fs_{L1\_i}]+\Phi B s_{s1\_j}-\Phi Bs_{L1\_i}]Be\} \quad \text{Equation (47)}$$

$$\Sigma\Sigma\{PAm_{s1\_j}EAm_{L1\_i}EAm_{s1\_j}\cos$$
$$[2\pi[fm_{s1\_j}-fm_{L1\_i}]+\Phi Am_{s1\_j}-\Phi Am_{L1\_i}]Be - PBm_{s1\_j}EBm_{L1\_i}EBm_{s1\_j}\cos$$
$$[2\pi[fm_{s1\_j}-fm_{L1\_i}]+\Phi Bm_{s1\_j}-\Phi Bm_{L1\_i}]Be\} < \Sigma\Sigma\{PA_{s1\_j}EAs_{L1\_i}EAs_{s1\_j}\cos$$
$$[2\pi[fs_{s1\_j}-fs_{L1\_i}]+\Phi As_{s1\_j}-\Phi As_{L1\_i}]Be - PBs_{s1\_j}EBs_{L1\_i}EBs_{s1\_j}\cos[2\pi[fs_{s1\_j}-fs_{L1\_i}]+\Phi Bs_{s1\_j}-\Phi Bs_{L1\_i}]Be\} \quad \text{Equation (48)}$$

With the optical receiver 22 in FIG. 10 to FIG. 15, envelope detection is used which is applicable only to heterodyne detection with sufficiently higher intermediate frequency as compared to data rate. In the present embodiment, synchronous detection is used and therefore, it is applicable to both heterodyne and homodyne. Accordingly, the filter 44 in FIG. 10 to FIG. 15 has passband more than about half of the data rate, and this filter does not pass direct-current component. The filter 44 can be composed by a combination of, for example, DC block which cuts direct-current component, and low-pass filter. The optical coupler/splitters 53a, 53b, 53a-1, 53a-2, 53b-1, 53b-2 and detectors 61a, 61b, 61a-1, 61a-2, 61b-1, 61b-2 in FIG. 10 to FIG. 15 explained in the second embodiment to fourth embodiment can be replaced by differential detectors 64a, 64b, 64a-1, 64a-2, 64b-1, 64b-2 in similar fashion as the optical receiver 22 in FIG. 16.

Seventh Embodiment

In the present embodiment, detection method of the optical receiver differs from the detection method in the optical receiver explained in the sixth embodiment. With the optical receiver explained in the sixth embodiment, synchronous detection is performed by optical phase lock loop for synchronizing the phase of local oscillator (local oscillator 41 in FIG. 3 to FIG. 5 and FIG. 10 to FIG. 15), while in the present embodiment, instead of the phase regulating circuit explained in the sixth embodiment, there is provided a decoder including a generator (not shown) for generating intermediate frequency signal in which phase is synchronized by electric phase lock loop for synchronizing the phase of intermediate frequency signal, and a mixer (not shown) for mixing intermediate frequency signal generated by the generator, and intermediate frequency signal generated by coded light and local light. Envelope detection is not performed also in the present embodiment and negative values are conceivable, and therefore, the requirement is that output values are different. Accordingly, the regulators (regulators 62a, 62b, 62a-1, 62a-2, 62b-1, 62b-2 in FIG. 3 to FIG. 5, and FIG. 10 to FIG. 15) in the present embodiment perform regulations so that output values, not absolute values, may become different according to values of the transmission data. When optical frequency chip to be transmitted is replaced in mark case and in space case, there is such an advantage that signal intensity is eventually doubled as compared with a case where values of one case are transmitted. With the optical receiver relating to the present embodiment, since synchronization is made with the phase of intermediate frequency signal, the synchronization can be made easier as compared to the optical receiver explained in the sixth embodiment in which synchronization is made with phase of optical frequency. The optical coupler/splitters 53a, 53b, 53a-1, 53a-2, 53b-1, 53b-2 and the detectors 61a, 61b, 61a-1, 61a-2, 61b-1, 61b-2 in FIG. 10 to FIG. 15 explained in the second embodiment to the fourth embodiment can be replaced by differential detectors 64a, 64b, 64a-1, 64a-2, 64b-1, 64b-2 in similar fashion as the optical receiver 22 in FIG. 16.

Here, an intermediate frequency signal which uses own code as the code (1100) and includes 2-chips is expressed by Equation (51). Further, an intermediate frequency signal which uses other code as the code (1010) and includes 2-chips is expressed by Equation (52).

Equation (51)

$$A_1 \cos(2\pi f_{IF\text{-}A1}t+\Delta\Phi_{A1})+A_2 \cos(2\pi f_{IF\text{-}A2}t+\Delta\Phi_{A2}) \quad \text{Equation (51)}$$

$$B_1 \cos(2\pi f_{IF\text{-}B1}t+\Delta\Phi_{B1})+B_3 \cos(2\pi f_{IF\text{-}B3}t+\Delta\Phi_{B3}) \quad \text{Equation (52)}$$

A total of intermediate frequency signal of both codes under above-mentioned conditions is expressed by Equation (53) from Equation (51) and Equation (52).

$$A_1 \cos(2\pi f_{IF\text{-}A1}t+\Delta\Phi_{A1})+A_2 \cos(2\pi f_{IF\text{-}A2}t+\Delta\Phi_{A2})+B_1 \cos(2\pi f_{IF\text{-}B1}t+\Delta\Phi_{B1})+B_3 \cos(2\pi f_{IF\text{-}B3}t+\Delta\Phi_{B3}) \quad \text{Equation (53)}$$

Here, it is considered that each of amplitude voltages $A_1$, $A_2$, $B_1$, $B_3$ of the intermediate frequency signal corresponding to each chip is nearly identical and that each of intermediate frequencies $f_{IF\text{-}A1}$, $f_{IF\text{-}A2}$, $f_{IF\text{-}B1}$, $f_{IF\text{-}B3}$ is nearly identical. In order to eliminate MAI due to other code, intermediate frequency signals with other code should be cancelled each other and their outputs become zero. To attain this, in the present embodiment, consideration is given so that phase difference of optical frequency chips constituting each of other code light and local light, i.e., phase term of intermediate frequency, becomes at least $\Delta\Phi_{B1} \approx \Delta\Phi_{B3}$.

In the previously mentioned sixth embodiment, phase synchronization is performed for every optical frequency chip constituting each of coded light and local light by optical PLL and ideally, phase differences are aligned to obtain $\Delta\Phi_{A1}=\Delta\Phi_{A2}=\Delta\Phi_{B1}=\Delta\Phi_{B3}=0$. Therefore, the total of intermediate frequency signals of both codes can be expressed by Equation (54).

$$A_1 \cos(2\pi f_{IF\text{-}A1}t)+A_2 \cos(2\pi f_{IF\text{-}A2}t)+B_1 \cos(2\pi f_{IF\text{-}B1}t)+B_3 \cos(2\pi f_{IF\text{-}B2}t)=2A_1 \cos(2\pi f_{IF\text{-}A1}t) \quad \text{Equation (54)}$$

Accordingly, intermediate frequency signal components by other code are eliminated and only intermediate frequency signal components with own code remain.

Homodyne detection with intermediate frequency of nearly zero does not need any demodulator. This is because, in Equation (54) shown above, those in the brackets of "cos" term become nearly zero and intermediate frequency signal becomes base band signal. In the meantime, in a case of heterodyne detection where intermediate frequency assumes a finite value, demodulator is necessary in order to use intermediate frequency signal as the base band signal. The demodulator may be envelope detector with a similar manner as the first embodiment as long as it is set such that outputs with different absolute value are obtained according to values of data. As for the envelope detector, for example, diode detector which squares the input and outputs it, full-wave rectifying detector composed by a combination of devices such as diode bridge or amplifier, or mixer having such a composition that preliminarily divided inputs are input to each of a plurality of inputs of the mixer. With a demodulator which squares the input and outputs it, output of base band signal there of becomes $2A_1^2$. However, negative value is not allowed. Although processing of the demodulator as analogue circuit is explained, the demodulator may be composed to serve as digital circuit in which analogue/digital conversion is performed at latter stage of optical detection.

Meanwhile, in the present embodiment, phase difference for every optical frequency chip each constituting coded light and local light does not become necessarily zero. This is because optical PLL is not used in the present embodiment. However, with a similar manner as other embodiments, phase differences of optical frequency chips constituting each of other coded light and local light, i.e., phase term of intermediate frequency signal, are aligned to obtain at least $\Delta\Phi_{B1}=\Delta\Phi_{B3}$. Therefore, total of intermediate frequency signals of both codes can be expressed by Equation (55).

$$A_1 \cos(2\pi f_{IF\text{-}A1}t+\Delta\Phi_{A1})+A_2 \cos(2\pi f_{IF\text{-}A2}t+\Delta\Phi_{A2})+B_1 \cos(2\pi f_{IF\text{-}B1}t+\Delta\Phi_{B1})+B_3 \cos(2\pi f_{IF\text{-}B2}t+\Delta\Phi_{B1})=2A_1 \cos(2\pi f_{IF\text{-}A1}t+\Delta\Phi_{A1}) \quad \text{Equation (55)}$$

Accordingly, intermediate frequency signal components by other code are eliminated and only intermediate frequency signal components with own code remain. In the present embodiment, the demodulator for demodulating intermediate frequency signal to base band signal is a synchronous detector using electric PLL different from previously mentioned first embodiment. The synchronous detector includes, for example, an oscillator which oscillates intermediate frequency signal and outputs it, and a mixer such as one provided in electric PLL by which phase of intermediate frequency signal which the oscillator outputs is synchronized with phase of intermediate frequency signal attributable to coded light of own code. The mixer as mentioned multiplies intermediate frequency signal from the oscillator by intermediate frequency signal attributable to coded light. Further, the demodulator may be composed as a digital circuit in which analogue/digital conversion is performed after optical detection.

Although the demodulator used in previously mentioned sixth embodiment is exemplified as the envelope detector, it is preferable to employ a synchronous detector according to the present embodiment which can assume negative value as the output for the decoder. In the previously mentioned sixth embodiment, phase term of intermediate frequency signal is zero and therefore, intermediate frequency signal from the oscillator may be set such that phase term in zero reaches the mixer, and thus phase synchronization is easier than electric PLL of the present embodiment.

As other configuration of the present embodiment, such a configuration is available that phase regulation is performed also by electric PLL of intermediate frequency signal. With this configuration, intermediate frequency signal is demodulated for every optical frequency chip by a demodulator which uses electric PLL for phase synchronization when multiplying intermediate frequency signal of each optical frequency chip by intermediate frequency signal from the oscillator. On this occasion, base band signal after demodulation is added/subtracted by the adder-subtractor. A total of amplitude voltage of intermediate frequency signal of both codes after addition/subtraction is expressed by $A_1+A_2+B_1-B_2=2A_1$. With this configuration, instead of regulating the phase difference between each optical frequency chips at optical stage, each of intermediate frequency signal is synchronously detected and decoded for every optical frequency chip after optical detection, and then addition/subtraction is made, and this is advantageous in that processing at optical stage can be replaced by processing at electric stage.

Eighth Embodiment

Figure 17:
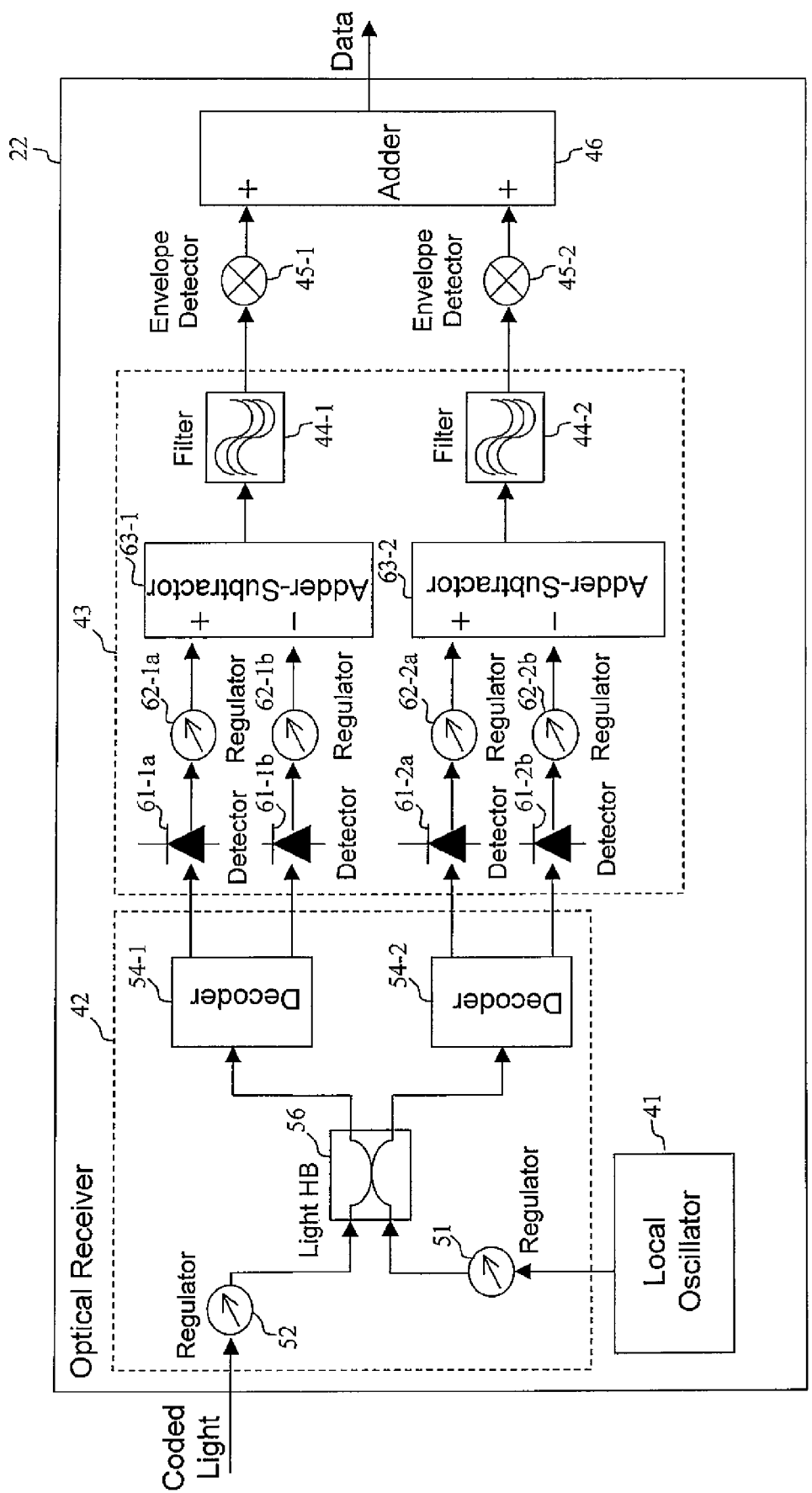
FIG. 17 is an outline configuration diagram showing the optical receiver explained in one embodiment.
Figure 18:
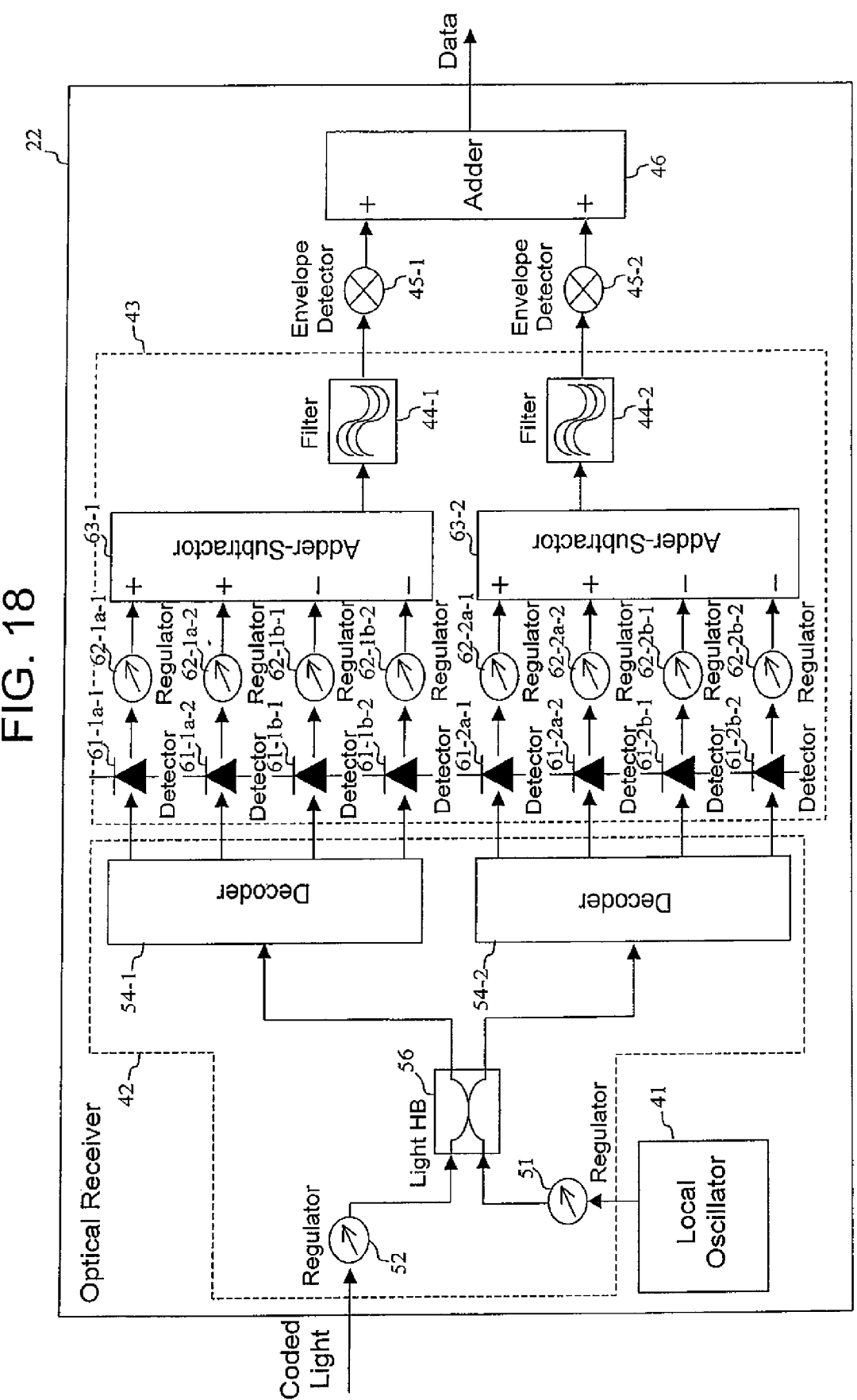
FIG. 18 is an outline configuration diagram showing the optical receiver explained in one embodiment.
Figure 19:
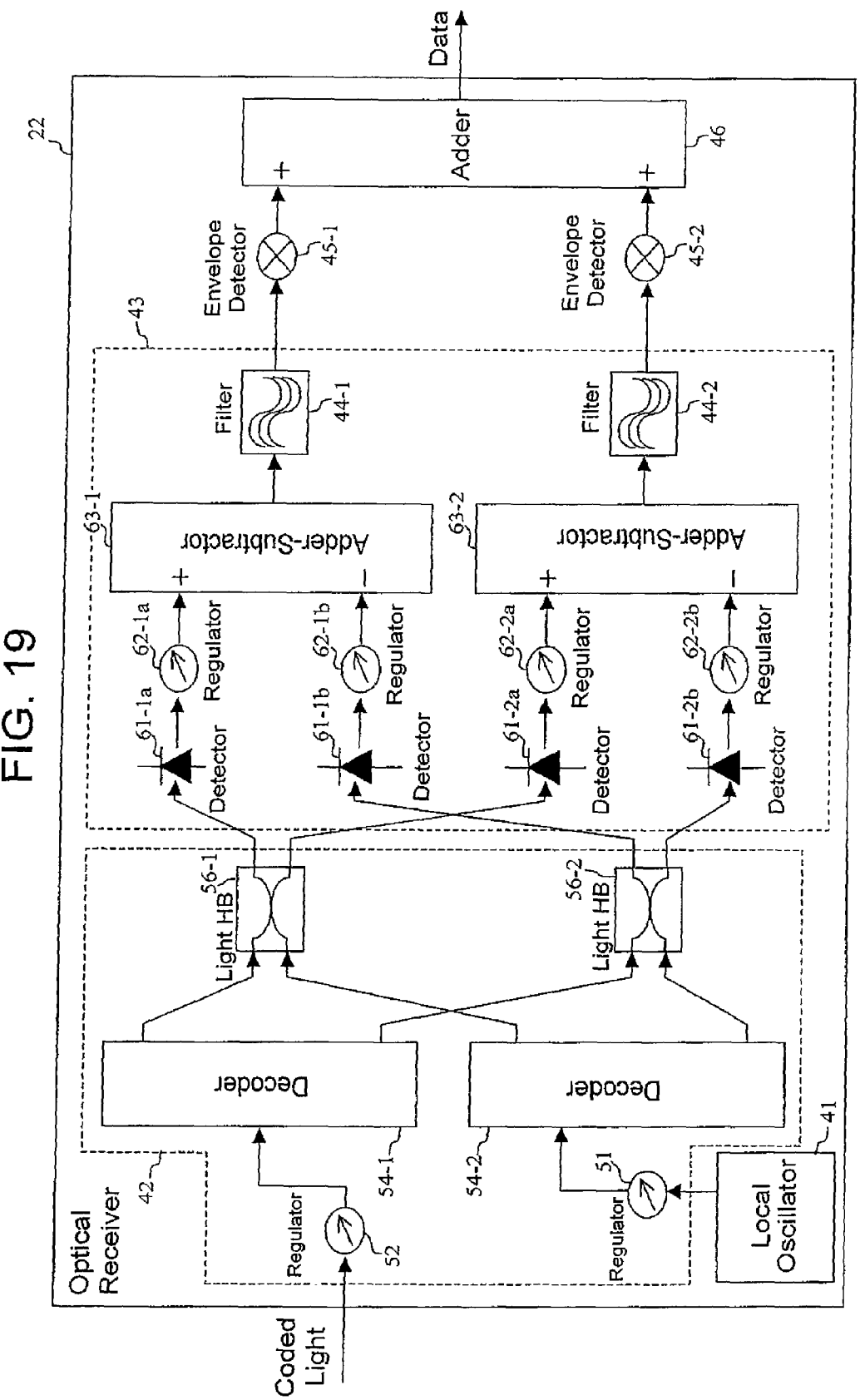
FIG. 19 is an outline configuration diagram showing the optical receiver explained in one embodiment.

FIG. 17 and FIG. 18 show outline configuration diagrams of an optical receiver relating to the present embodiment. This optical receiver corresponds to the optical receiver 22 in FIG. 3 and FIG. 4 explained in the first embodiment. The optical receiver 22 in FIG. 17 and FIG. 18 employs an optical hybrid 56 in lieu of the optical coupler/splitter 53 used in the optical receiver 22 in FIG. 3 and FIG. 4. The optical hybrid 56 divids input light into a plurality of components by a plurality of predetermined phase differences and outputs them. In FIG. 17, combinations of decoders 54-1, 54-2, detectors 61-1a, 61-1b, 61-2a, 61-2b, and adder-subtractor 63-1, 63-2 are provided for every path divided by the optical hybrid 56, and an adder 46 which adds output of each combination and outputs it is provided. This configuration is different from that of the optical receiver 22 shown in FIG. 10 and FIG. 11. In FIG. 18, the decoders 54-1, 54-2 divide mixed light for every optical frequency chip, and the detectors 61-1a-1, 61-1a-2, 61-1b-i, 61-1b-2, 61-2a-1, 61-2a-2, 61-2b-1 61-2b-2 detect the mixed light from decoders 54-1, 54-2 for every optical frequency chip. Components shown in FIG. 17 and FIG. 18 bearing the same symbol as used in FIG. 10 and FIG. 11 show the same components and explanation thereof will be omitted.

The present embodiment is an example where phase diversity is applied as homodyne detection in the optical receiver 22 in FIG. 3 and FIG. 4. In the optical receiver 22 in FIG. 17 and FIG. 18, optical 90° hybrid is assumed as the optical hybrid 56, and two sets of combinations of the decoder, detector, and adder-subtractor are employed (decoder 54-1, detector 61-1a, 61-1b, adder-subtractor 63-1a, 63-1b) and (decoder 54-2, detector 61-2a, 61-2b, adder-subtractor 63-2a, 63-2b). In other words, the optical coupler/splitter 53, the decoder 54, the detectors 61a, 61b, and the adder-subtractor 63 in the optical receiver 22 in FIG. 3 and FIG. 4 are replaced by the optical hybrid 56 and two sets of combinations of (decoder 54-1, detector 61-1a, 61-1b, adder-subtractor 63-1a, 63-1b) and (decoder 54-2, detector 61-2a, 61-2b, adder-subtractor 63-2a, 63-2b). When 120° hybrid by means of 3×3 coupler is applied as the optical hybrid 56, three sets of combinations of the decoder 54, detector 61a, 61b and the adder-subtractor 63 shown in FIG. 3 and FIG. 4 are used. Meanwhile, in FIG. 18, detectors 61-1a-1, 61-1a-2, 61-1b-1, 61-1b-2 and regulators 62-1a-1, 62-1a-2, 62-1b-1, 62-1b-2 are provided for every optical frequency chip.

The optical 90° hybrid applied as the optical hybrid 56 performs outputting such that phase difference of two input light to be input results in 90° phase difference between the outputs. Since intermediate frequency of the filters 44-1, 44-2 is smaller compared with data rate, homodyne detection or detection similar to homodyne detection is performed. Therefore, passband is more than about half of the data rate and does not pass direct-current component. Such filters 44-1, 44-2 can be composed by, for example, a combination of DC block, which cuts direct-current component, and low-pass filter. Intermediate frequency components $i_{p1}$, $i_{p2}$ in each adder-subtractor output in Equation (12) explained in the present embodiment for the optical receiver 22 in FIG. 3 and FIG. 4, where intermediate frequency is 0 Hz, can be expressed by the following Equation (49) if noise term is excluded.

$$i_{p1} = 2R\sum_{m}^{M}(C_{pm} - C'_{pm})E_{pm}E_{Lm}\cos(\phi_p - \phi_L) +$$

$$2R\sum_{i;i\neq p}^{k}\sum_{m}^{M}(C_{pm} - C'_{pm})E_{im}E_{Lm}\cos(\phi_i - \phi_L)$$

$$i_{p2} = 2R\sum_{m}^{M}(C_{pm} - C'_{pm})E_{pm}E_{Lm}\cos(\phi_p - \phi_L + \pi/2) +$$

$$2R\sum_{i;i\neq p}^{K}\sum_{m}^{M}(C_{pm} - C'_{pm})E_{im}E_{Lm}\cos(\phi_i - \phi_L + \pi/2)$$

Equation (49)

When, in Equation (49), when second term of each of $i_{p1}$, $i_{p2}$ are considered to be sufficiently small due to orthogonality of the code and, after both are added, and squared by envelope detectors 45-1, 45-2, Equation (49) becomes constant regardless of phase difference between optical frequency chips of coded light and optical frequency chips corresponding to local light. In the present embodiment, optical frequency bandwidth required for coded light as condition can be made narrower by as much as that the intermediate frequency is smaller as compared with the optical receiver 22 in FIG. 3 and FIG. 4.

Ninth Embodiment

Figure 20:
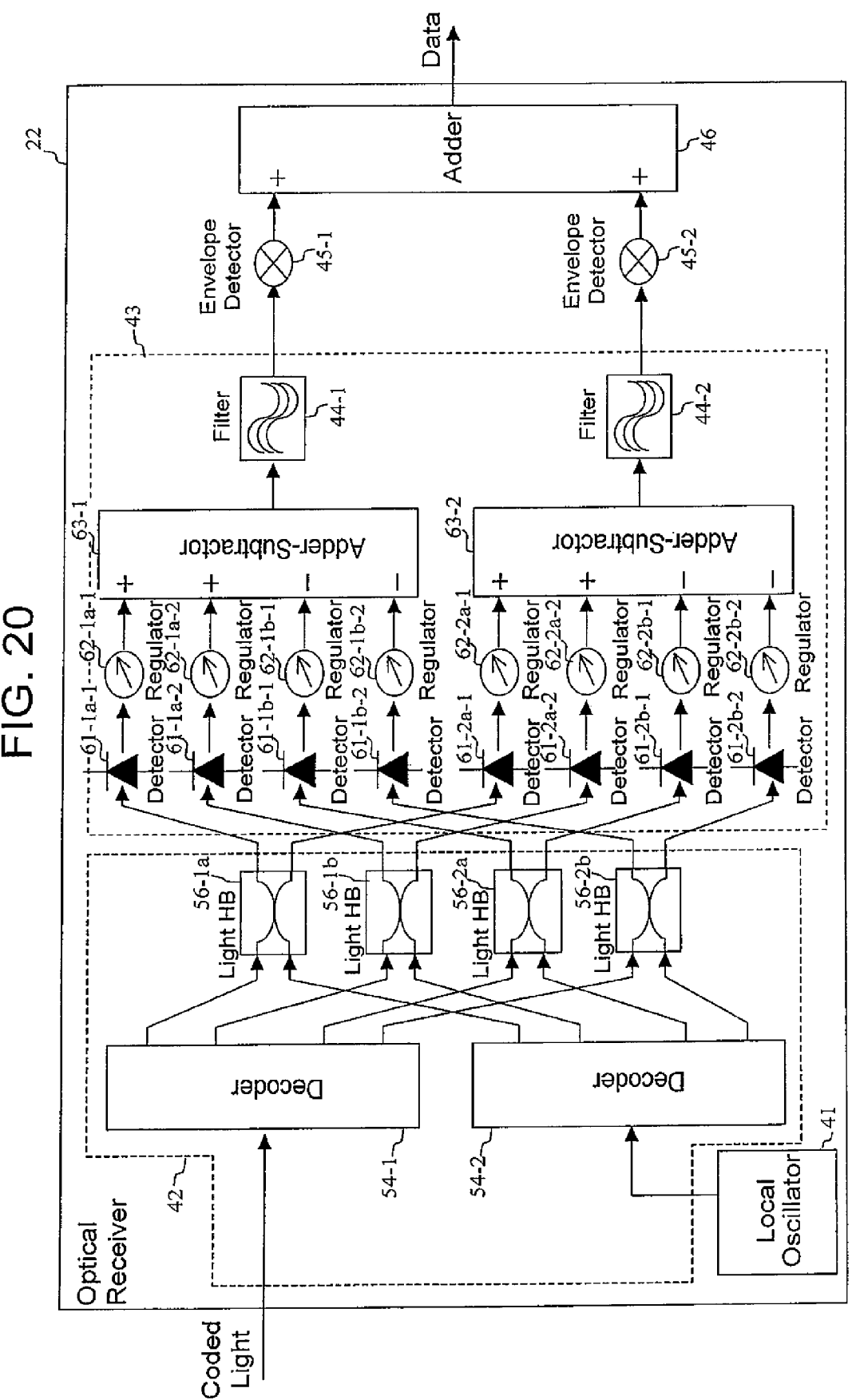
FIG. 20 is an outline configuration diagram showing the optical receiver explained in one embodiment.
Figure 21:
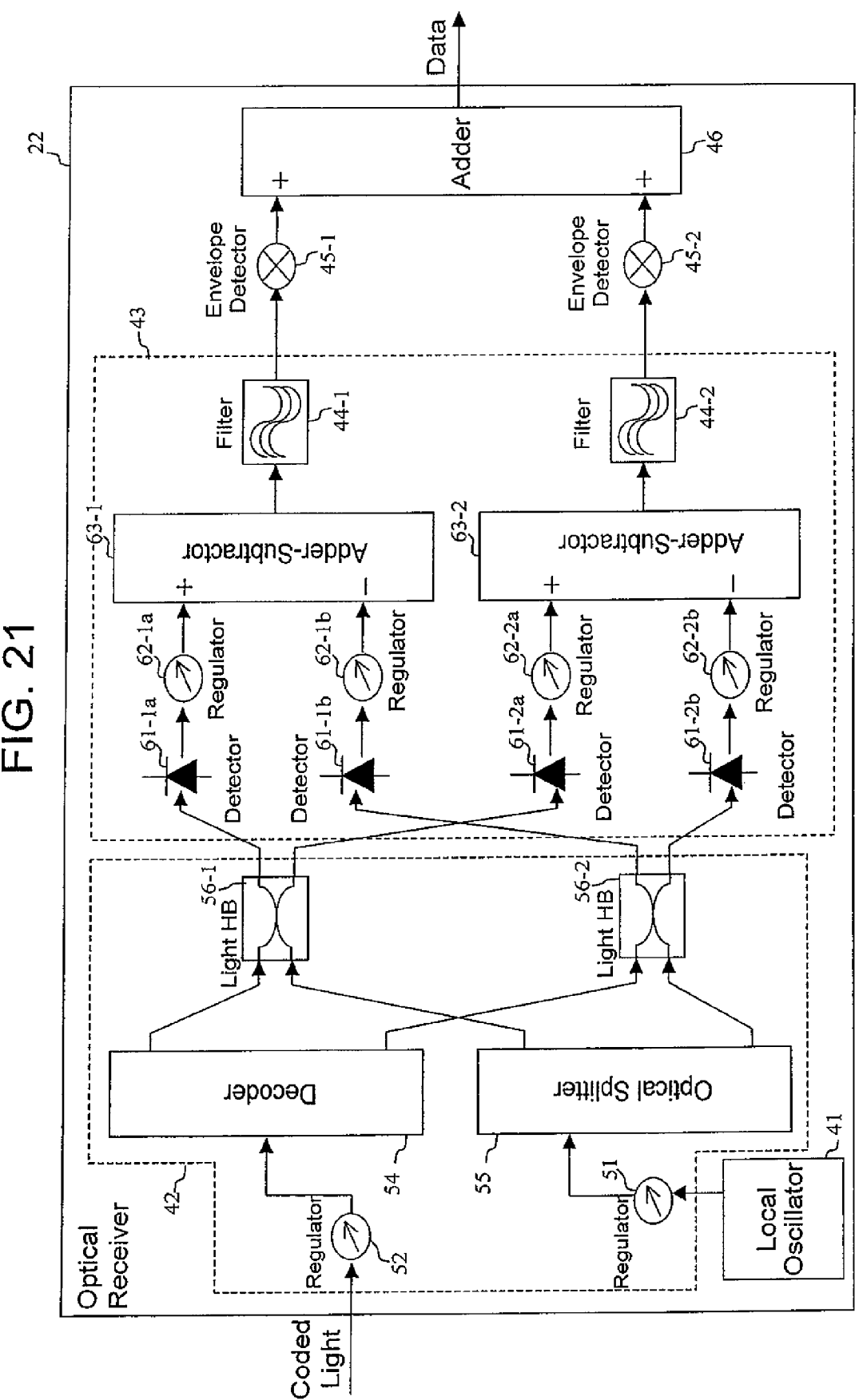
FIG. 21 is an outline configuration diagram showing the optical receiver explained in one embodiment.
Figure 22:
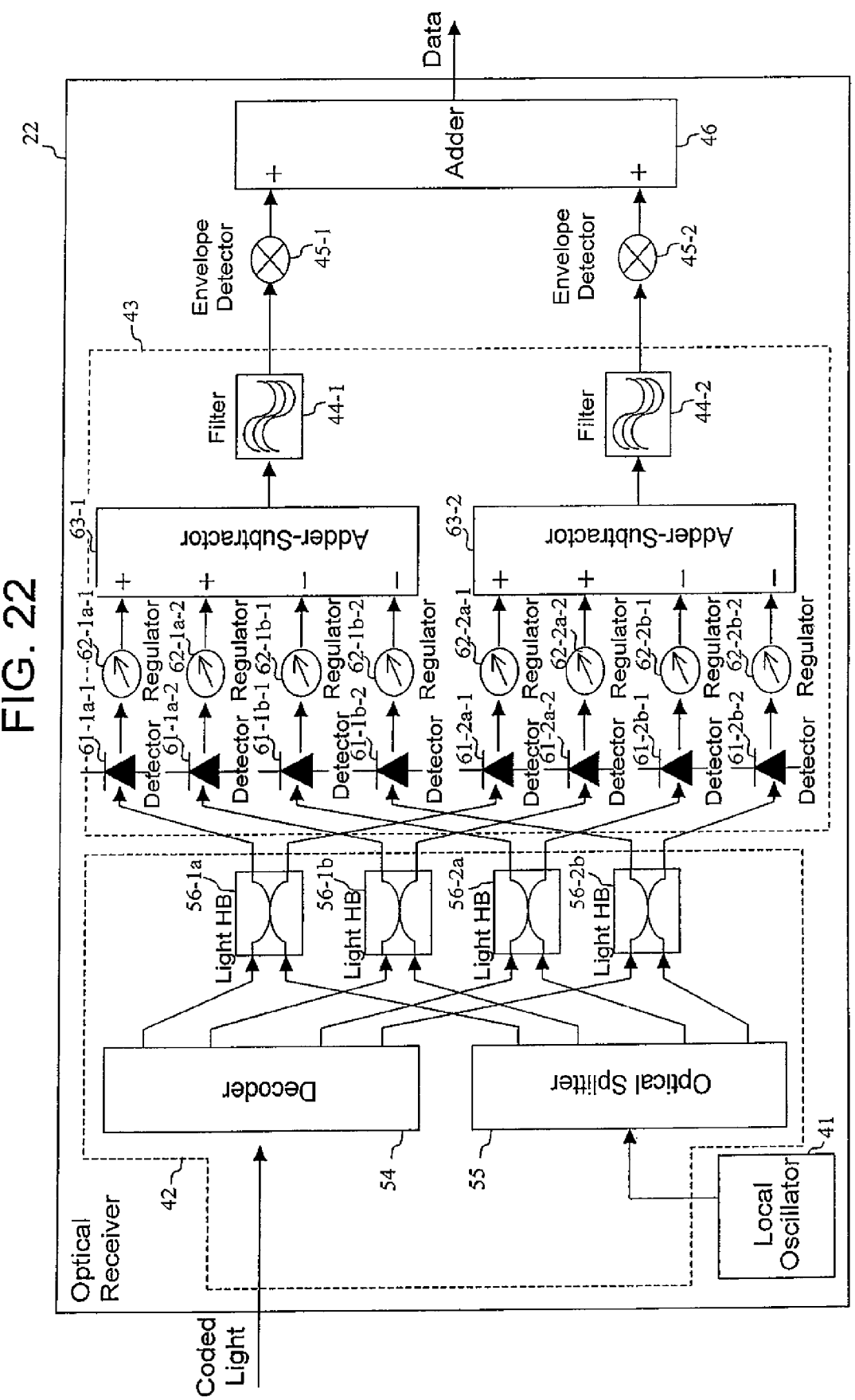
FIG. 22 is an outline configuration diagram showing the optical receiver explained in one embodiment.
Figure 23:
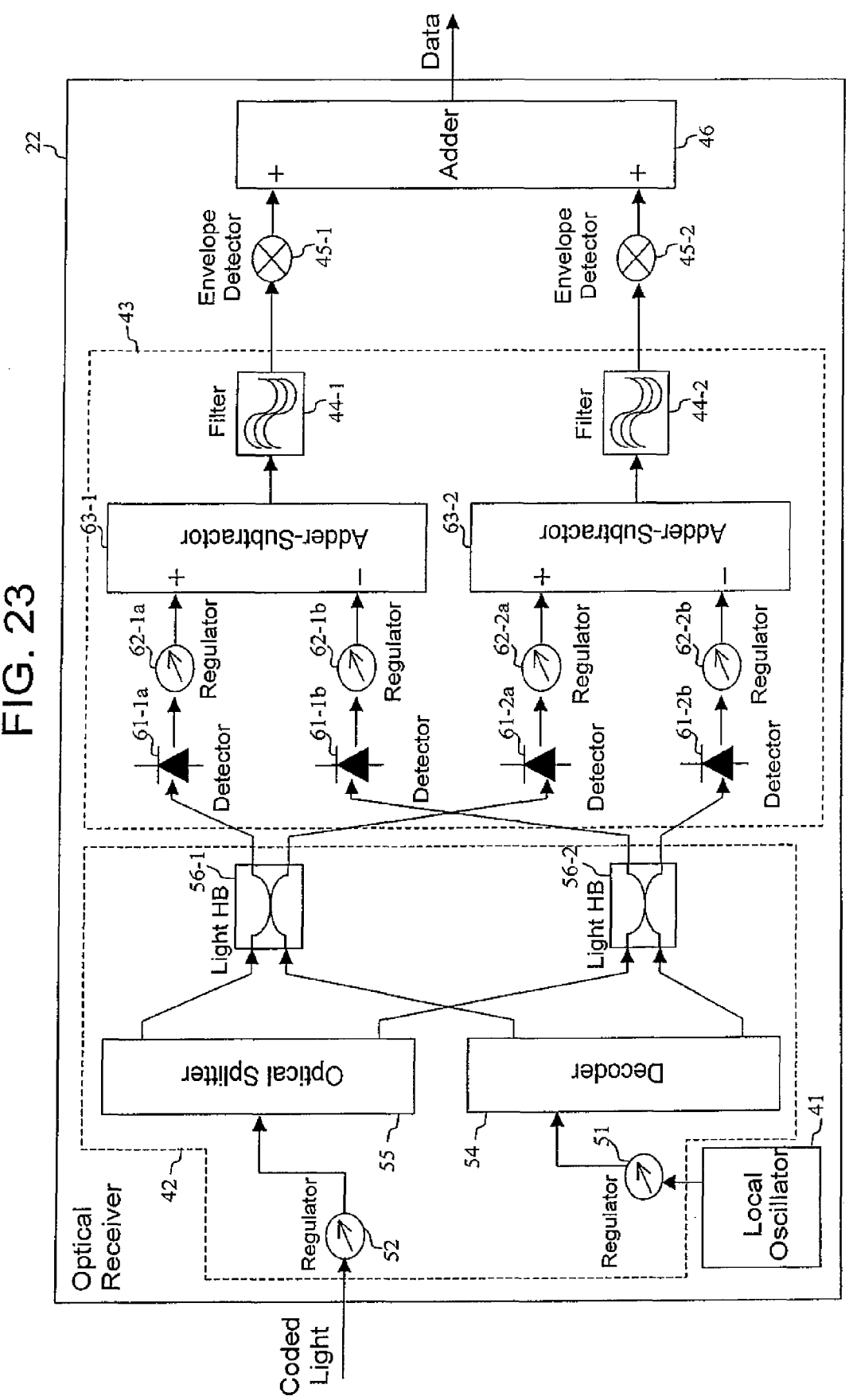
FIG. 23 is an outline configuration diagram showing the optical receiver explained in one embodiment.
Figure 24:
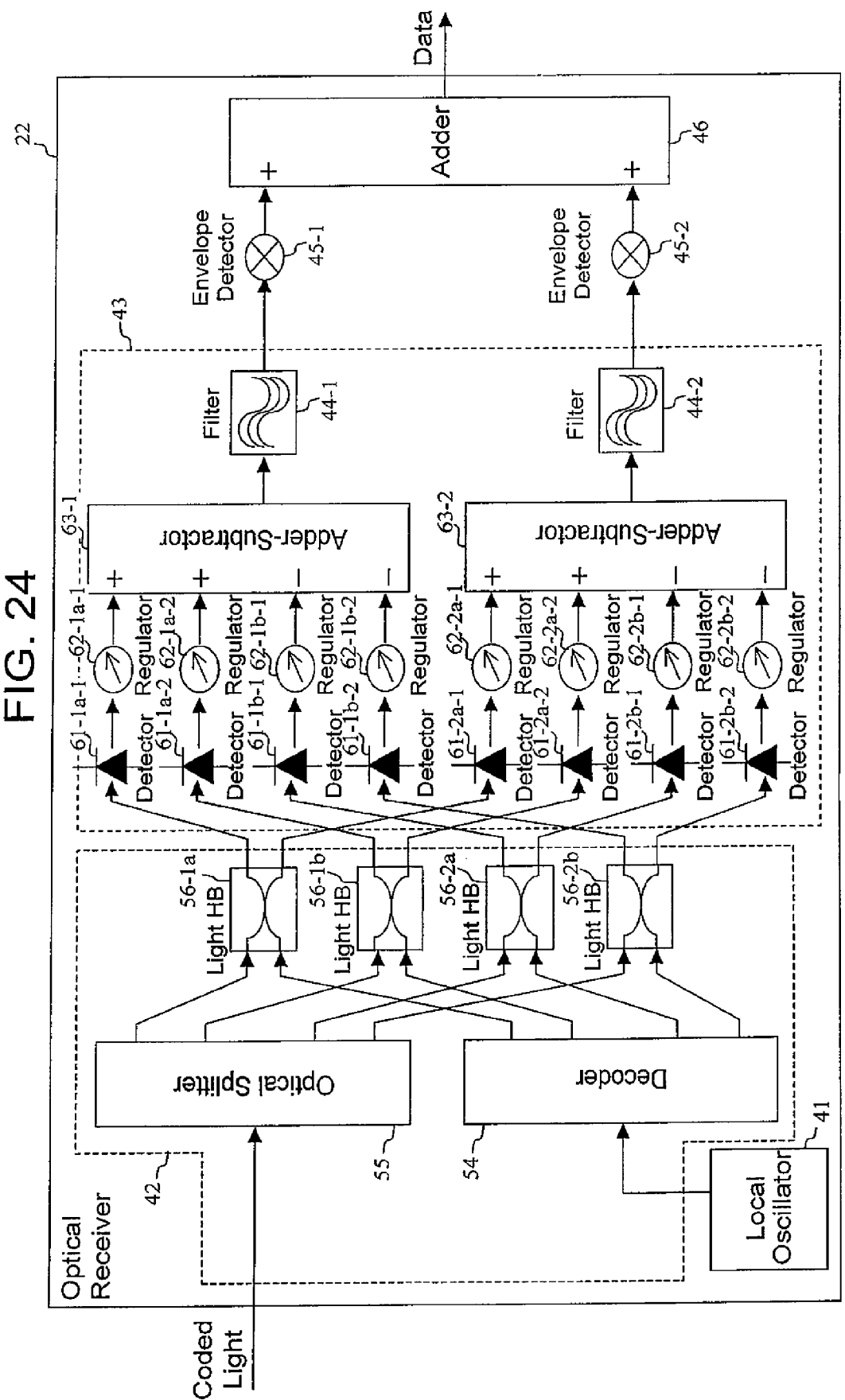
FIG. 24 is an outline configuration diagram showing the optical receiver explained in one embodiment.

FIG. 19 to FIG. 24 show outline configuration diagrams of an optical receiver relating to the present embodiment. This corresponds to the optical receiver 22 in FIG. 10 to FIG. 15 explained from the second embodiment to the fourth embodiment. With the optical receiver 22 in FIG. 19 to FIG. 24, optical hybrids 56-1, 56-2 are applied in lieu of the optical coupler/splitters 53a, 53b in the optical receiver 22 in FIGS. 10, 12 and 14, and optical hybrids 56-1a, 56-1b, 56-2a, 56-2b are applied in lieu of the optical coupler/splitters 53a-1, 53a-2, 53b-1, 53b-2 in FIGS. 11, 13 and FIG. 15. Each of the optical hybrids 56-1, 56-2, 56-1a, 56-1b, 56-2a, 56-2b in FIG. 19 to FIG. 24 divides the input light into a plurality of lights with a plurality of predetermined phase differences. In the present embodiment, two sets of (detectors 61-1a, 61-1b, adder-subtractor 63-1) and (detectors 61-2a, 61-2b, adder-subtractor 63-2) are provided for every pass divided by the optical hybrids 56-1, 56-2, 56-1a, 56-1b, 56-2a, 56-2b, and the adder 46 for adding output of each combination and outputs them is provided. The configuration with the adder 46 adding each combination and outputting it, differs from the optical receiver 22 in FIG. 10 to FIG. 15. Further, the optical receiver 22 in FIG. 19 to FIG. 24 includes the filters 44-1, 44-2 in each path. It further includes the regulators 62-1, 62-2 in each path. In FIG. 20, FIG. 22, FIG. 24, (detectors 61-1a-1, 61-1a-2, 61-1b-1, 61-1b-2, adder-subtractor 63-1) and (detectors 61-2a-1, 61-2a-2, 61-2b-1, 61-2b-2, adder-subtractor 63-2) are provided for every optical frequency chip, and regulators 62-1a-1, 62-1a-2, 62-1b-1, 62-1b-2, 62-2a-1, 62-2a-2, 62-2b-1, 62-2b-2 are provided. Components shown in FIG. 19 to FIG. 24 bearing the same symbol as used in FIG. 10 to FIG. 15 show the same components and explanation thereof will be omitted.

The present embodiment is an example where phase diversity is applied as homodyne detection in the optical receiver 22 in FIG. 10 to FIG. 15. With the optical receiver 22 in FIG. 19 to FIG. 24, optical 90° hybrid is assumed as the optical hybrids 56-1, 56-2, 56-1a, 56-1b, 56-2a, 56-2b and two sets of a combination of the detector and adder-subtractor are used. Accordingly, the optical coupler/splitter, detector, and adder-subtractor in the optical receiver 22 in FIG. 10 to FIG. 15 are replaced by optical hybrids 56-1, 56-2, 56-1a, 56-1b, 56-2a, 56-2b, and two sets of (detectors 61-1a, 61-1b, adder-subtractor 63-1) and (detectors 61-2a, 61-2b, adder-subtractor 63-2). When optical hybrids 56-1, 56-2, 56-1a, 56-1b, 56-2a, 56-2b having output with phase difference each different by $\pi$ corresponding to outputs of optical hybrid different by $\pi/2$ are applied also to the optical receiver 22 in FIG. 19 to FIG. 24, differential detection of two inputs each having phase difference different by $\pi$ is possible after each of the detectors 61-1, 61-2 is replaced by the differential detectors 64a, 64b with a similar manner as the optical receiver 22 in FIG. 16.

Tenth Embodiment

In the first embodiment through the ninth embodiment, explanation is given provided that the optical receiver 22 includes a system in which coded light and polarization state of local light are matched or a means for matching the both. In the present embodiment, a configuration, which causes the optical receiver explained from the first embodiment through the ninth embodiment to function regardless of the polarization state, will be explained. The difference between the optical receiver relating to the present embodiment and the optical receiver explained in the first embodiment through the ninth embodiment is that polarization scramble, in which coded light or local light of two polarization states orthogonal each other exists half and half in bit time corresponding to one transmission data, is applied to the coded light or local light, and that an integrator (not shown) for integrating outputs in bit time unit is provided. The integrator (not shown) can be provided to electric stage of the optical receiver 22 explained in the first embodiment through the eighth embodiment. For example, it can be provided to latter stage of the detectors 61a, 61b in FIG. 3 for every detector 61a, 61b. The same also applies to other optical receiver 22. When such polarization scramble is applied, output of the optical receiver 22 can be made nearly constant regardless of the polarization state. The following description explains independence from the polarization state in the present embodiment referring to a case where local light is subjected to polarization scramble.

When orthogonal polarization states of the local light are represented by TE and TM, intensity is 0.5 L for the both, angle between coded light and polarization TE is represented by θ, and intensity by S, signal intensity can be expressed by the following Equation (50).

$$0.5LS\cos^2(\theta)+0.5LS\sin^2(\theta) \quad \text{Equation (50)}$$

Thus, constant signal independent of polarization state of the coded light is obtainable.

Polarization scramble with regard to the coded light can be performed in such that the coded light is modulated in a polarization modulator (not shown) with a timing half of bit timer or timing shifted by ½ bit time from timing of modulation by the transmission data. Meanwhile, polarization scramble with regard to the local light is performed in such that the coded light is modulated by the polarization modulator (not shown) with a time half of bit time. When pulse light with pulse width smaller than bit time is used, a plurality of pulse lights is used within bit time. When a plurality of pulse lights is used, it is necessary that nearly the same number of pulse lights with both polarization states of the local light or coded light should perform coherent detection for each of pulse light of corresponding coded light or local light. As for a method of generating a plurality of pulse lights with different polarization state, for example, polarization state of half of the pulse light is simply $\pi/2$ modulated using the polarization modulator (not shown) using a pulse light source with pulse period natural number times of 2 of bit time. Further, using a pulse light source with pulse period more than natural number times of bit time, the pulse light is split, polarization state of half of pulses is turned by $\pi/2$ to cause a delay to prevent collision between pulses then simply coupled. In the meantime, when both of the coded light and the local light are pulse light, in order to cause timewise collision so that pulses may generate beat, light at a side to which scramble is not applied is split to give a similar delay and then coupled.

When, in addition to polarization scramble applied to the present embodiment, phase scramble is applied, and passband of the filter is adjusted to the passband of the filters 44-1, 44-2 of the optical receiver 22 explained in the eighth embodiment or the ninth embodiment, homodyne detection can be performed by the optical receiver 22 explained from the first embodiment to the fifth embodiment. For phase scramble, 1-bit time is divided into four segments and light each having phase difference by $\pi/2$ is necessary for each segment. Since two polarization states of polarization scramble are necessary for each, 1-bit time should be divided into eight segments. Scramble can be performed by phase modulator (not shown) or reflecting of split light with 45-degree Faraday mirror (not shown) as many as the number required. As mentioned above, the optical receiver relating to the present embodiment can be made independent of polarization state.

Eleventh Embodiment

In the present embodiment, composition for causing the optical receiver explained in the first embodiment to the ninth embodiment to function independent of the polarization state with a similar manner as the optical receiver explained in the tenth embodiment will be explained. In the optical receiver relating to the present embodiment, each of optical frequency chips constituting either the coded light or local light is composed of two lights with different optical frequencies and orthogonal polarization states each other. Intermediate frequency relative to optical frequency chips of these two light and corresponding light should be intermediate frequency in which at least main lobe of modulation of intermediate frequency signals themselves after detection by the detectors 61a, 61b (e.g., FIG. 3) may not be overlapped. Difference of intermediate frequencies is preferably 2.5 times the symbol rate or more. In the optical receiver relating to the present embodiment, for the filter 44 (e.g., FIG. 3) which passes the intermediate frequency, passband for transmission of at least main lobe of modulation of both of intermediate frequencies is required. Since sum of signal intensity by beat of optical frequency chips of orthogonal two light and optical frequency chip of one light is constant, the optical receiver relating to the present embodiment has effects of independence from the polarization state with a similar manner as explained in the tenth embodiment. Further, polarization modulator with operating speed twice the symbol rate (polarization modulator explained in tenth embodiment) can be removed as compared with the optical receiver explained in the tenth embodiment.

Twelfth Embodiment

In the present embodiment, composition for causing the optical receiver 22 explained in the first embodiment to the ninth embodiment to function independent of the polarization state with a similar manner as the optical receiver explained in the tenth embodiment will be explained. In the optical receiver 22 relating to the present embodiment, concatenated code in which two codes are concatenated on the optical frequency axis is used in lieu of the code applied to the optical receiver 22 explained from the first embodiment to the eighth embodiment. Here, it is preferable that the same code is repeated twice from viewpoint of utilization efficiency of the code. In the present embodiment, polarization states of optical frequency chips constituting the coded light used for one code constituting the concatenated code are the same and polarization states of optical frequency chips used for different codes constituting the coded light are orthogonal each other. Further, for the local light, polarization states are identical at both codes constituting the concatenated code. Further, optical coupler/splitters 53, 53a, 53b, 53a-1, 53b-1, 53a-2, 53b-2, and optical hybrid 56, 56-1, 56-2 in FIG. 3 to FIG. 5, and FIG. 10 to FIG. 24 are in nearly same polarization state for every one code constituting the concatenated code for the coded light and local light, and are mixed in polarization state relatively different by $\pi/2$ or $3\pi/2$ between two codes.

With this feature, it is possible to obtain constant output signal regardless of polarization state of the coded light. Although it is considered here that polarization state of codes constituting the concatenated code is different with coded light and identical with local light, this may be reversed. The optical receiver relating to the present embodiment can be made independent of the polarization state. Further, passband of the coded light in the decoder can be expanded by modulation by scramble as is the case of the optical receiver explained in the tenth embodiment or passband for every optical frequency chip can be made narrower as compared with the optical receiver which passes of three light separated by more than twice intermediate frequency for every optical frequency chip as is the case of the optical receiver explained in the eleventh embodiment.

Thirteenth Embodiment

In the present embodiment, a configuration for causing the optical receiver, which is explained in the first embodiment to the ninth embodiment, to function independent of the polarization state with a similar manner as the optical receiver explained in the tenth embodiment will be explained. Although explanation will be given for configuration of the optical receiver explained in the first embodiment, the configuration of the optical receiver 22 relating to the present embodiment is applicable similarly to the optical receiver explained in the second embodiment to eighth embodiment.

Figure 25:
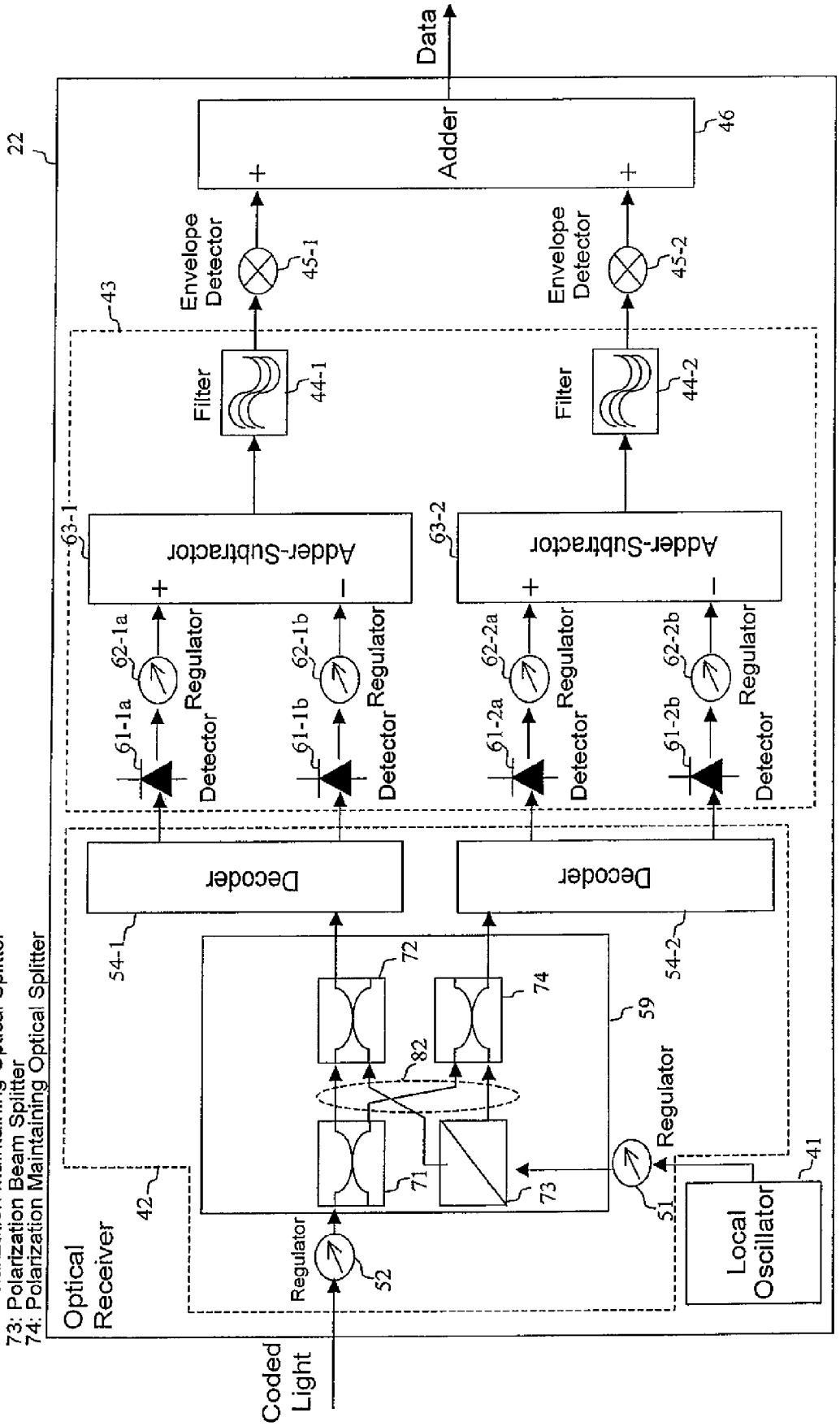
FIG. 25 is an outline configuration diagram showing the optical receiver explained in one embodiment.

FIG. 25 shows an outline configuration diagram of the optical receiver 22 relating to the present embodiment. In the present embodiment, the optical coupler/splitter 59 is an optical coupler/splitter which performs mixing of the coded light and local light in two polarization relationships different by $\pi/2$ or $3\pi/2$, and configuration from the optical coupler/splitter 59 to the envelope detectors 45-1, 45-2 is such that light mixed by two sets of polarization relationships are processed individually. Further, polarization diversity equipped with the adder 46 for adding output of the filters 44-1, 44-2 is realized. In FIG. 25, components bearing the same symbol in FIG. 3 to FIG. 5 and FIG. 10 to FIG. 24 show mutually the identical components and explanation thereof will be omitted.

The optical coupler/splitter 59 applied to the optical receiver 22 in FIG. 25 may be composed in such that, for example, as shown in FIG. 25, one polarization beam splitter 73 and three 2×2 polarization maintaining optical splitters 71, 72, 74 are connected by polarization maintaining optical fiber 82. Meanwhile, local light is regulated so as to be output by the optical polarization beam splitter 73 as two light with identical intensity and mutually orthogonal polarization state. The polarization maintaining optical splitter 71 outputs it as two lights with identical intensity while maintaining the polarization state. In the present embodiment, total by both adder 46 is identical although intensity of beat signal of local light of upper set being split by the polarization beam splitter 73 and of local light of lower set are different depending on polarization state. Therefore, the optical receiver 22 in FIG. 25 can be made independent of the polarization state with a similar manner as the optical receiver explained in the tenth embodiment. Although such a configuration is used in FIG. 25 that one local light is output as two light with orthogonal polarization states and identical intensity using one local light source 41 and polarization beam splitter 73, this may be replaced by two local oscillators when optical frequencies of the both are nearly identical and have identical intensity, and are mixed in polarization state which is shifted by $\pi/2$ relative to the coded light.

In the present embodiment, the optical coupler/splitter 59 is provided in the previous stage of the decoders 54-1, 54-2.

The same also applies to the optical receiver in FIG. 4 and FIG. 5.

With the optical receiver 22 in FIG. 10 to FIG. 16, the optical coupler/splitters 53a, 53b, 53a-1, 53b-1, 53b-2 are replaced by optical coupler/splitters having the same structure as the optical coupler/splitter 59 in FIG. 25. Then a detection adder-subtractor filter 43 and the envelope detector 45 are provided for every output of the same polarization state related matters, to add each output by the adder 46 and to output it.

In the optical receiver 22 in FIG. 17 and FIG. 18, an optical coupler/splitter having a modified structure of the optical coupler/splitter 59 is used in lieu of the optical hybrid 56. With the optical coupler/splitter having a modified structure of the optical coupler/splitter 59, the polarization maintaining optical splitter 72 and the polarization maintaining optical splitter 74 of the optical coupler/splitter 59 are replaced by optical hybrid for polarization maintaining. A decoder is provided for every output of the optical hybrid constituting the optical coupler/splitter with modified structure of the optical coupler/splitter 59, the detection adder-subtractor filter 43 and the envelope detector 45 are provided for every output of the decoder, and each output is added by the adder 46 and output it.

With the optical receiver 22 in FIG. 19 to FIG. 24, optical hybrids 56-1, 56-2, 56-1a, 56-1b, 56-2a, 56-2b are replaced by an optical coupler/splitter with a modified structure of the optical coupler/splitter 59. With the optical coupler/splitter having modified structure of the optical coupler/splitter 59, the polarization maintaining optical splitter 72 and the polarization maintaining optical splitter 74 are replaced by optical hybrids for polarization maintaining. The detection adder-subtractor filter 43 and the envelope detector 45 are provided for every output with the same polarization state related matters and the same phase related matters, to add each output by the adder 46 and to output it.

INDUSTRIAL APPLICABILITY

The optical code communication system of the present invention can be used as optical code communication system of OCDM method for transmitting and receiving coded signal light.

The invention claimed is:

1. An optical code communication system comprising:
   an optical transmitter for transmitting coded light, in which a plurality of optical frequency chips, in which a plurality of lights with different optical frequencies from a light source is coded by a predetermined code, is modulated by a transmission data;
   an optical receiver for receiving the coded light from the optical transmitter, processing the received coded light using local light of which intensity is stronger than the intensity of the coded light received, which includes a plurality of lights, in which optical frequency difference with each of a plurality of optical frequency chips with the different optical frequency is set to nearly intermediate frequency, taking out the transmission data in the optical transmitter and outputting it; and
   an optical transmission line for connecting the optical transmitter and the optical receiver and transmitting the coded light from the optical transmitter towards the optical receiver, wherein
   the optical receiver comprises: an optical mixing decoder for mixing the coded light from the optical transmitter and the local light, dividing at least one of the coded light or the local light into object optical frequencies corresponding to the optical frequency chips, in which the values of code of a receiving object of the optical receiver are "1" and a non-object optical frequencies corresponding to the optical frequency chips, in which the values of code of the receiving object are "0", and outputs each of the object optical frequency, in which coded light from the optical transmitter and the local light are mixed, and the non-object optical frequency in which coded light from the optical transmitter and the local light are mixed; and
   a detection adder-subtractor filter for detecting each of the object optical frequency and the non-object optical frequency from the optical mixing decoder, passing of each of intermediate frequency signals of the object optical frequency and the non-object optical frequency, subtracting the other from one of the intermediate frequency signals, and outputs it, wherein
   the coded light from the optical transmitter has coherence between optical frequency chips constituting the coded light from the optical transmitter, when being detected in the detection adder-subtractor filter, and
   the local light has coherence between optical frequency chips constituting the local light, when being detected in the detection adder-subtractor filter; and
   the optical mixing decoder or the detection adder-subtractor filter regulates a phase of the intermediate frequency signal in the passband when the intermediate frequency signal is subtracted so that, output values or absolute values of the intermediate frequency signal in the passband at filtration in the detection adder-subtractor filter, of outputs of the detection adder-subtractor filter, become different between when coded light, which is coded by the code of the receiving object and modulated by one of values of the transmission data, is received by the optical receiver, and when coded light, which is coded by the code of the receiving object and modulated by other value of the transmission data, is received by the optical receiver.

2. The optical code communication system according to claim 1, wherein
   the optical frequency chips, in which the value of the code of the coded light of other than receiving object corresponds to "1", is in such a relationship that one half of the intermediate frequency signal in the passband is added and the other half is subtracted thereby cancelling each other;
   the local light further includes light in which optical frequency difference of the optical frequency chips, in which the values of code with the coded light corresponding to the other code corresponds to "1", is set to nearly intermediate frequency; and
   the optical mixing decoder or the detection adder-subtractor filter regulates the phase so that the output subtracted the summation of multiplications of the electric current values of intermediate frequency signal of the outputs in the passband of the detection adder-subtractor filter when the optical receiver receives coded lights of the non-receiving object codes by generation probabilities of respective electric current values from the output in the passband of the detection adder-subtractor filter when the optical receiver receives coded light of the receiveing object which is modulated by one of values of the transmission data is greater in value or absolute value therof than the output added the summation of multiplications of the electric current values of intermediate frequency signal of the outputs in the passband of the detection adder-subtractor filter when the optical receiver receives coded lights of the non-receiving object codes by generation probabilities of respective electric current values to the output in the passband of the detection adder-subtractor filter when the optical receiver receives coded light of the receiving object code which is modulated by other values of the transmission data.

3. The optical code communication system according to claim 1, wherein
the optical mixing decoder comprises:
an optical coupler/splitter for mixing the received coded light and the local light and outputting mixed light, and a decoder for dividing the mixed light from the optical coupler/splitter into the object optical frequency and the non-object optical frequency and outputting them; wherein
the detection adder-subtractor filter detects the object optical frequency from the decoder and the non-object optical frequency, and performs filtration and addition/subtraction thereof.

4. The optical code communication system according to claim 1, wherein
the optical mixing decoder comprises a decoder for dividing each of the received coded light and the local light into the object optical frequency and the non-object optical frequency and outputting them, and an optical coupler/splitter for mixing respective object optical frequencies and non-object optical frequencies from the decoder and outputting them; wherein
the detection adder-subtractor filter detects the object optical frequency and the non-object optical frequency from the optical coupler/splitter and performs filtration and addition/subtraction thereof.

5. The optical code communication system according to claim 1, wherein
the optical mixing decoder comprises:
a decoder for dividing the received coded light into the object optical frequency and the non-object optical frequency and outputting them; an optical splitter for splitting the local light as many as the number of splitting of the decoder and outputting them; an optical coupler/splitter for mixing object optical frequency from the decoder and local light from the optical splitter and outputting them; and an optical coupler/splitter for mixing non-object optical frequency from the decoder and local light from the optical splitter and outputting them; wherein
the detection adder-subtractor filter detects the object optical frequency and the non-object optical frequency from the optical coupler/splitter, and performs filtration and addition/subtraction thereof.

6. The optical code communication system according to claim 1, wherein
the optical mixing decoder comprises a decoder for dividing the local light into the object optical frequency and the non-object optical frequency and outputting them; an optical splitter for splitting the received coded light as many as the number of splitting of the decoder and outputting them; an optical coupler/splitter for mixing object optical frequency from the decoder and coded light from the optical splitter and outputting them; an optical coupler/splitter for mixing non-object optical frequency from the decoder and coded light from the optical splitter and outputting them; wherein
the detection adder-subtractor filter detects the object optical frequency and the non-object optical frequency from the optical coupler/splitter, and performs filtration and addition/subtraction thereof.

7. The optical code communication system according to claim 3, wherein
the received coded light and the local light are in a relationship that optical frequencies nearly agree each other;
the optical coupler/splitter is an optical hybrid which mixes the received coded light and the local light and at the same time, splits them, and outputs a plurality of mixed lights in which phase differences between the received coded light and the local light are different by predetermined values;
the decoder divides each of a plurality of mixed lights from the optical hybrid into the object optical frequency and the non-object optical frequency, and outputs them;
the detection adder-subtractor filter, for each of mixed light with different phase difference from the optical mixing decoder, detects the object optical frequency corresponding to each of a plurality of mixed lights from the optical hybrid and the non-object optical frequency corresponding to each of a plurality of mixed lights from the optical hybrid, passes of each of intermediate frequency signals and at the same time, subtracts the other from one of the intermediate frequency signals of object optical frequency and non-object optical frequency with identical phase difference, and outputs them; and
the optical receiver includes an adder which adds intermediate frequency signals each being output from the detection adder-subtractor filter and outputs them.

8. The optical code communication system according to claim 7, wherein
the optical mixing decoder, when mixing coded light from the optical transmitter and the local light, mixes the coded light and the local light with two polarization relationships relatively different by $\pi/2$ or $3\pi/2$, and outputs mixed lights corresponding to plurality of object optical frequencies corresponding to combinations of polarization relationships and phase differences between the coded light and the local light, and mixed lights corresponding to a plurality of non-object optical frequencies corresponding to combinations of polarization relationships and phase differences between the coded light and the local light;
the detection adder-subtractor filter detects, for each of mixed lights corresponding to combinations of polarization relationships and phase differences from the optical mixing decoder, the object optical frequency and the non-object optical frequency corresponding to each of mixed lights from the optical mixing decoder, passes of each of intermediate frequency signals, subtracts the other from one of the intermediate frequencies of object optical frequency and non-object optical frequency with identical polarization relationship and phase difference, and outputs each of them; and
the optical receiver adds each of intermediate frequency signals from the detection adder-subtractor filter by the adder.

9. The optical code communication system according to claim 7, wherein
when the optical mixing decoder performs mixing after at least either of coded light from the optical transmitter and the local light is divided into object optical frequency and non-object optical frequency,
the optical coupler/splitter outputs two sets of mixed light with phase difference of which is different by nearly $\pi$, the detection adder-subtractor filter performs differential detection for two sets of mixed lights being split and output from the optical coupler/splitter with the phase difference of nearly $\pi$, passes of intermediate frequency signals of the object optical frequency and non-object optical frequency, and subtracts the others from ones of the corresponding object optical frequency and non-object optical frequency of each set and outputs it.

10. The optical code communication system according to claim 3, wherein
- the optical mixing decoder, when mixing coded light from the optical transmitter and the local light, mixes the coded light and the local light with two polarization relationships relatively different by $\pi/2$ or $3\pi/2$, and outputs mixed lights corresponding to a plurality of object optical frequencies in which polarization relationships between the coded light and the local light are different, and mixed lights corresponding to a plurality of non-object optical frequencies in which polarization relationships between the coded light and the local light are different;
- the detection adder-subtractor filter, for each of mixed light with different polarization relationship from the optical mixing decoder, detects the object optical frequency and the non-object optical frequency corresponding to each of a plurality of mixed lights from the optical mixing decoder, passes of each of intermediate frequency signals, subtracts the other from one of the intermediate frequency signals of object optical frequency and non-object optical frequency with identical polarization relationship, and outputs each of them; and
- the optical receiver further includes an adder which adds intermediate frequency signal from the detection adder-subtractor filter and outputs them.

11. The optical code communication system according to claim 10, wherein
- when the optical mixing decoder performs mixing after at least either of coded light from the optical transmitter and the local light is divided into object optical frequency and non-object optical frequency,
- the optical coupler/splitter outputs two sets of mixed light with phase difference of which is different by nearly $\pi$, the detection adder-subtractor filter performs differential detection for two sets of mixed lights being split and output from the optical coupler/splitter with the phase difference of nearly it, passes of intermediate frequency signals of the object optical frequency and non-object optical frequency, and subtracts the others from ones of the corresponding object optical frequency and non-object optical frequency of each set and outputs it.

12. The optical code communication system according to claim 4, wherein
- the received coded light and the local light are in a relationship that optical frequencies nearly agree each other;
- the optical coupler/splitter is an optical hybrid which mixes a plurality of input lights being input to the optical coupler/splitter and at the same time, splits them, and outputs a plurality of mixed lights in which phase differences between the received coded light and the local light are different by predetermined values;
- the detection adder-subtractor filter, for each of mixed light with different phase difference from the optical mixing decoder, detects each of mixed light in which at least one of the received coded light and local light corresponds to object optical frequency from the optical hybrid, and each mixed light in which at least one of the received coded light and local light corresponds to non-object optical frequency from the optical hybrid, passes of each of intermediate frequency signals, subtracts the other from one of the intermediate frequency signals of object optical frequency and non-object optical frequency with identical phase difference, and outputs them, and
- the optical receiver includes an adder which adds intermediate frequency signals each being output from the detection adder-subtractor filter and outputs them.

13. The optical code communication system according to claim 12, wherein
- the optical mixing decoder, when mixing coded light from the optical transmitter and the local light, mixes the coded light and the local light with two polarization relationships relatively different by $\pi/2$ or $3\pi/2$, and outputs mixed lights corresponding to plurality of object optical frequencies corresponding to combinations of polarization relationships and phase differences between the coded light and the local light, and mixed lights corresponding to a plurality of non-object optical frequencies corresponding to combinations of polarization relationships and phase differences between the coded light and the local light;
- the detection adder-subtractor filter detects, for each of mixed lights corresponding to combinations of polarization relationships and phase differences from the optical mixing decoder, the object optical frequency and the non-object optical frequency corresponding to each of mixed lights from the optical mixing decoder, passes of each of intermediate frequency signals, subtracts the other from one of the intermediate frequencies of object optical frequency and non-object optical frequency with identical polarization relationship and phase difference, and outputs each of them; and
- the optical receiver adds each of intermediate frequency signals from the detection adder-subtractor filter by the adder.

14. The optical code communication system according to claim 4, wherein
- when the optical mixing decoder performs mixing after at least either of coded light from the optical transmitter and the local light is divided into object optical frequency and non-object optical frequency,
- the optical coupler/splitter outputs two sets of mixed light with phase difference of which is different by nearly $\pi$, the detection adder-subtractor filter performs differential detection for two sets of mixed lights being split and output from the optical coupler/splitter with the phase difference of nearly $\pi$, passes of intermediate frequency signals of the object optical frequency and non-object optical frequency, and subtracts the others from ones of the corresponding object optical frequency and non-object optical frequency of each set and outputs it.

15. The optical code communication system according to claim 5, wherein
- the received coded light and the local light are in a relationship that optical frequencies nearly agree each other;
- the optical coupler/splitter is an optical hybrid which mixes a plurality of input lights being input to the optical coupler/splitter and at the same time, splits them, and outputs a plurality of mixed lights in which phase differences between the received coded light and the local light are different by predetermined values;
- the detection adder-subtractor filter, for each of mixed light with different phase difference from the optical mixing decoder, detects each of mixed light in which at least one of the received coded light and local light corresponds to object optical frequency from the optical hybrid, and each mixed light in which at least one of the received coded light and local light corresponds to non-object optical frequency from the optical hybrid, passes of each of intermediate frequency signals, subtracts the other from one of the intermediate frequency signals of object optical frequency and non-object optical frequency with identical phase difference, and outputs them, and the optical receiver includes an adder which adds intermediate frequency signals each being output from the detection adder-subtractor filter and outputs them.

16. The optical code communication system according to claim 15, wherein the optical mixing decoder, when mixing coded light from the optical transmitter and the local light, mixes the coded light and the local light with two polarization relationships relatively different by $\pi/2$ or $3\pi/2$, and outputs mixed lights corresponding to plurality of object optical frequencies corresponding to combinations of polarization relationships and phase differences between the coded light and the local light, and mixed lights corresponding to a plurality of non-object optical frequencies corresponding to combinations of polarization relationships and phase differences between the coded light and the local light;

the detection adder-subtractor filter detects, for each of mixed lights corresponding to combinations of polarization relationships and phase differences from the optical mixing decoder, the object optical frequency and the non-object optical frequency corresponding to each of mixed lights from the optical mixing decoder, passes of each of intermediate frequency signals, subtracts the other from one of the intermediate frequencies of object optical frequency and non-object optical frequency with identical polarization relationship and phase difference, and outputs each of them; and the optical receiver adds each of intermediate frequency signals from the detection adder-subtractor filter by the adder.

17. The optical code communication system according to claims 5, wherein when the optical mixing decoder performs mixing after at least either of coded light from the optical transmitter and the local light is divided into object optical frequency and non-object optical frequency, the optical coupler/splitter outputs two sets of mixed light with phase difference of which is different by nearly $\pi$, the detection adder-subtractor filter performs differential detection for two sets of mixed lights being split and output from the optical coupler/splitter with the phase difference of nearly $\pi$, passes of intermediate frequency signals of the object optical frequency and non-object optical frequency, and subtracts the others from ones of the corresponding object optical frequency and non-object optical frequency of each set and outputs it.

18. The optical code communication system according to claim 6, wherein the received coded light and the local light are in a relationship that optical frequencies nearly agree each other;

the optical coupler/splitter is an optical hybrid which mixes a plurality of input lights being input to the optical coupler/splitter and at the same time, splits them, and outputs a plurality of mixed lights in which phase differences between the received coded light and the local light are different by predetermined values;

the detection adder-subtractor filter, for each of mixed light with different phase difference from the optical mixing decoder, detects each of mixed light in which at least one of the received coded light and local light corresponds to object optical frequency from the optical hybrid, and each mixed light in which at least one of the received coded light and local light corresponds to non-object optical frequency from the optical hybrid, passes of each of intermediate frequency signals, subtracts the other from one of the intermediate frequency signals of object optical frequency and non-object optical frequency with identical phase difference, and outputs them, and the optical receiver includes an adder which adds intermediate frequency signals each being output from the detection adder-subtractor filter and outputs them.

19. The optical code communication system according to claim 18, wherein the optical mixing decoder, when mixing coded light from the optical transmitter and the local light, mixes the coded light and the local light with two polarization relationships relatively different by $\pi/2$ or $3\pi/2$, and outputs mixed lights corresponding to plurality of object optical frequencies corresponding to combinations of polarization relationships and phase differences between the coded light and the local light, and mixed lights corresponding to a plurality of non-object optical frequencies corresponding to combinations of polarization relationships and phase differences between the coded light and the local light;

the detection adder-subtractor filter detects, for each of mixed lights corresponding to combinations of polarization relationships and phase differences from the optical mixing decoder, the object optical frequency and the non-object optical frequency corresponding to each of mixed lights from the optical mixing decoder, passes of each of intermediate frequency signals, subtracts the other from one of the intermediate frequencies of object optical frequency and non-object optical frequency with identical polarization relationship and phase difference, and outputs each of them; and the optical receiver adds each of intermediate frequency signals from the detection adder-subtractor filter by the adder.

20. The optical code communication system according to claim 6, wherein when the optical mixing decoder performs mixing after at least either of coded light from the optical transmitter and the local light is divided into object optical frequency and non-object optical frequency, the optical coupler/splitter outputs two sets of mixed light with phase difference of which is different by nearly $\pi$, the detection adder-subtractor filter performs differential detection for two sets of mixed lights being split and output from the optical coupler/splitter with the phase difference of nearly $\pi$, passes of intermediate frequency signals of the object optical frequency and non-object optical frequency, and subtracts the others from ones of the corresponding object optical frequency and non-object optical frequency of each set and outputs it.

21. The optical code communication system according to claim 1, wherein the optical mixing decoder, when mixing coded light from the optical transmitter and the local light, mixes the coded light and the local light with two polarization relationships relatively different by $\pi/2$ or $3\pi/2$, and outputs mixed lights corresponding to a plurality of object optical frequencies in which polarization relationships between the coded light and the local light are different, and mixed lights corresponding to a plurality of non-object optical frequencies in which polarization relationships between the coded light and the local light are different;

the detection adder-subtractor filter, for each of mixed light with different polarization relationship from the optical mixing decoder, detects the object optical frequency and the non-object optical frequency corresponding to each of a plurality of mixed lights from the optical mixing decoder, passes of each of intermediate frequency signals, subtracts the other from one of the intermediate frequency signals of object optical frequency and non-object optical frequency with identical polarization relationship, and outputs each of them; and the optical receiver further includes an adder which adds intermediate frequency signal from the detection adder-subtractor filter and outputs them.

22. The optical code communication system according to claim 1, wherein only one of the local light or the coded light is composed of optical frequency chips of one of the local light or the coded light, which are composed by two lights with orthogonal two polarization states, respectively, within time slot corresponding to a value of one transmission data.

23. The optical code communication system according to claim 1, wherein the optical receiver constitutes an optical frequency chip in the optical receiver by a code concatenated two codes;

for each of the received coded light and the local light, optical frequency chips constituting each of codes constituting the concatenated code have identical polarization state; and the optical mixing decoder, when mixing the received coded light and the local light, mixes the received coded light and the local light in two polarization relationships relatively different by $\pi/2$ or $3\pi/2$ for each of codes constituting the concatenated code.

24. The optical code communication system according to claim 1, wherein the optical mixing decoder divides, in the decoder, the object optical frequency and the non-object optical frequency for every the plurality of optical frequency chips, outputs as the object optical frequency and the non-object optical frequency for every the plurality of optical frequency chips, and the detection adder-subtractor filter detects for every the plurality of optical frequency chips for each of the object optical frequency and non-object optical frequency from the optical mixing decoder.

25. The optical code communication system according to claim 1, wherein the optical receiver further comprises, when an adder is provided for adding the intermediate frequency signals being output from the detection adder-subtractor filter and outputs it at a stage after detection, filtration, and addition/subtraction in the detection adder-subtractor filter, a demodulator for demodulating the intermediate frequency signal from the detection adder-subtractor filter and outputting at a stage before the adder.

26. The optical code communication system according to claim 1, wherein the optical mixing decoder or the detection adder-subtractor filter comprises at least one of a dispersion regulator for regulating transmission delay due to optical frequency after the plurality of optical frequency chips of the different optical frequencies are modulated by the transmission data in the optical transmitter till added/subtracted in the detection adder-subtractor filter of the optical receiver, a phase regulator for regulating propagation time of the coded light before modulation in the optical transmitter so that a phase difference depending on frequency separation between optical frequency chips after a plurality of light of the different optical frequencies are output from the light source till detection is performed in the detection adder-subtractor filter is accommodated in a predetermined range, and a phase regulator for regulating propagation time of the local light at a stage before mixing the coded light and the local light in the optical mixing decoder or at a stage before the optical mixing decoder.

* * * * *